(12) United States Patent
Sumitomo

(10) Patent No.: US 9,013,559 B2
(45) Date of Patent: Apr. 21, 2015

(54) SYSTEM, METHOD AND PROGRAM FOR CAPTURING IMAGES FROM A VIRTUAL VIEWPOINT

(75) Inventor: Hironori Sumitomo, Moriguchi (JP)

(73) Assignee: Konica Minolta Holdings, Inc., Tokyo (JP)

( * ) Notice: Subject to any disclaimer, the term of this patent is extended or adjusted under 35 U.S.C. 154(b) by 234 days.

(21) Appl. No.: 13/574,962

(22) PCT Filed: Jan. 12, 2011

(86) PCT No.: PCT/JP2011/050320
§ 371 (c)(1),
(2), (4) Date: Jul. 24, 2012

(87) PCT Pub. No.: WO2011/096252
PCT Pub. Date: Aug. 11, 2011

(65) Prior Publication Data
US 2012/0293693 A1    Nov. 22, 2012

(30) Foreign Application Priority Data

Feb. 2, 2010    (JP) ................................. 2010-021138
Nov. 2, 2010    (JP) ................................. 2010-246573

(51) Int. Cl.
*H04N 5/225* (2006.01)
*H04N 13/02* (2006.01)
*H04N 13/00* (2006.01)

(52) U.S. Cl.
CPC ........ *H04N 13/0221* (2013.01); *H04N 13/0011* (2013.01); *H04N 13/0239* (2013.01); *H04N 13/0271* (2013.01); *H04N 13/0264* (2013.01); *H04N 2213/005* (2013.01)

(58) Field of Classification Search
CPC .......... H04N 5/23232; H04N 5/23238; H04N 5/247; H04N 5/3415; H04N 3/1593
USPC .................................................. 348/50, 218.1
See application file for complete search history.

(56) References Cited

U.S. PATENT DOCUMENTS 6,643,396 B1 * 11/2003 Hendriks et al. ............... 382/154
6,668,082 B1 * 12/2003 Davison et al. ................ 382/190

(Continued)

FOREIGN PATENT DOCUMENTS

JP         2000-253422 A      9/2000
JP         2005-151534        6/2005
WO     WO 2010/037512 A1    4/2010

OTHER PUBLICATIONS

International Search Report in International Application No. PCT/JP2011/050320, mailed Mar. 15, 2011, 1 page.

(Continued)

*Primary Examiner* — Twyler Haskins
*Assistant Examiner* — Dwight C Tejano
(74) *Attorney, Agent, or Firm* — Brinks Gilson & Lione

(57) ABSTRACT

An objective of the present invention is to provide a technique capable of generating a virtual viewpoint image without causing any visually uncomfortable feeling. In order to achieve this objective, a first image obtained by being captured from a first viewpoint at a first image capture time, and a second image obtained by being captured at a second image capture time different from the first image capture time are acquired. To each of pixels in a non-image capture area corresponding to a portion of a subject not captured in the first image of a first virtual viewpoint image that is generated in a pseudo manner based upon the first image and can be acquired by being captured from a first virtual viewpoint different from the first viewpoint, a pixel value is added in accordance with the second image.

15 Claims, 25 Drawing Sheets

(56) References Cited

U.S. PATENT DOCUMENTS

| | | | |
|---|---|---|---|
| 7,200,261 B2* | 4/2007 | Ono | 382/154 |
| 7,659,923 B1* | 2/2010 | Johnson | 348/218.1 |
| 8,682,097 B2* | 3/2014 | Steinberg et al. | 382/275 |
| 2009/0167928 A1* | 7/2009 | Asukabe et al. | 348/345 |
| 2009/0309987 A1* | 12/2009 | Kimura et al. | 348/218.1 |
| 2009/0322891 A1* | 12/2009 | Kondo et al. | 348/218.1 |
| 2010/0013909 A1* | 1/2010 | Zhang et al. | 348/50 |
| 2010/0238313 A1* | 9/2010 | Ohki et al. | 348/222.1 |

OTHER PUBLICATIONS

The Extended European Search Report in European Patent No. 11 73 9601 dated Jun. 24, 2013, 12 pages.

Office Action in Japanese Application No. 2011-552722, issued on Mar. 19, 2013, and partial English language translation, 4 pages.

* cited by examiner

F I G. 1
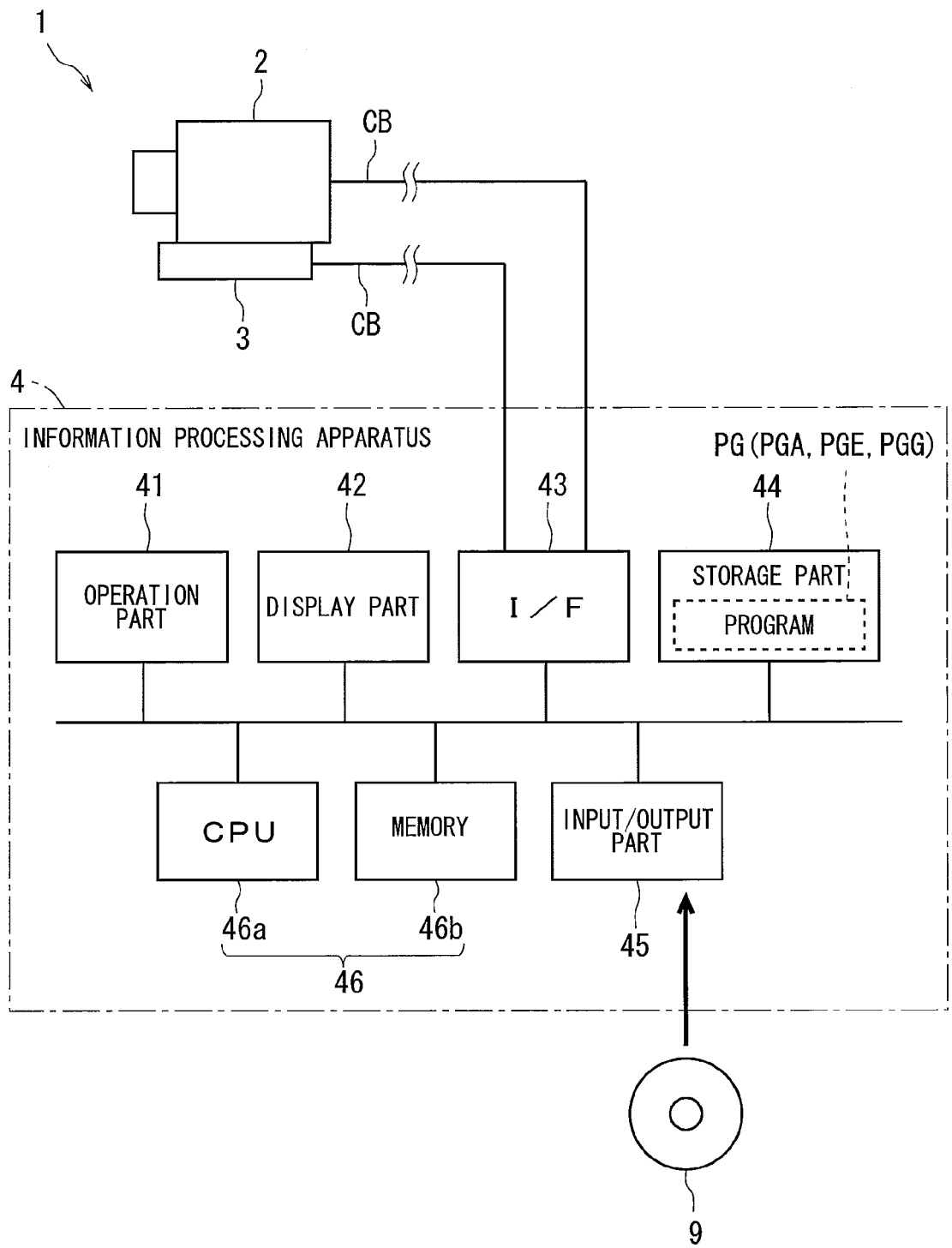

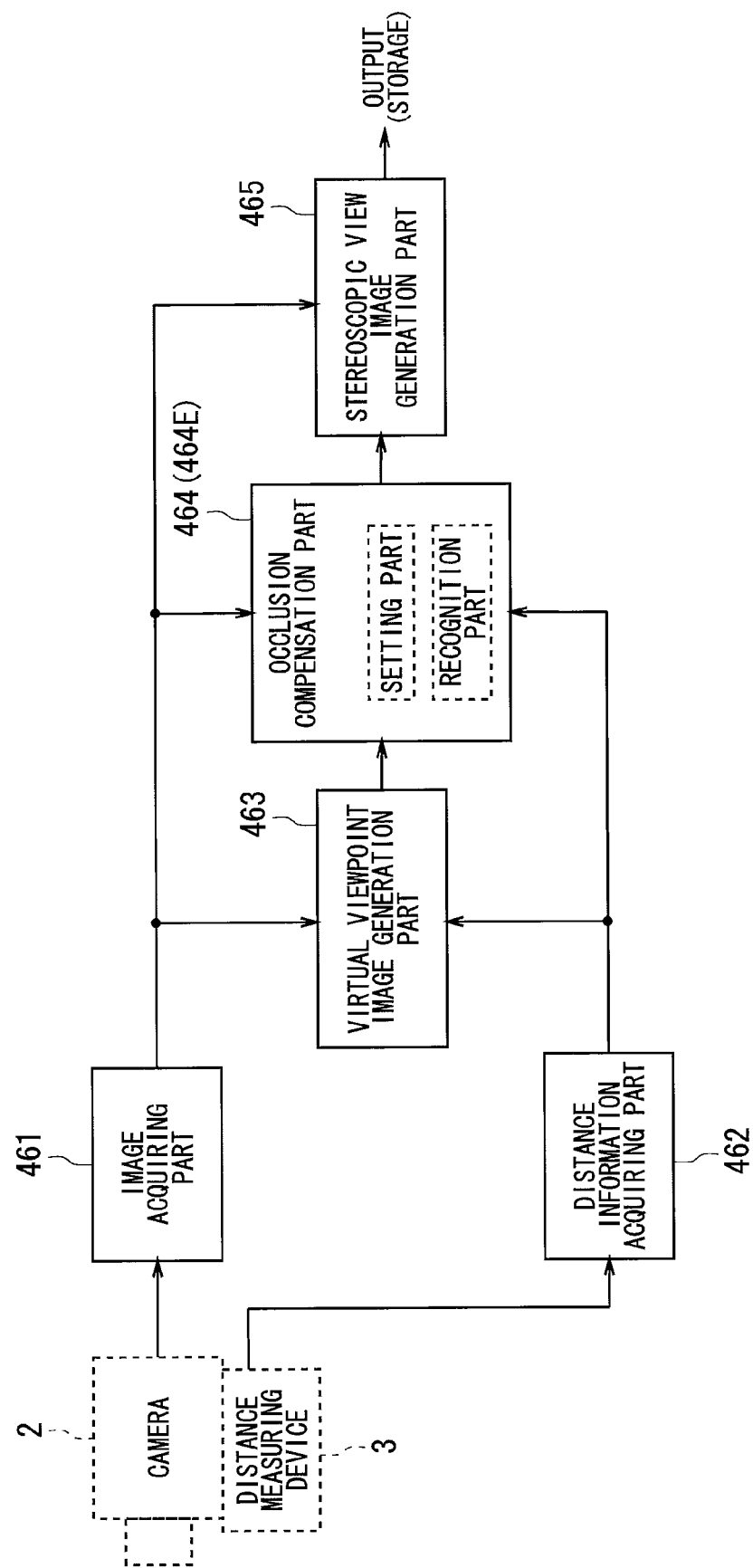

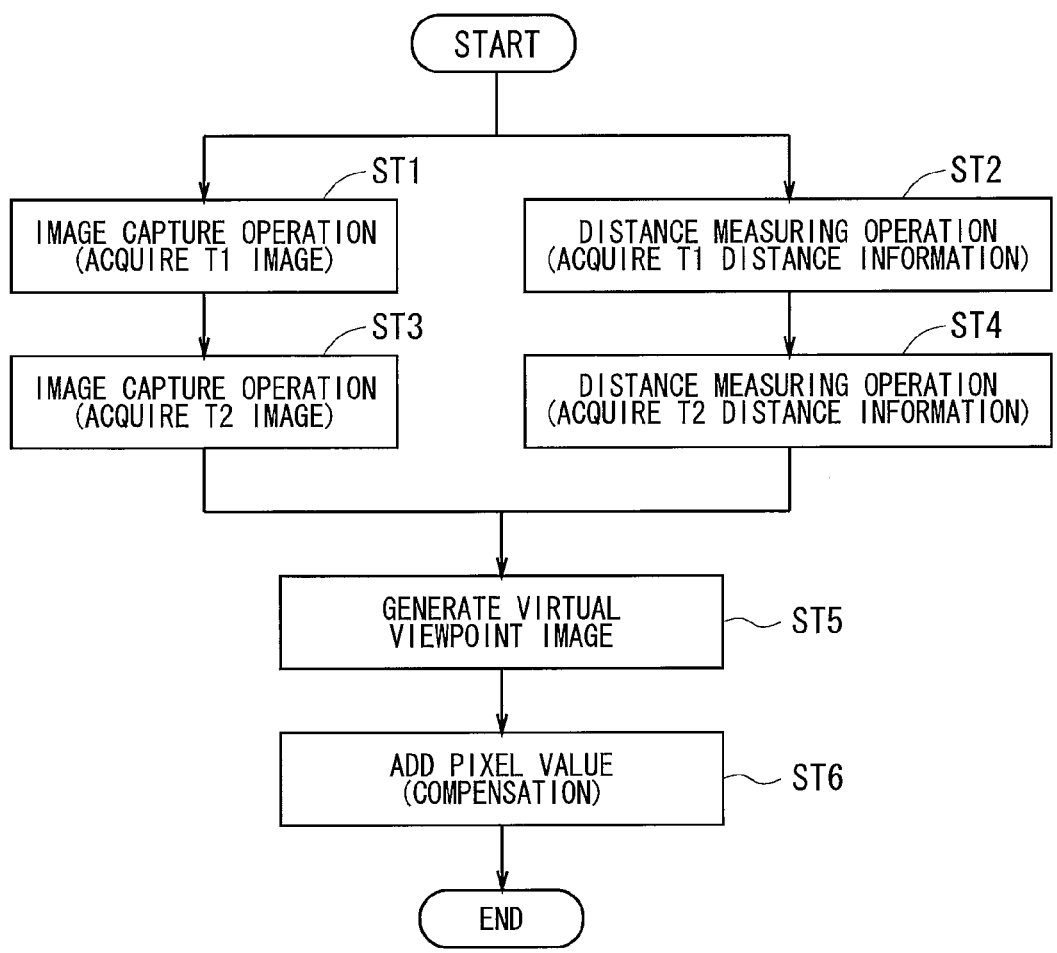
F I G. 1 3

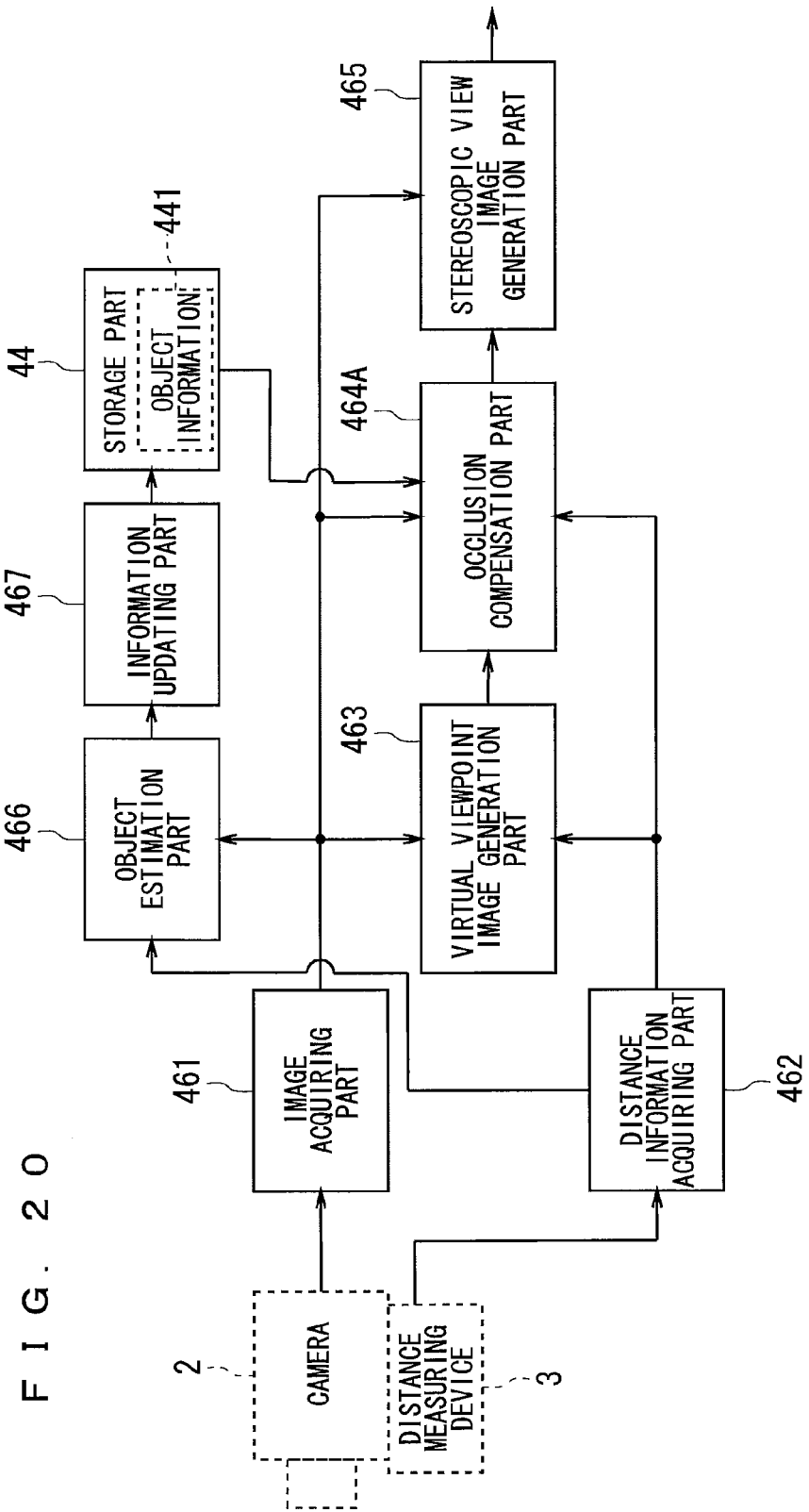

F I G. 2 1
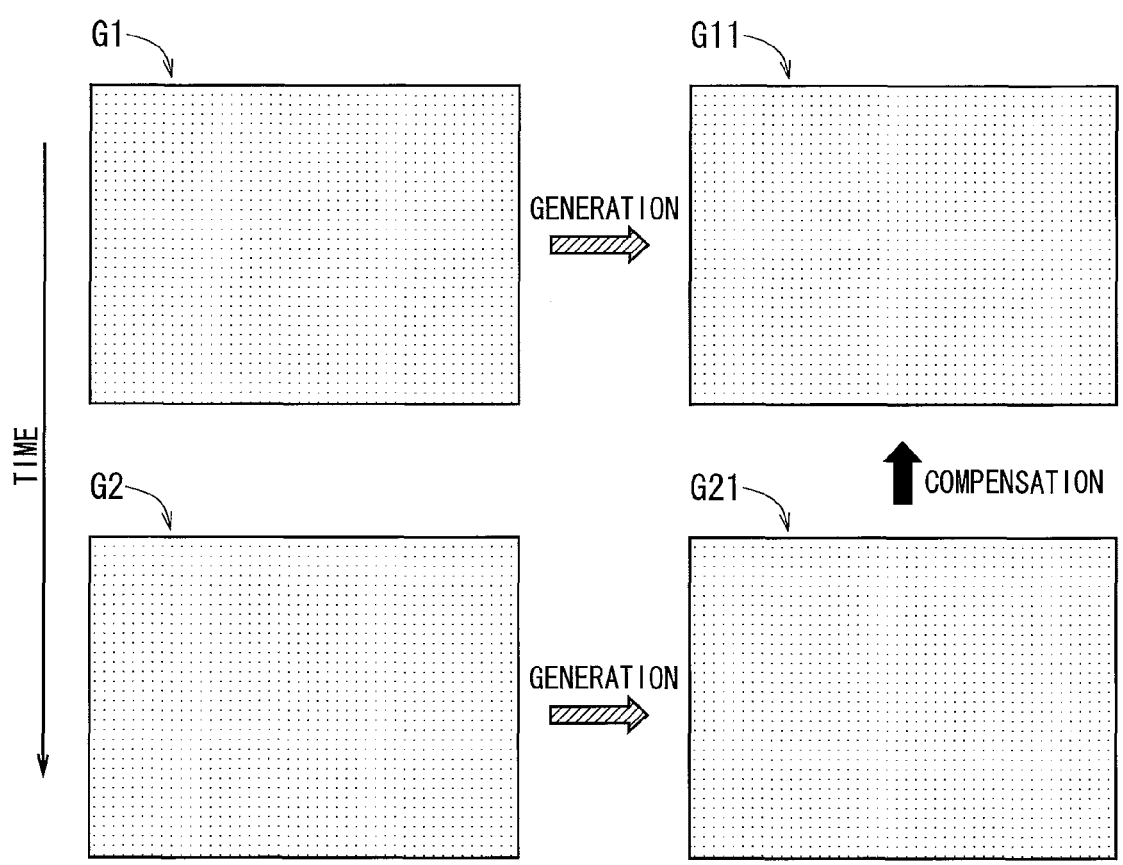

F I G. 2 3
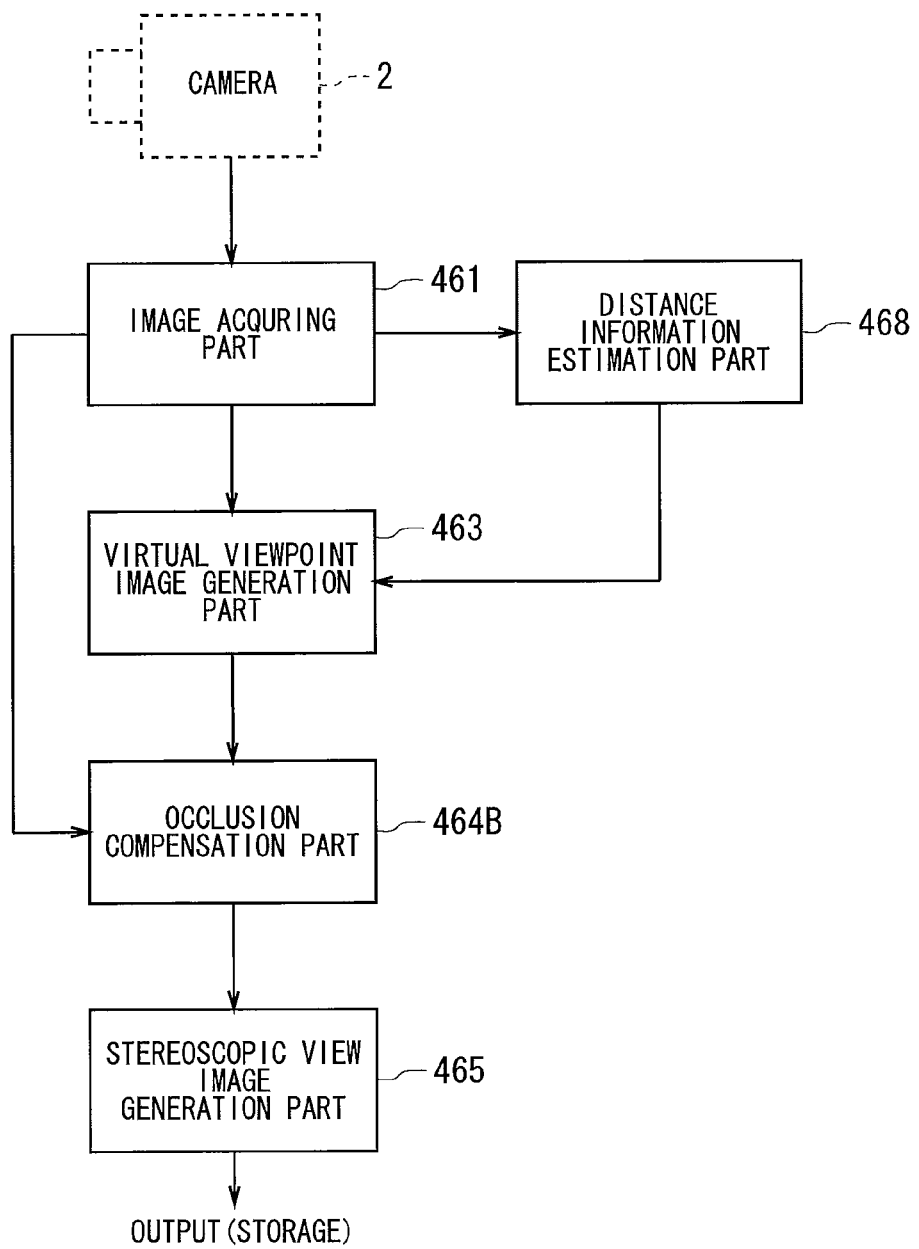

F I G. 2 8
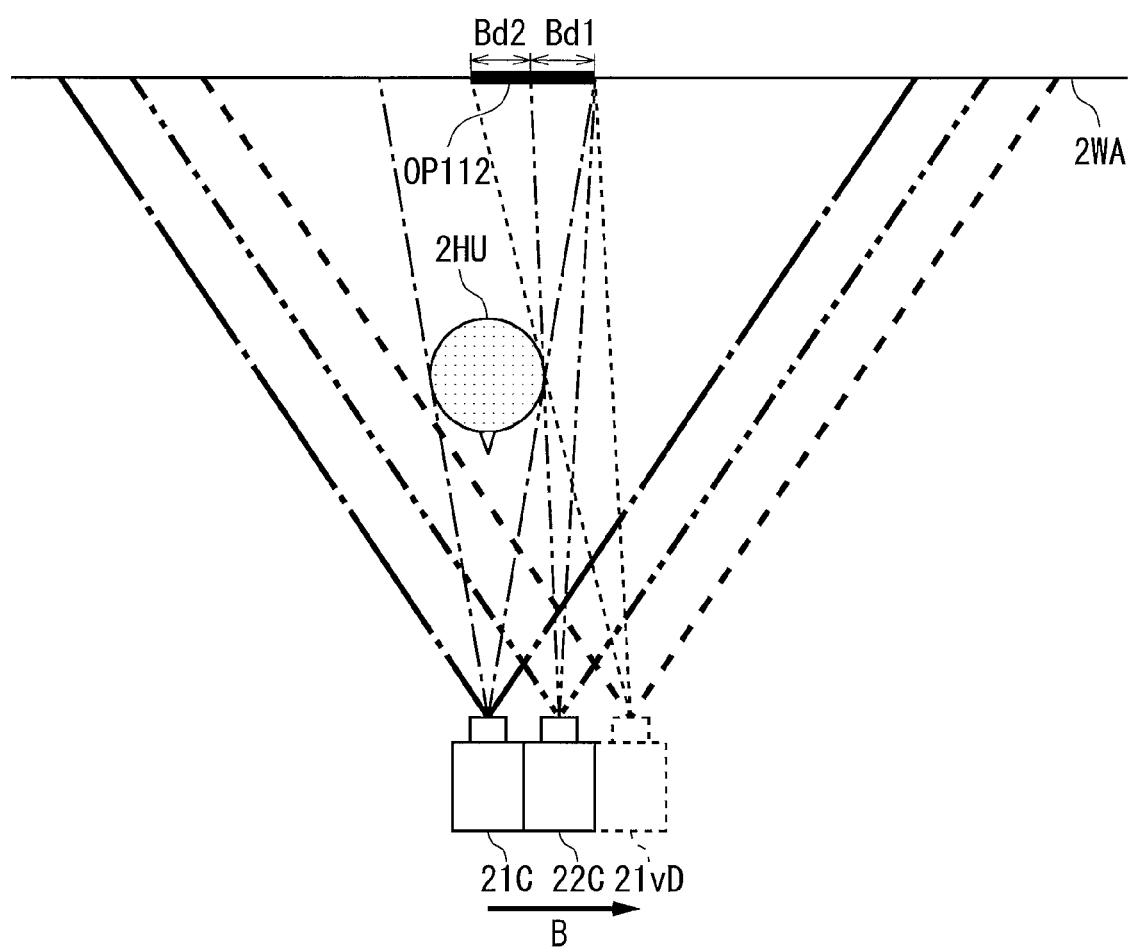

F I G. 3 0
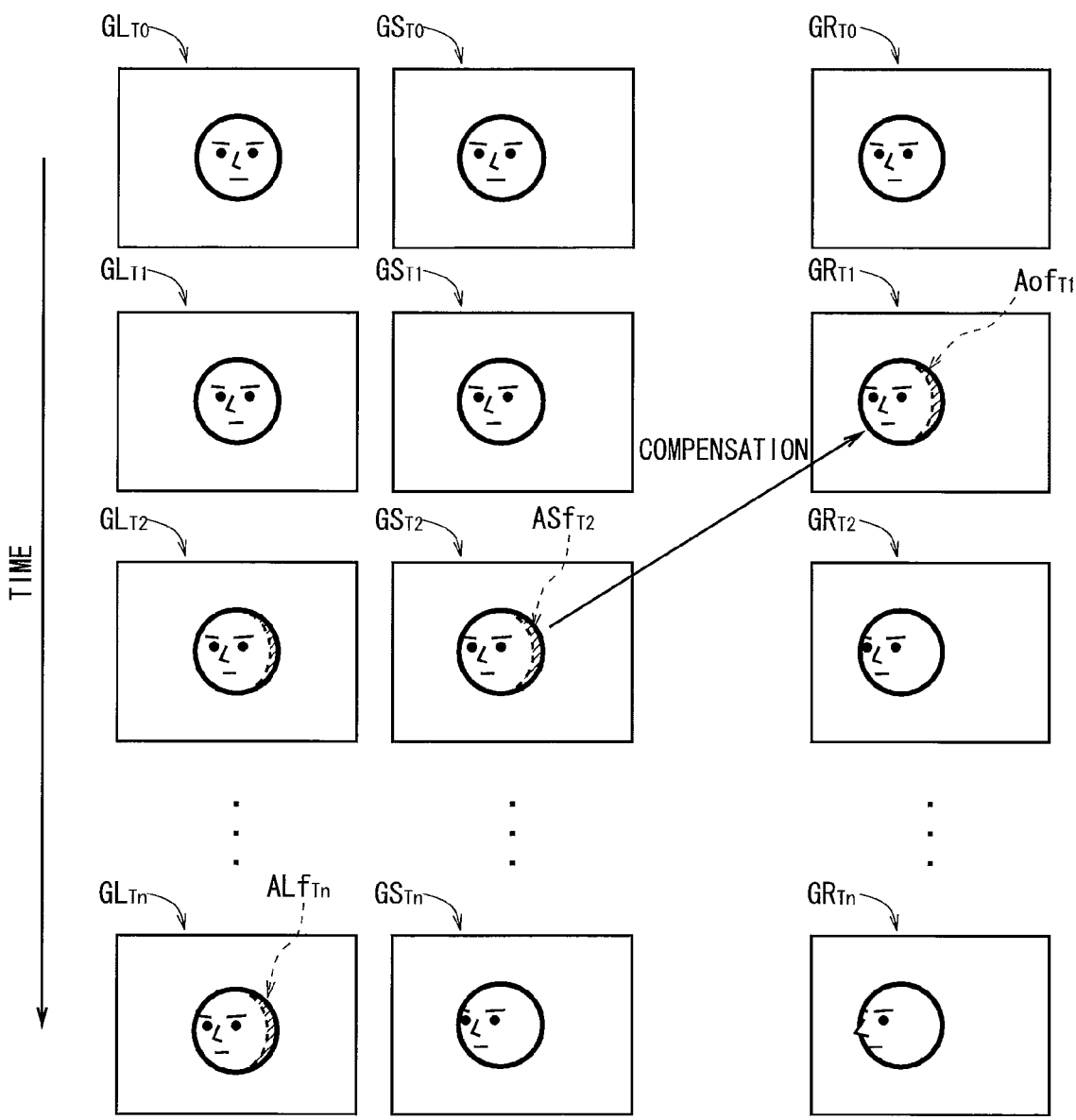

F I G. 3 2
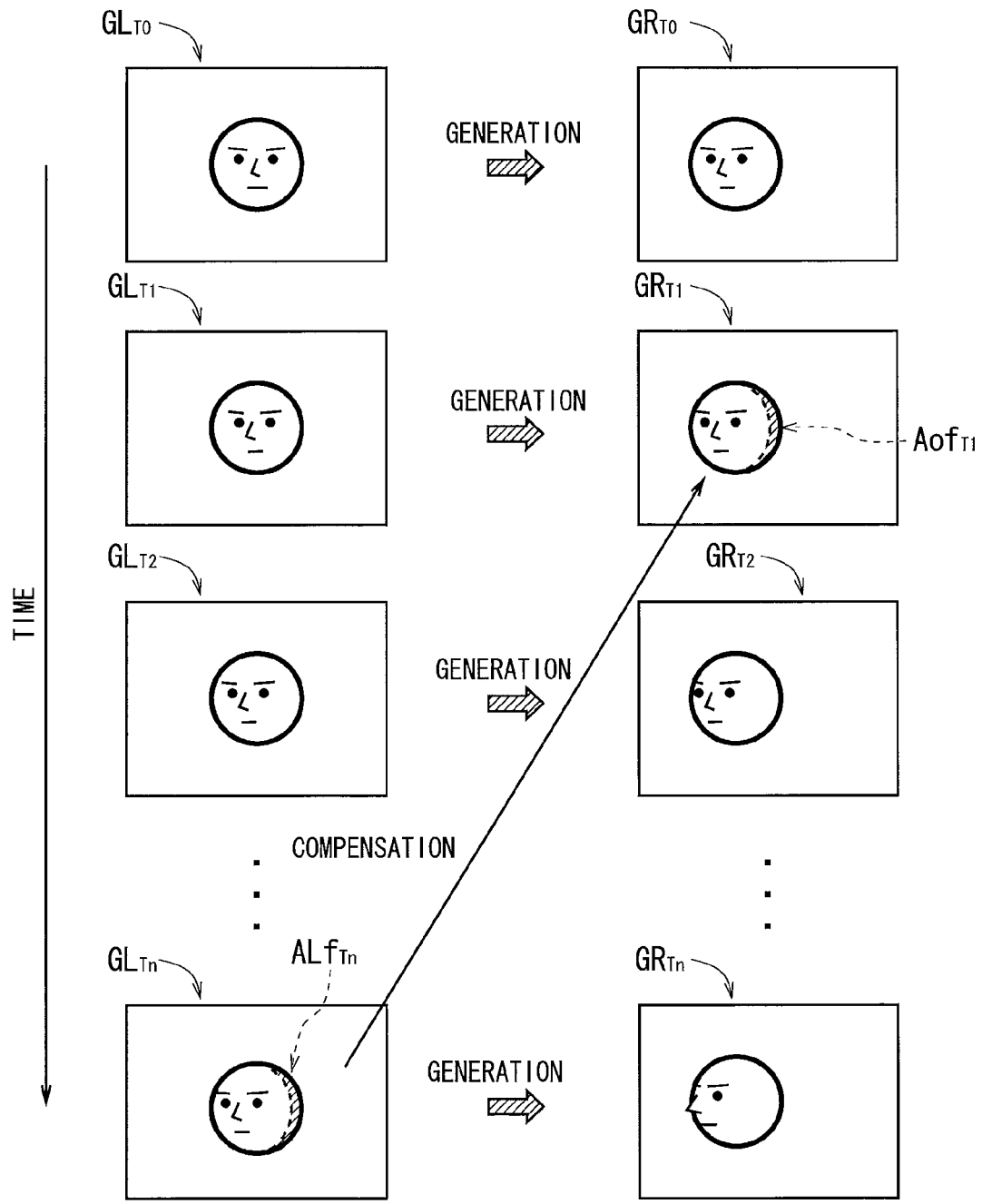

F I G. 3 3
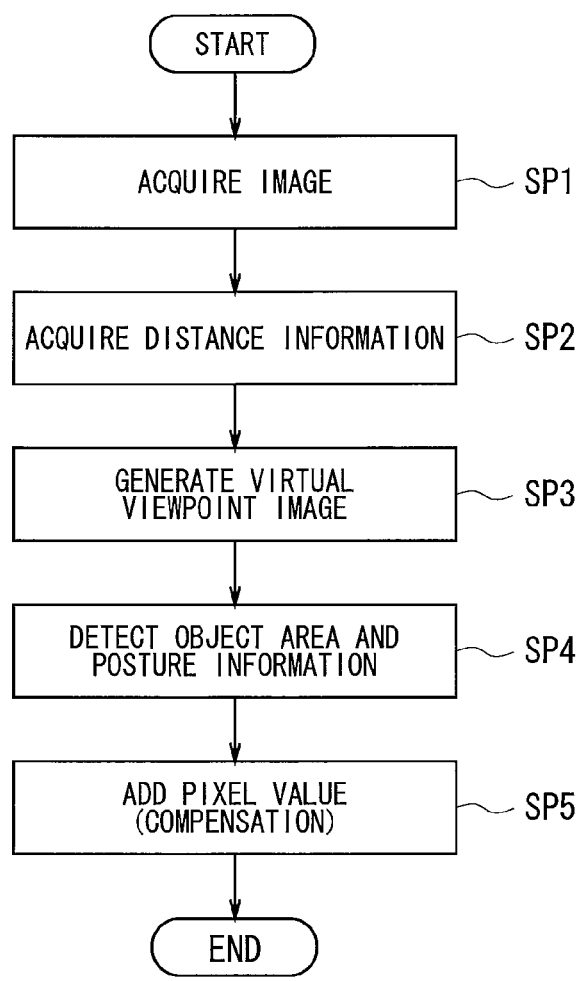

SYSTEM, METHOD AND PROGRAM FOR CAPTURING IMAGES FROM A VIRTUAL VIEWPOINT

TECHNICAL FIELD

The present invention relates to an image processing technique.

BACKGROUND ART

From one captured image, if an image (virtual viewpoint image) to be obtained by capturing the same subject from a virtual viewpoint different from a viewpoint relating to the captured image is generated in a pseudo manner, it is possible to generate a group of images that can provide a so-called stereoscopic view that is adopted in a 3D television technique, etc.

However, in the virtual viewpoint image, an area corresponding to a portion of the subject that has not been captured in the original captured image forms an area (an occlusion area) in which pixel values are indefinite.

In view of this problem, a technique has been proposed in which a pixel value relating to the occlusion area is compensated based upon a statistics derived from a texture of each of images divided based upon a so-called region-competition method (for example, Japanese Patent Application Laid-Open No. 2005-151534, etc).

In the technique of Japanese Patent Application Laid-Open No. 2005-151534, based upon an image (non-stereoscopic image) by which no depth information is given in an explicit manner as well as in an implicit manner as in the case of a stereo image, depth estimation data is generated so that a stereoscopic image is generated in a pseudo manner based upon the depth estimation data and the non-stereoscopic image.

SUMMARY OF THE INVENTION

Problems to be Solved by the Invention

In the technique of Japanese Patent Application Laid-Open No. 2005-151534 described above, however, the pixel value relating to the occlusion area is estimated based upon a pixel value relating to an area (image capture area) captured in the original captured image. For this reason, a pixel value to be compensated is false information, with the result that the image with the compensated pixel value might cause a visually uncomfortable feeling.

In view of the above problems, the present invention has been devised, and its objective is to provide a technique capable of generating a virtual viewpoint image without causing any visually uncomfortable feeling.

Means for Solving the Problems

In order to solve the above-mentioned problems, an image processing system according to a first aspect is provided with: an acquiring part that acquires a first image obtained by being captured from a first viewpoint at a first image capture time and a second image obtained by being captured at a second image capture time different from the first image capture time; and a compensation part that includes a recognition part that recognizes a non-corresponding area of the second image that does not correspond to the first image and adds a pixel value in accordance with a pixel value relating to the non-corresponding area of the second image to each of pixels of a non-image capture area corresponding to a portion of a subject not captured in the first image of a first virtual viewpoint image that is generated in a pseudo manner based upon the first image, and can be acquired by being captured from a first virtual viewpoint that is different from the first viewpoint, and in this arrangement, the compensation part includes a setting part that sets a reference point included in a corresponding area of the second image that corresponds to the first image, and in accordance with positional information of a virtual reference point corresponding to the reference point in the first virtual viewpoint image and a relative positional relationship between the reference point in the second image and a process target point included in the non-corresponding area, specifies a compensation target point corresponding to the process target point in the first virtual viewpoint image, and then adds a pixel value to the compensation target point in accordance with a pixel value relating to the process target point.

An image processing system according to a second aspect, which relates to the image processing system of the first aspect, is further provided with a generation part that generates the first virtual viewpoint image based upon the first image and distance information relating to a distance from the first viewpoint to each portion of the subject.

An image processing system according to a third aspect, which relates to the image processing system of the second aspect, is further provided with a distance measuring part that measures the distance from the first viewpoint to each portion of the subject.

In an image processing system according to a fifth aspect, which relates to the image processing system of the first aspect, in the case where the first and second images are two frame images composing motion picture files of an MPEG format, the recognition part recognizes the non-corresponding area in accordance with motion vector information included in the motion picture files of the MPEG format.

In an image processing system according to a seventh aspect, which relates to the image processing system of the first aspect, the setting part sets a point located near the process corresponding point within the corresponding area as the reference point.

In an image processing system according to an eighth aspect, which relates to the image processing system of the first aspect, the setting part sets a point that is located near the process corresponding point within the corresponding area and has a separated distance from a second viewpoint used upon capturing the second image to the subject that is substantially the same as that of the process target point as the reference point.

An image processing system according to a ninth aspect is provided with: an acquiring part that acquires a first image obtained by being captured from a first viewpoint at a first image capture time and a second image obtained by being captured at a second image capture time different from the first image capture time; and a compensation part that adds a pixel value in accordance with the second image to each of pixels of a non-image capture area corresponding to a portion of a subject not captured in the first image of a first virtual viewpoint image that is generated in a pseudo manner based upon the first image, and can be acquired by being captured from a first virtual viewpoint that is different from the first viewpoint, and in this arrangement, the compensation part adds, to each of the pixels within the non-image capture area, a pixel value of a pixel having the same coordinates as each of the pixels of the non-image capture area in the first virtual viewpoint image of a second virtual viewpoint image that is generated in a pseudo manner based upon the second image, and can be acquired by being captured from the second virtual viewpoint having the same positional relationship as that of the first virtual viewpoint relative to the first viewpoint with respect to a second viewpoint used upon capturing the second image.

An image processing system according to an eleventh aspect is provided with: an acquiring: part that acquires a first image obtained by being captured from a first viewpoint at a first image capture time and a second image obtained by being captured at a second image capture time different from the first image capture time; and a compensation part that adds a pixel value in accordance with the second image to each of pixels of a non-image capture area corresponding to a portion of a subject not captured in the first image of a first virtual viewpoint image that is generated in a pseudo manner based upon the first image, and can be acquired by being captured from a first virtual viewpoint that is different from the first viewpoint, and in this arrangement, the compensation part adds a pixel value to each of the pixels in the non-image capture area in accordance with a second virtual viewpoint image generated from the second image in a pseudo manner, with the second image being an image acquired by being captured from a second viewpoint and the second virtual viewpoint image being an image acquired by being captured from a second virtual viewpoint, and the relative positional relationship between the second viewpoint and the second virtual viewpoint is the same as the relative positional relationship between the first viewpoint and the first virtual viewpoint.

An image processing system according to a twelfth aspect is provided with: an acquiring part that acquires a first image obtained by being ea turgid from a first viewpoint at a first image capture time and a second image obtained by being captured at a second image capture time different from the first image capture time; and a compensation part that adds a pixel value in accordance with the second image to each of pixels of a non-image capture area corresponding to a portion of a subject not captured in the first image of a first virtual viewpoint image that is generated in a pseudo manner based upon the first image, and can be acquired by being captured from a first virtual viewpoint that is different from the first viewpoint, and in this arrangement, the first image is obtained by being captured by a first camera, and the second image is obtained by being captured by a second camera different from the first camera.

An image processing system according to a thirteenth aspect is provided with: an acquiring part that acquires a first image obtained by being captured from a first viewpoint at a first image capture time and a second image obtained by being captured at a second image capture time different from the first image capture time; and a compensation part that adds a pixel value in accordance with the second image to each of pixels of a non-image capture area corresponding to a portion of a subject not captured in the first image of a first virtual viewpoint image that is generated in a pseudo manner based upon the first image, and can be acquired by being captured from a first virtual viewpoint that is different from the first viewpoint, and in this arrangement, the first image is obtained by being captured by a first camera, and the acquiring part acquires a third image obtained by being captured by a second camera different from the first camera at the first image capture time, and the compensation part adds a pixel value to each of the pixels of the non-image capture area in accordance with the second image and the third image.

An image processing system according to a fourteenth aspect is provided with: an acquiring part that acquires a first image obtained by being captured from a first viewpoint at a first image capture time and a second image obtained by being captured at a second image capture time different from the first image capture time; a compensation part that adds a pixel value in accordance with the second image to each of pixels of a non-image capture area corresponding to a portion of a subject not captured in the first image of a first virtual viewpoint image that is generated in a pseudo manner based upon the first image, and can be acquired by being captured from a first virtual viewpoint that is different from the first viewpoint; and a first detection part that detects a first object area capturing a specific kind of object from the first image and a first posture of the specific kind of object captured in the first object area, and also respectively detects a plurality of object areas capturing the specific kind of object and postures of the specific kind of object captured in the plurality of object areas, from the plurality of images obtained by being captured at a plurality of image capture times different from the first image capture time, and acquired by the acquiring part, and in this arrangement, the compensation part includes a second detection part that acquires information of first virtual posture of the specific kind of object captured in the first virtual viewpoint image from the first posture, and detects an object area capturing an object with a posture included within a permissible error range based upon the first virtual posture from the plurality of object areas, and the compensation part adds a pixel value to each of the pixels within the non-image capture area in accordance with the object area detected by the second detection part.

In an image processing system according to a fifteenth aspect, which relates to the image processing system of the fourteenth aspect, in the case where two or more object areas are detected by the second detection part, the compensation part adds a pixel value to each of the pixels of the non-image capture area in accordance with the object area included in an image having an image capture time closest to the first image capture time among the two or more object areas.

In an image processing system according to a sixteenth aspect, which relates to the image processing system of the fourteenth aspect, in the case where two or more object areas are detected by the second detection part, the compensation part adds a pixel value to each of the pixels of the non-image capture area in accordance with the object area having a pixel value pattern that is closest to the pixel value pattern of the first object area among the two or more object areas.

An image processing method according to a seventeenth aspect is provided with: an acquiring step of acquiring a first image obtained by being captured from a first viewpoint at a first image capture time and a second image obtained by being captured at a second image capture time different from the first image capture time; and a compensation step of recognizing a non-corresponding area of the second image that does not correspond to the first image, and adding a pixel value in accordance with a pixel value relating to the non-corresponding area of the second image to each of the pixels in a non-image capture area corresponding to a portion of a subject that has not been captured in the first image, of a first virtual viewpoint image that is generated in a pseudo manner based upon the first image, and can be acquired by being captured from a first virtual viewpoint different from the first viewpoint, and in this method, in the compensation step, a reference point included in a corresponding area of the second image that corresponds to the first imager is set, and in accordance with positional information of a virtual reference point corresponding to the reference point in the first virtual viewpoint image and a relative positional relationship between the reference point in the second image and a process target point included in the non-corresponding area, a compensation target point corresponding to the process target point in the first virtual viewpoint image is specified, and then a pixel value is added to the compensation target point in accordance with a pixel value relating to the process target point.

A non-transitory computer readable recording medium storing a computer-readable program, the program controlling an information processing system to operate as an image processing system, and the image processing system providing with: an acquiring part that acquires a first image obtained by being, captured from a first viewpoint at a first image capture time and a second image obtained by being captured at a second image capture time different from the first image capture time; and a compensation part that includes a recognition part that recognizes a non-corresponding area of the second image that does not correspond to the first image and adds a pixel value in accordance with a pixel value relating to the non-corresponding area of the second image to each of pixels of a non-image capture area corresponding to a portion of a subject not captured in the first image of a first virtual viewpoint image that is generated in a pseudo manner based upon the first image, and can be acquired by being captured from a first virtual viewpoint that is different from the first viewpoint, and in this arrangement, the compensation part includes a setting part that sets a reference point included in a corresponding area of the second image that corresponds to the first image, and in accordance with positional information of a virtual reference point corresponding to the reference point in the first virtual viewpoint image and a relative positional relationship between the reference point in the second image and a process target point included in the non-corresponding area, specifies a compensation target point corresponding to the process target point in the first virtual viewpoint image, and then adds a pixel value to the compensation target point in accordance with a pixel value relating to the process target point.

Effects of the Invention

According to the image processing system relating to any one of the first to third, filth, seventh to ninth, and eleventh to sixteenth aspects as well, since a pixel value relating to each of the pixels of a non-image capture area in a virtual viewpoint image generated from a first image is compensated based upon a second image obtained by being captured at an image capture time different from that of the first image, it is possible to generate a virtual viewpoint image without causing any visually uncomfortable feeling.

According to the image processing system relating to first aspects as well, since a pixel value relating to each of the pixels of a non-image capture area is easily found, it is possible to execute processes for generating a virtual viewpoint image without causing any visually uncomfortable feeling in a short period of time.

According to the image processing system relating to the fifth aspect as well, since the amount of calculations for use in specifying a pixel value relating to each of the pixels of a non-image capture area is reduced, it is possible to execute processes for generating a virtual viewpoint image without causing any visually uncomfortable feeling in a very short period of time.

According to the image processing system relating to first aspects as well, since a pixel value relating to each of the pixels of a non-image capture area is found with high precision, it is possible to positively generate a virtual viewpoint image without causing any visually uncomfortable feeling.

According to the image processing system relating to the ninth aspect, it is possible to carry out processes at high speed by a reduction of the amount of calculations.

According to the image processing system relating to any one of the eleventh and twelfth aspects as well, it is possible to reduce the amount of calculations required for compensation of a pixel value relating to each of the pixels of a non-image capture area.

According to the image processing system relating to the thirteenth aspect, it is possible to generate a virtual viewpoint image without causing any visually uncomfortable feeling regardless of degree of changes in the image capturing environment.

According to the image processing system relating to any one of the fourteenth to sixteenth aspects as well, it is possible to reduce unnatural changes in the pixel value within an image area capturing a certain object.

According to the image processing system relating to any one of the fifteenth and sixteenth aspects as well, it is possible to reduce mismatching between an image area capturing a certain object and the image area on the periphery thereof.

According to the image processing method relating to the seventeenth aspect and the non-transitory corn titer readable recording medium relating to the eighteenth aspect as well, since a pixel value relating to each of the pixels of a non-image capture area in a virtual viewpoint image generated from a first image is compensated based upon a second image obtained by being captured at image capture time different from that of the first image, it is possible to generate a virtual viewpoint image without causing any visually uncomfortable feeling.

BRIEF DESCRIPTION OF THE DRAWINGS

FIG. 1 is a view schematically showing a configuration of an information processing system according to one embodiment.

FIG. 2 is a view showing a functional configuration of an information processing apparatus according to one embodiment.

FIG. 13 is a flow chart that shows a flow of operations of the image processing system.

FIG. 20 is a view showing a functional configuration of an information processing apparatus according to one modified embodiment.

FIG. 21 is a view for describing a compensating method for an occlusion area according to one modified embodiment.

FIG. 23 is a view showing a functional configuration of an information processing apparatus according to one modified embodiment.

FIG. 28 is a schematic view illustrating image-capturing conditions according to the first modified embodiment.

FIG. 30 is a view for describing a compensation process according to a third modified embodiment.

FIG. 32 is a view for describing a compensation process according to the fourth modified embodiment.

FIG. 33 is a flow chart that shows a flow of operations of the image processing apparatus according to the fourth modified embodiment.

EMBODIMENT FOR CARRYING OUT THE INVENTION

Figure 3:
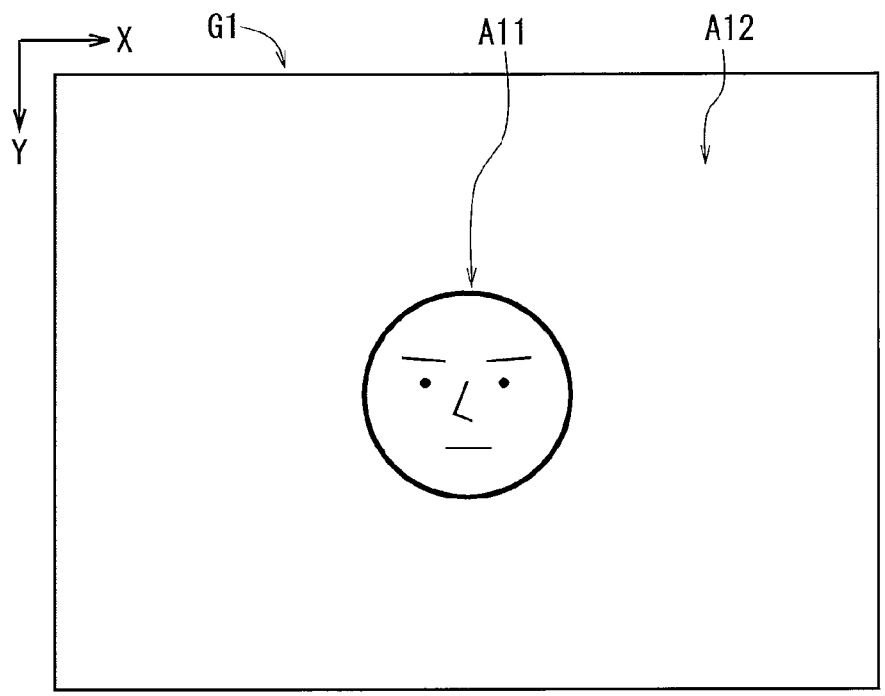
FIG. 3 is an image view illustrating a T1 image.

One embodiment of the present invention will be described below with reference to the drawings.

(1) Configuration of Information Processing System

FIG. 1 is a view schematically showing a configuration of an information processing system 1 according to one embodiment of the present invention.

The information processing system 1 is provided with a camera 2, a distance measuring device 3, and an information processing apparatus 4 that is connected to the camera 2 and the distance measuring device 3 so as to allow data transmitting and receiving processes to and from therebetween.

The camera 2 is formed by, for example, a digital camera provided with image-capturing devices such as CCDs and the like. In the camera 2, light from a subject is received, and an image-capturing process in which the distribution of luminance information relating to the subject is acquired as image data relating to the subject by photoelectric conversion is carried out. Moreover, by carrying out image-capturing processes a plurality of times at predetermined timings, a plurality of pieces of image data are obtained by the camera 2. For example, image data (hereinafter, referred to as "T1 image data") is obtained by an image-capturing process at time T1, and image data (hereinafter, referred to as "T2 image data") is obtained by an image-capturing process at time T2. The respective pieces of image data acquired by the camera 2 are transmitted to the information processing apparatus 4 through a data line CB.

In the following description, the image data, and images displayed based upon the image data are generally referred to collectively as "images". For example, the "T1 image data" is referred to as a "T1 image", and the "T2 image data" is referred to as a "T2 image".

The distance measuring device 3, which is installed side by side with the camera 2 so as to properly maintain its positional relationship and posture relative to the camera 2, functions as an apparatus for measuring a distance up to the subject serving as an image-capturing target, for example, by using laser. By measuring the distance from the camera 2 (more specifically, image-capturing elements) to each of the portions of the subject by the distance measuring device 3, the distance from the viewpoint to each of the portions of the subject at the time of an image-capturing process is measured.

For example, information (hereinafter, referred to also as "T1 distance information") indicating the distance from the camera 2 at the time of the image-capturing process at time T1 (more specifically, the viewpoint, hereinafter, referred to also as a "T1 viewpoint") to each of the portions of the subject is obtained. Moreover, information (hereinafter, referred to also as "T2 distance information") indicating the distance from the camera 2 at the time of the image-capturing process at time T2 (more specifically, the viewpoint, hereinafter, referred to also as a "T2 viewpoint") to each of the portions of the subject is obtained. The respective pieces of distance information, obtained by the distance measuring device 3 are transmitted to the information processing apparatus 4 through the data line CB.

The information processing apparatus 4 is formed, for example, by a personal computer (PC) and is provided with an operation part 41 including a mouse, a keyboard, etc., a display part 42 constituted by a liquid crystal display, etc., and an interface (I/F) part 43 for receiving data from the camera 2 and the distance measuring device 3. Moreover, the information processing apparatus 4 includes a storage part 44, an input/output part 45, and a control part 46.

The storage part 44 is formed, for example, by a hard disk or the like, and stores respective images acquired by the camera 2. Moreover, the storage part 44 stores a program PG and the like for use in executing a virtual viewpoint image generating operation, which will be described later.

The input/output part 45 is provided with, for example, a disc drive, and receives a storage medium 9 such as an optical disc and the like, so that the input/output part 45 executes data transmitting and receiving processes to and from the control part 46.

The control part 46 is provided with a CPU 46a serving as a processer and a memory 46b that temporarily stores information, and systematically controls the respective parts of the information processing apparatus 4. Moreover, the control part 46, which allows the program PG inside the storage part 44 to be read and executed, makes it possible to achieve various kinds of functions and various kinds of information processing. For example, by the control of the control part 46, the information processing system 1 functions as an image processing system for carrying out a virtual viewpoint image generating operation. Additionally, the program data stored in the storage medium 9 may be stored in a memory 46b through the input/output part 45.

Furthermore, in the case where the camera 2 is virtually set at a position deviated from the camera 2 with a predetermined distance, the control part 46 carries out a virtual viewpoint image generating operation for generating an image that is predicted to be obtained by the image-capturing process of the virtual camera 2 in a pseudo manner based upon the T1 image.

In the virtual viewpoint image generating operation, based upon the T1 image, an image to be assumed to be acquired (hereinafter, referred to also as a "T1 virtual viewpoint image") supposing that the image is captured by the camera 2 from a virtual viewpoint (hereinafter, referred to also as a "T1 virtual viewpoint") different from the T1 viewpoint is generated.

In this case, the image-capturing direction (for example, the optical axis of the image-capturing lens) of the camera 2 relating to the T1 viewpoint and the virtual image-capturing direction (for example, the optical axis of the image-capturing lens) of the camera 2 relating to the T1 virtual viewpoint are made substantially in parallel with each other (preferably, completely in parallel with each other). Moreover, the T1 viewpoint and the T1 virtual viewpoint have such a positional relationship that the T1 viewpoint and the T1 virtual viewpoint are deviated from each other with a certain distance in a direction perpendicular to the image-capturing direction within the plane horizontal to the ground. Here, "a certain distance" is set to, for example, a distance between the both eyes of a person in general.

However, in the T1 virtual viewpoint image, there is an area (hereinafter, referred to also as a "T1 non-image capture area") corresponding to a portion of the subject that has not been captured in the T1 image. For this reason, at the time when a T1 virtual viewpoint image is simply generated from the T1 image, no pixel value is given to the T1 non-image capture area. Therefore, in the virtual viewpoint image generating operation, pixel values of the respective pixels contained in the T1 non-image capture area are compensated in accordance with the T2 image. Thus, it is possible to generate a virtual viewpoint image without causing any visually uncomfortable feeling.

Moreover, the control part 46 generates an image (3D image), that can provide a so-called stereoscopic view, from the T1 image and the T1 virtual viewpoint image. Then, onto the display part 42, a 3D image generated by the control part 46 is visually outputted. In the following description, an explanation will be given by exemplifying a case where one T1 virtual viewpoint image is generated from one T1 image; however, with respect to a number of images obtained by the camera 2 at three or more timings, images (virtual viewpoint images) whose viewpoints are virtually made different from one another may be generated. In this configuration, 3D images in a motion-picture mode are generated so that the 3D images are visually outputted by the display part 42.

(2) Functional Configuration Relating to Virtual Viewpoint Image Generating Operation In the present embodiment, an explanation will be given by exemplifying a case where, with respect to the T1 image and the T2 image, the same objects are captured respectively, with the same background being contained therein. However, in order to realize a virtual viewpoint image generating operation relating to the present embodiment, it is only necessary to satisfy at least either one of two conditions, that is, the fact that the T1 image and the T2 image are derived from image-capturing of the same object, and the fact that the images are derived from image-capturing of the same background.

FIG. 2 is a view showing a functional configuration of an information processing apparatus 4 relating to a virtual viewpoint image generating operation. In this case, an explanation will be given supposing that the functional configuration of the control part 46 is achieved by executing a program; however, the configuration may be realized by an exclusively-used hardware configuration.

As shown in FIG. 2, the control part 46 is provided with an image acquiring part 461, a distance information acquiring part 462, a virtual viewpoint image generation part 463, an occlusion compensation part 464, and a stereoscopic view image generation part 465 as functional configurations. The following description will discuss the respective parts 461 to 465 successively.

<(2-1) Image Acquiring Part>

The image acquiring part 461 acquires a T1 image and a T2 image successively obtained by the camera 2 from the camera 2. After having been once stored in the storage part 44 from the camera 2, the T1 image and the T2 image may be acquired by the image acquiring part 461. In this case, the explanation will be given by exemplifying a configuration in which the position and posture (that is, image-capturing direction) of the camera 2 are fixed, with the T1 viewpoint and T2 viewpoint being identical to each other.

Figure 4:
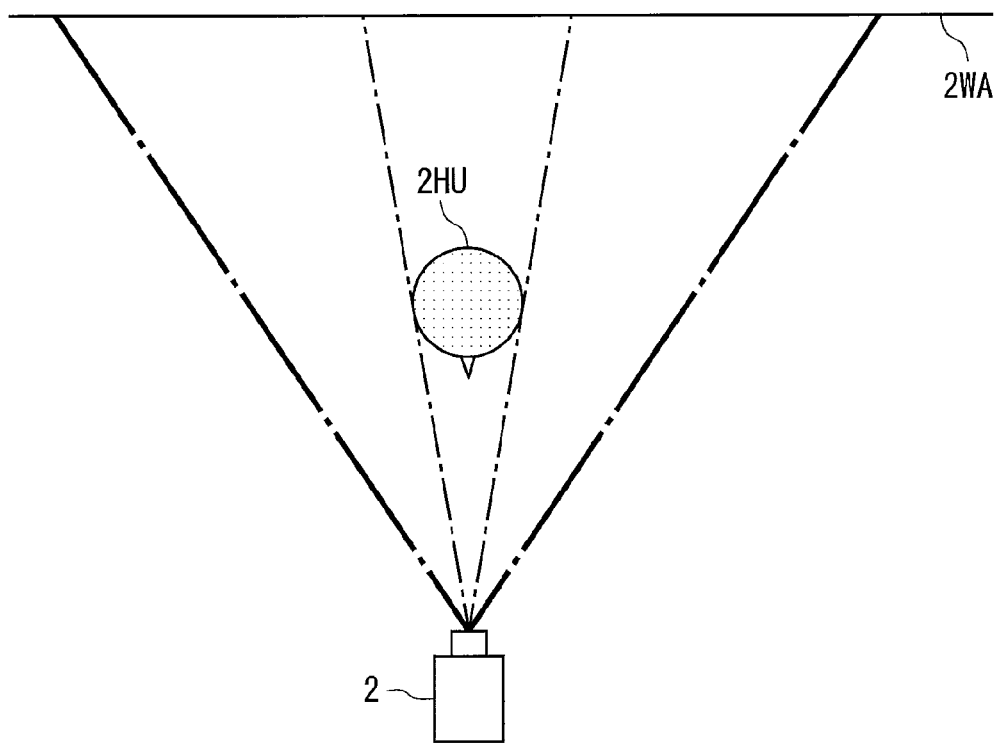
FIG. 4 is a schematic view illustrating image-capturing conditions of the T1 image.

FIG. 3 is an image view illustrating a T1 image G1, and FIG. 4 is a schematic view illustrating image-capturing conditions of the T1 image G1.

In order to avoid complexity of the view, FIG. 3 illustrates, as the T1 image G1, an image composed of an area (hereinafter, referred to as a "T1 object area") A11 capturing a head portion 2HU of a person serving as an object of a near view; and an area (hereinafter, referred to as a "T1 background area") A12 capturing a background 2WA. In other words, the subject is composed of the head portion 2HU and the background 2WA. Moreover, it is supposed that in the T1 image G1, the position in the lateral direction (more specifically, address) is indicated by an X coordinate and the position in the longitudinal direction (more specifically, address) is indicated by a Y coordinate, with the pixel on the upper left end serving as the origin. Hereinafter, with respect to the other respective images shown after FIG. 4, images having the same configuration are exemplified so as to give explanations.

In FIG. 4, a schematic view obtained by viewing the layout relationship among the camera 2, the head portion 2HU, and the background 2WA from above is shown. Moreover, in FIG. 4, an outer edge of a space area (hereinafter, referred to also as an "image capture area") capable of being image-captured by the camera 2 is indicated by a thick one-dot chain line and an outer edge of an optical path (hereinafter, referred to also as a "near view optical path") of light that is made incident on the camera 2 from the head portion 2HU serving as a near view to the camera 2 is indicated by a thin one-dot chain line.

As shown in FIGS. 3 and 4, the T1 image G1 is obtained by an image-capturing process by the camera 2 from the front side of the head portion 2HU.

Figure 5:
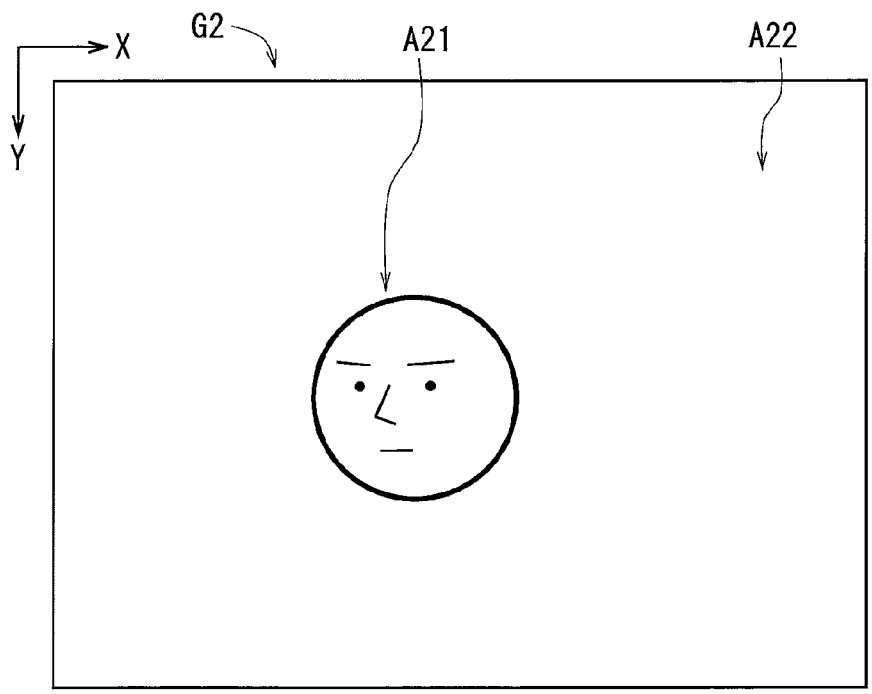
FIG. 5 is an image view illustrating a T2 image.
Figure 6:
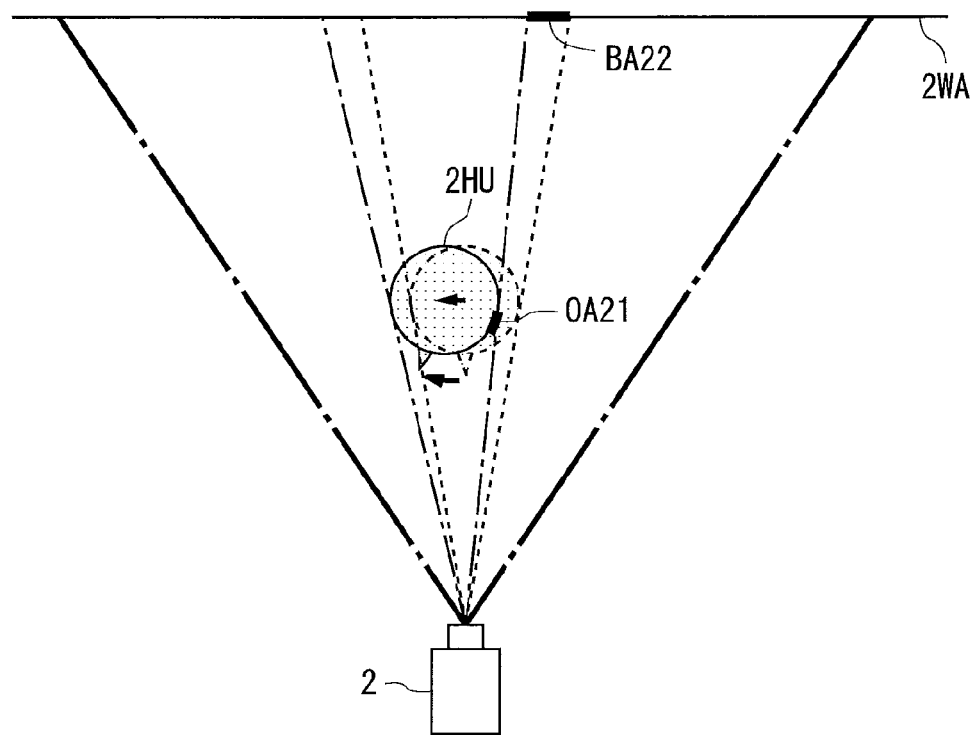
FIG. 6 is a schematic view illustrating image-capturing conditions of the T2 image.

FIG. 5 is an image view illustrating a T2 image G2, and FIG. 6 is a schematic view illustrating image-capturing conditions of the T2 image G2.

In the same manner as in FIG. 4, FIG. 6 shows a schematic view in which the layout relationship among the camera 2, the head portion 2HU, and the background 2WA is viewed from above, and an outer edge of an image capture area by the camera 2 is indicated by a thick one-dot chain line and an outer edge of the near view optical path relating to the head portion 2HU is indicated by a thin one-dot chain line. Moreover, the position of the head portion 2HU and the outer edge of the near view optical path relating to the head portion 2HU at the time of image-capturing the T1 image G1 are indicated by thin broken lines.

As shown in FIG. 6, the T2 image G2 is obtained by an image-capturing process in a state after the head portion 2HU has been slightly shifted leftward when viewed from the camera 2 in comparison with the image capture time of the T1 image G1, as well as after it has been rotated clockwise by a slight angle (for example, about 20 degrees) when viewed from above. In this case, in order to avoid complexity of the explanation, the explanation is given by exemplifying a case where the head portion 2HU is shifted only within the horizontal plane and is rotated only centered on a vertical axis.

As shown in FIGS. 5 and 6, the T2 image G2 is obtained by an image-capturing process by the camera 2 from a diagonally front side of the head portion 2HU, and is composed of an area (hereinafter, referred to also as a "T2 object area") A21 capturing a head portion 2HU and an area (hereinafter, referred to as a "T2 background area") A22 capturing a background 2WA.

<(2-2) Distance Information Acquiring Part>

The distance information acquiring part 462 acquires T1 distance information and T2 distance information successively obtained by the distance measuring device 3, from the distance measuring device 3. After having been once stored in the storage part 44 from the camera 2, the T1 distance information and the T2 distance information may be acquired by the distance information acquiring part 462.

<(2-3) Virtual Viewpoint Image Generation Part>

Based upon the T1 image G1 and the T1 distance information indicating a distance from the T1 viewpoint to each of portions of a subject, the virtual viewpoint image generation part 463 generates a T1 virtual viewpoint image in a pseudo manner. As described earlier, the T1 virtual viewpoint image is an image that can be acquired by an image-capturing process relating to the T1 virtual viewpoint different from the T1 viewpoint relating to the image-capturing process of the T1 image G1.

In this case, based upon the principle of triangular surveying, by shifting the position (coordinates relating to each pixel value) of each pixel of the T1 image G1, the T1 virtual viewpoint image is generated.

Figure 7:
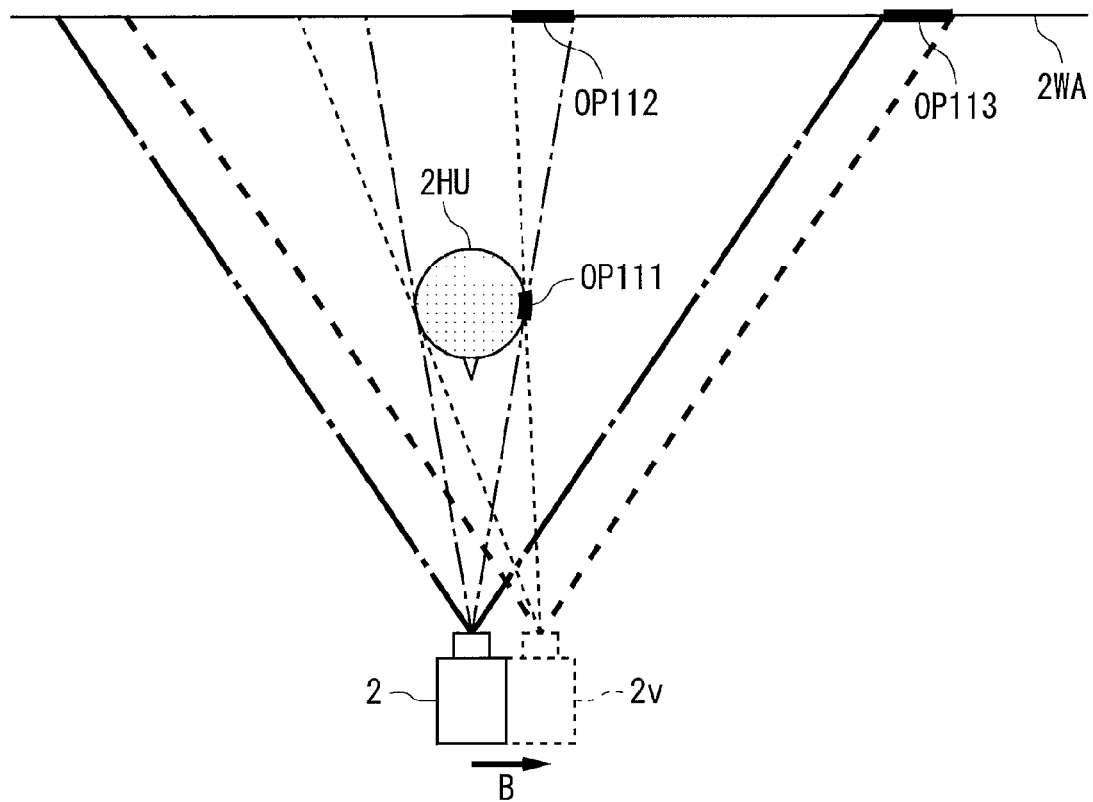
FIG. 7 is a schematic view illustrating virtual image-capturing conditions according to a T1 virtual viewpoint image.
Figure 8:
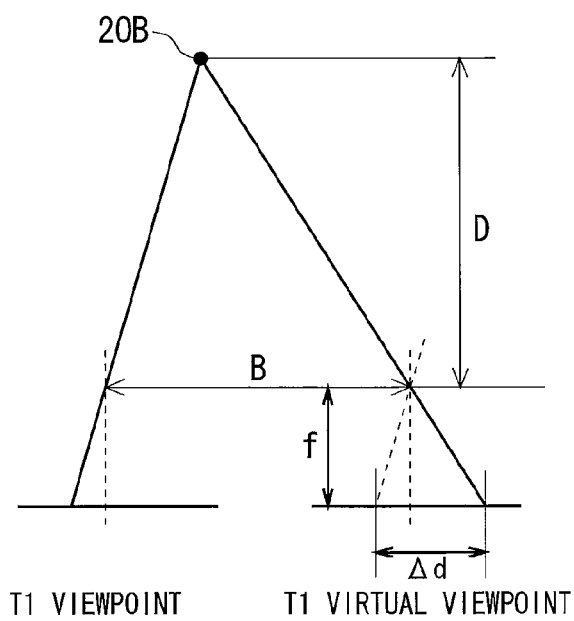
FIG. 8 is a view for describing a generation method for the T1 virtual viewpoint image.

FIG. 7 is a schematic view illustrating virtual image-capturing conditions relating to the T1 virtual viewpoint image. FIG. 8 is a view for describing a method for generating a T1 virtual viewpoint image from the T1 image G1 based upon the principle of triangular surveying.

In FIG. 7, a camera (hereinafter, referred to also as a "virtual camera") $2v$ virtually set at a T1 virtual viewpoint is indicated by a thin broken line, and with respect to the virtual camera $2v$, the outer edge of an image-capturing range is indicated by a thick broken line, with the outer edge of a near view light path relating to the head portion 2HU being indicated by a thin broken line. Additionally, FIG. 7 also shows image-capturing conditions of the T1 image G1 shown in FIG. 4 in combination.

In this case, supposing that the distance from the camera 2 (that is, the viewpoint) to a subject 20B is D, the separated distance between the T1 viewpoint and the T1 virtual viewpoint is B, the focal length of the lens of the camera 2 is f, and a deviation amount of pixels (parallax) obtained by capturing the same portion between the T1 image G1 and the T1 virtual viewpoint image is $\Delta d$, the relationship of the following equation (1) is satisfied.

$$D = f \times B / \Delta d \quad (1)$$

Of the equation (1), the separated distance B is univocally determined by virtually setting the position of the T1 virtual viewpoint relative to the position of the T1 viewpoint. The focal length f is determined by the designing of the camera 2. Moreover, the distance D is given by the T1 distance information. For this reason, the parallax $\Delta d$ is found for each of the pixels of the T1 image G1. Therefore, by shifting each pixel of the T1 image G1 in accordance with the parallax $\Delta d$, the T1 virtual viewpoint image is generated. In other words, the parallax $\Delta d$ corresponds to an amount of shift of each pixel generated at the time when the T1 virtual viewpoint image is generated from the T1 image G1.

Figure 9:
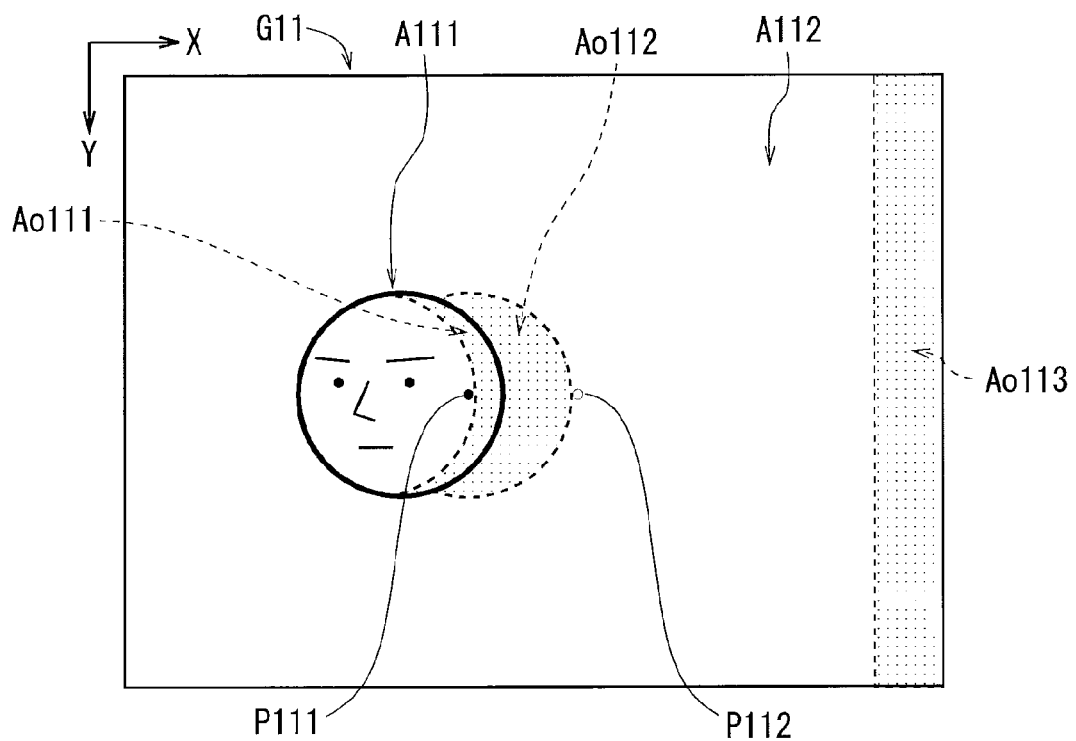
FIG. 9 is a view illustrating a T1 virtual viewpoint image including an occlusion area.

FIG. 9 is an image view illustrating a T1 virtual viewpoint image G11.

As shown in FIG. 9, the T1 virtual viewpoint image G11 is provided with an area (hereinafter, referred to also as a "T1 virtual object area") A111 capturing a head portion 2HU and an area (hereinafter, referred to also as a "T1 virtual background area") A112 capturing a background 2WA.

However, in the T1 virtual viewpoint image G11, pixels drop off following the shift of the pixels to cause an area where pixel values are indefinite (that is, an occlusion area). This occlusion area is a T1 non-image capture area corresponding to a portion of the subject that is not captured in the T1 image.

As the reasons for the occurrence of this occlusion area, the following three points are considered: (I) a change in angular relationships between the image-capturing direction and the direction in which an object in near distance is located, (II) a shift of a background hidden by the object located in near distance, and (III) a shift of the image-capturing range caused by the viewing angle of the camera 2.

For example, in the T1 virtual viewpoint image G11 shown in FIG. 9, three kinds of occlusion areas are caused, that is, (i) an occlusion area Ao111 in the T1 virtual object area A111 caused by the reason (I); (ii) an occlusion area Ao112 near the T1 virtual object area A111 within the T1 virtual background area A112 caused by the reason (II); and (iii) an occlusion area Ao113 near the right end of the T1 virtual background area A112 caused by the reason (III).

Additionally, in FIG. 7, portions OP111 to OP113 corresponding to the three occlusion areas Ao111 to Ao113 are indicated by thick lines. Of the occlusion areas Ao111 to Ao113, the occlusion area Ao113 is recognized as a portion that is univocally distinguished from the relationship between the separated distance B and the viewing angle.

<(2-4) Occlusion Compensation Part>

The occlusion compensation part 464 carries out a process for compensating the pixel values relating to the occlusion area corresponding to a portion of a subject that is not captured in the T1 image G1 of the T1 virtual viewpoint image in accordance with the T2 image G2 (hereinafter, referred to also as a "pixel value compensation process"). With respect to a method (pixel value compensating method) for realizing the pixel value compensation process, there are various variations. As specific examples, the following description will discuss first and second compensating methods successively.

<(2-4-1) First Compensating Method>

Figure 10:
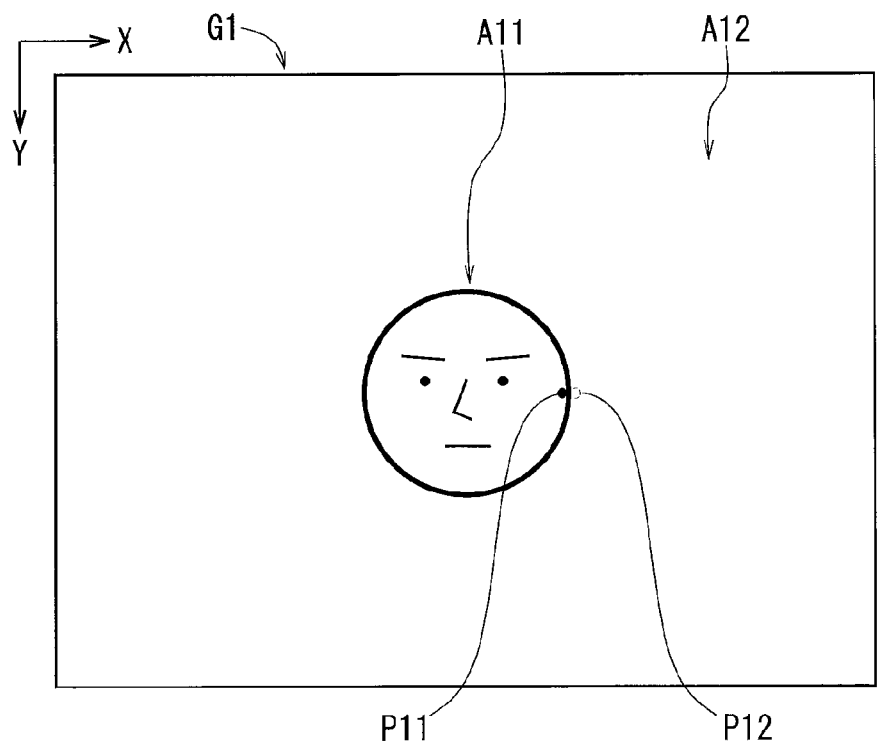
FIG. 10 is a view for describing a first compensating method.
Figure 11:
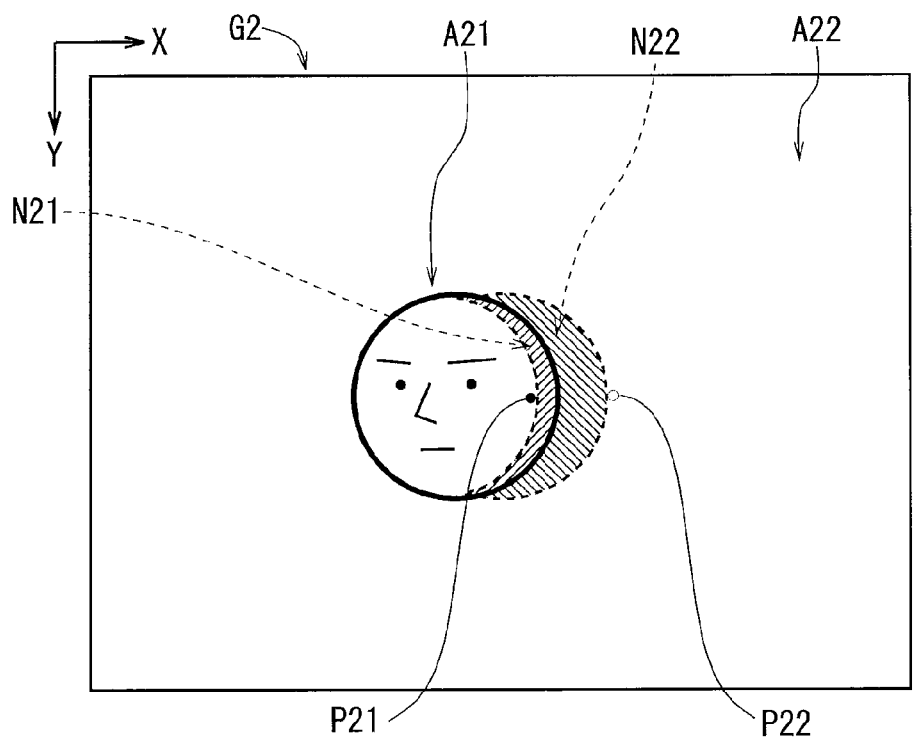
FIG. 11 is a view for describing the first compensating method.
Figure 12:
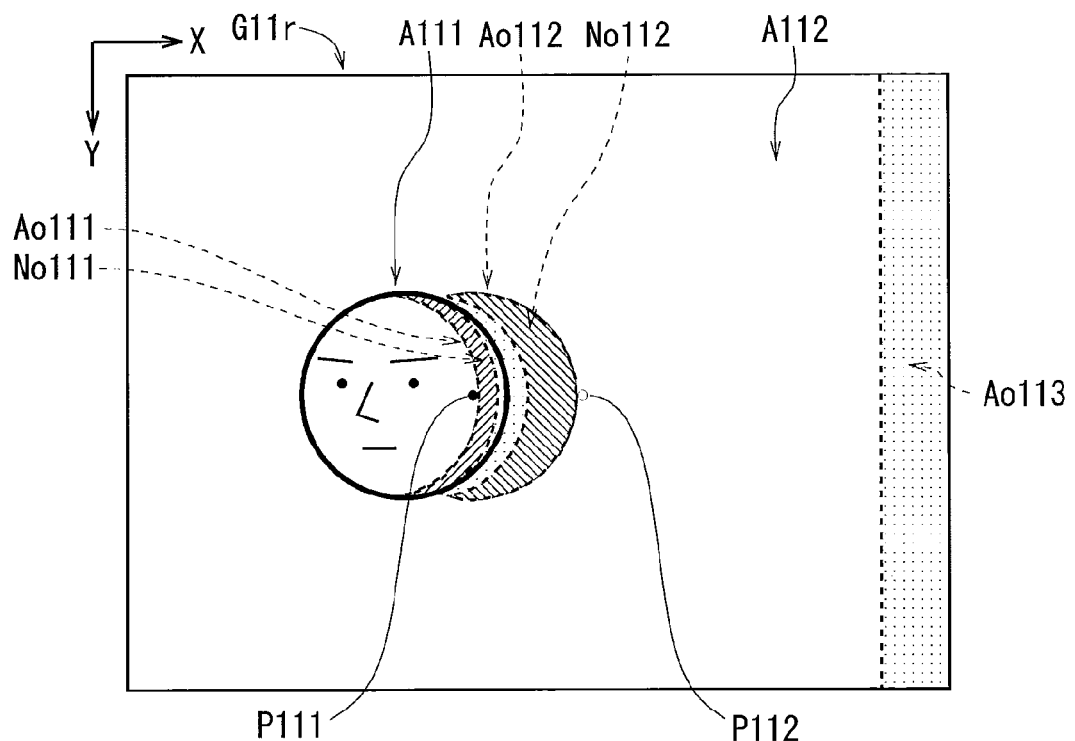
FIG. 12 is an image view showing a T1 virtual viewpoint image having compensated pixel values.

FIGS. 10 to 12 are views that explain the first compensating method.

FIG. 10 is a view in which with respect to the T1 image G1 (FIG. 3), a point P11 within the T1 object area A11 (point indicating a pixel on the right end within the T1 object area A11 in this case) and a point P12 within the T1 background area A12 (point indicating a pixel adjacent to the point P11 within the T1 background area A12 in this case) are given for purposes of convenience.

FIG. 11 is a view in which with respect to the T2 image G2 (FIG. 5), a point P21 indicating a pixel derived from the same captured portion as the portion of the subject captured in the pixel of the point P11 of the T1 image G1 and a point P22 indicating a pixel derived from the same captured portion as the portion of the subject captured in the pixel of the point P12 of the T1 image G1 are given for purposes of convenience.

In this case, as shown in FIG. 6, from time T1 to time T2, the head portion 2HU is shifted leftward when viewed from the camera 2, with the direction of the head portion 2HU being changed. At this time, in the T2 image G2, a portion (hereinafter, referred to also as an "object appearing portion") OA21 of the head portion 2HU and a portion (hereinafter, referred to also as a "background appearing portion") BA22 of the background 2WA that are not captured in the T1 image G1 are captured. Additionally, in FIG. 6, the object appearing portion OA21 and the background appearing portion BA22 are indicated by thick lines.

In FIG. 11, an area (hereinafter, referred to also as a "T2 object appearing area") N21 that captures the object appearing portion OA21 is indicated by hatched portion with slanting lines, and an area (hereinafter, referred to also as a "T2 background appearing area") N22 that captures the background appearing portion BA22 is indicated by hatched portion with slanting lines.

In the first compensating method, pixel values relating to the respective pixels within the T2 object appearing area N21 and the T2 background appearing area N22 are added to the respective pixels of the occlusion areas Ao111 and Ao112 of the T1 virtual viewpoint image G11 (FIG. 9).

More specifically, by a recognition part that is functionally realized in the occlusion compensation part 464, a correlation process of pixels between the T1 image G1 and the T2 image G2 is carried out so that an area (hereinafter, referred to also as a "non-corresponding area") of the T2 image G2 that does not correspond to the T1 image G1 is recognized. The "correlation process of the pixels" mentioned here is a process in which, for example, with respect to the respective pixels contained in the T1 image G1, the pixel capturing the same subject is retrieved from the T2 image G2, and this process is achieved by using conventional methods referred to as a so-called SAD (Sum of Absolute Difference) method, a POC (Phase-only Correlation) method, or the like.

The non-corresponding area to be recognized in this case includes the T2 object appearing area N21 and the T2 background appearing area N22. By taking into consideration a difference between the distance from the camera 2 to the head portion 2HU and the distance from the camera 2 to the background 2WA, the T2 object appearing area N21 and the T2 background appearing area N22 can be recognized in a manner so as to be distinguished from each other based upon the T2 distance information. Additionally, the correspondence relationship between the point P11 in the T1 object area A11 and the point P21 in the T2 object area A21, that is, the shifted amount of the object between time T1 and time T2 can be found.

Next, based upon the T2 distance information, a process in which pixels of the T2 object appearing area N21 and pixels of the occlusion area Ao111 are correlated with each other (hereinafter, referred to also as an "object correlation process") and a process in which pixels of the T2 background appearing area N22 and pixels of the occlusion area Ao112 are made correlated with each other (hereinafter, referred to also as a "background correlation process") are carried out.

In this case, since the camera 2 is in a fixed condition, in the background correlation process, for example, a parallax (shift amount) $\Delta d$ is calculated from the T2 distance information and the equation (1) with respect to each of the pixels of the T2 background appearing area N22, and according to the shift amount $\Delta d$, the pixels are correlated with each other. Moreover, in the object correlation process, in the case of a simplified process having no deviation amount (that is, shift amount according to an elapsed period of time) between the point P11 and the point P21, the same process as the background correlation process is carried out.

More specifically, first, with respect to an image obtained by an image-capturing process of time T, it is supposed that the X-coordinate of each arbitrary pixel is represented by x, the Y-coordinate thereof is represented by y, and the coordinates relating to each pixel are represented by (x, y, T), and moreover, the pixel value relating to each pixel is represented by I (x, y, T). At this time, supposing that the distance from a T2 viewpoint to each of the portions of the object appearing portion OA21 included in the T2 distance information is $D_f$, and that the distance from the T2 viewpoint to each of the portions of the background appearing portion BA22 is $D_h$, a shift amount $\Delta d_f$ relating to each pixel in the T2 object appearing area N21 is found by substituting the distance $D_f$ for D of the equation (1), and a shift amount $\Delta d_h$ relating to each pixel in the T2 background appearing area N22 is found by substituting the distance $D_h$ for D of the equation (1).

In this case, supposing that coordinates relating to an arbitrary pixel within the T2 object appearing area N21 are represented by $(x_{N21}, y_{N21}, T2)$, this pixel is made correlated with a pixel whose coordinates within the occlusion area Ao111 are represented by $(x_{N21}-\Delta d_f, y_{N21}, T1)$. Moreover, supposing that coordinates relating to an arbitrary pixel within the T2 background appearing area N22 are represented by $(x_{N22}, y_{N22}, T2)$, this pixel is made correlated with a pixel having coordinates $(x_{N22}-\Delta d_h, y_{N22}, T1)$ within the occlusion area Ao112. These correlation processes of the pixels are carried out on the respective pixels within the occlusion areas Ao111 and Ao112.

Moreover, based upon the results of the correlation processes of pixels, to the pixel having coordinates $(x_{N21}-\Delta d_f, y_{N21}, T1)$ within the occlusion area Ao111, the pixel value I $(x_{N21}, y_{N21}, T2)$ relating to the pixel having coordinates $(x_{N21}, y_{N21}, T2)$ within the T2 object appearing area N21 is given. Furthermore, to the pixel having coordinates $(x_{N22}-\Delta d_h, y_{N22}, T1)$ within the occlusion area Ao112, the pixel value I $(x_{N22}, y_{N22}, T2)$ relating to the pixel having coordinates $(x_{N22}, y_{N22}, T2)$ within the T2 background appearing area N22 is given.

By carrying out these adding processes of pixel values on the respective pixels within the occlusion areas Ao111 and Ao112, the pixel value compensation process is completed.

FIG. 12 shows a T1 virtual viewpoint image G11r to be generated by carrying out pixel value compensation processes on the T1 virtual viewpoint image G11. The T1 virtual viewpoint image G11r corresponds to an image formed by adding an area No111, obtained by adding the pixel value relating to the T2 object appearing area N21 to the occlusion area Ao111; and an area No112, obtained by adding the pixel value relating to the T2 background appearing area N22 to the occlusion area Ao112, based upon the T1 virtual viewpoint image G11 shown in FIG. 9. In FIG. 12, the areas No111 and No112 are respectively indicated by hatched portions with slanting lines.

Additionally, FIG. 12 illustrates the T1 virtual viewpoint image G11r in which an occlusion area Ao113 remains. For this reason, for example, an image having a rectangular outer edge having such a size as not to include the occlusion area Ao113 may be generated from the T1 virtual viewpoint image G11r, and according to this size, an image having a rectangular outer edge having the same size may be generated from the T1 image G1. Moreover, another configuration may be proposed in which to the occlusion area Ao113, the same pixel values as pixel values relating to the peripheral pixels may be added.

In the case where there is a deviation amount (that is, shift amount according to an elapsed period of time) between the point P11 and the point P21, the object correlation process is preferably prepared as a process to which the shift amount is included. In such an object correlation process, for example, supposing that the shift amount between the point P11 and the point P21 is represented by $\Delta d_{fT}$, a pixel having coordinates $(x_{N21}, y_{N21}, T2)$ within the T2 object appearing area N21 is made correlated with a pixel having coordinates $(x_{N21}-\Delta d_f - \Delta d_{fT}, y_{N21}, T1)$ within the occlusion area Ao111.

In this configuration, from the viewpoint of improving the precision of the object correlation process, the pixel of the point P21 is preferably a pixel near the T2 object appearing area N21, and this may be, for example, an adjacent pixel to the T2 object appearing area N21 or may be a pixel within a range having predetermined number of pixels from the T2 object appearing area N21. As the predetermined number, for example, several pieces or the like are proposed, or this may be set based upon the relation between the distance from the T2 viewpoint to the subject and the resolution.

Moreover, within the occlusion areas Ao111 and Ao112, to each of pixels in an area with no pixel values added thereto by the pixel value compensation process, a pixel value may be added by using an interpolating process using pixel values of pixels in the vicinity thereof.

FIG. 13 is a flow chart that exemplifies an operation flow of the pixel value compensation process to be achieved in the information processing system 1.

As shown in FIG. 13, first, at time T1, a T1 image G1 is acquired (step ST1) by the image acquiring part 461 according to an image-capturing operation by a camera 2, and T1 distance information is obtained (step ST2) by the distance information acquiring part 462 according to a distance measuring operation by the distance measuring device 3. Next, at time T2, a T2 image G2 is acquired (step ST3) by the image acquiring part 461 according to an image-capturing operation by the camera 2, and T2 distance information is obtained (step ST4) by the distance information acquiring part 462 according to a distance measuring operation by the distance measuring device 3. Thereafter, based upon the T1 image G1 and T1 distance information, a T1 virtual viewpoint image is generated (step ST5) by the virtual viewpoint image generation part 463. Then, an addition of a pixel value to each of the pixels of the occlusion areas Ao111 and Ao112 is carried out (step ST6) by the occlusion compensation part 464.

Additionally, with respect to a large number of images obtained by the camera 2 at three or more timings, images (virtual viewpoint image) having viewpoints that are virtually made different from one another may be obtained.

Moreover, another configuration may be proposed in which pixel values are given to the respective pixels of at least one area of the occlusion areas Ao111 and Ao112.

For example, in the case where no rotation occurs in the head portion 2HU, with no T2 object appearing area N21 being caused, pixel values may be added only to the respective pixels of the occlusion area Ao112 relating to the background 2WA.

Figure 14:
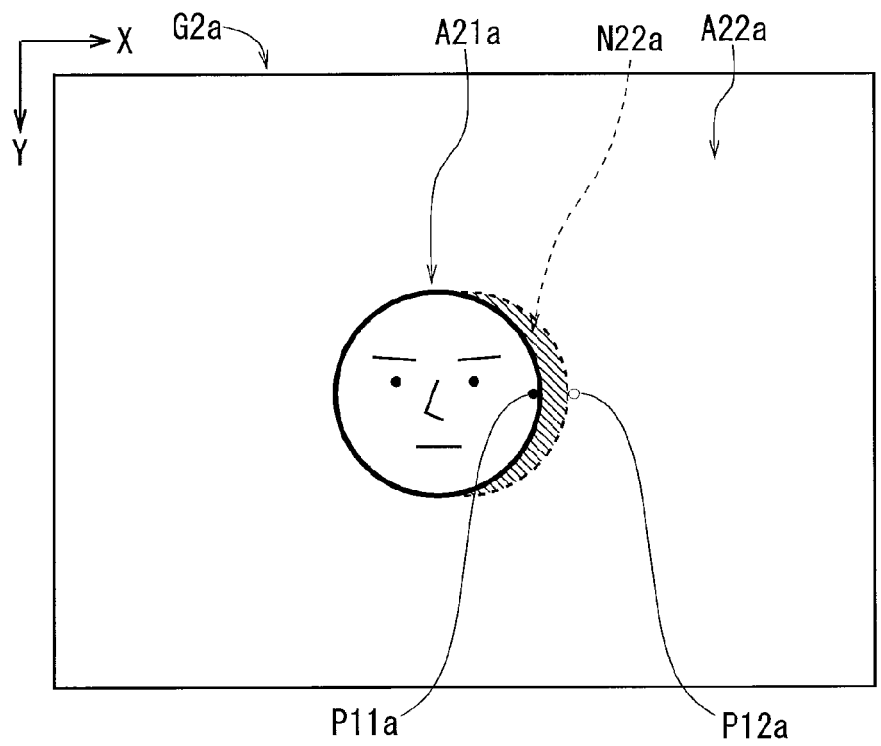
FIG. 14 is an image view illustrating a T2 image.
Figure 15:
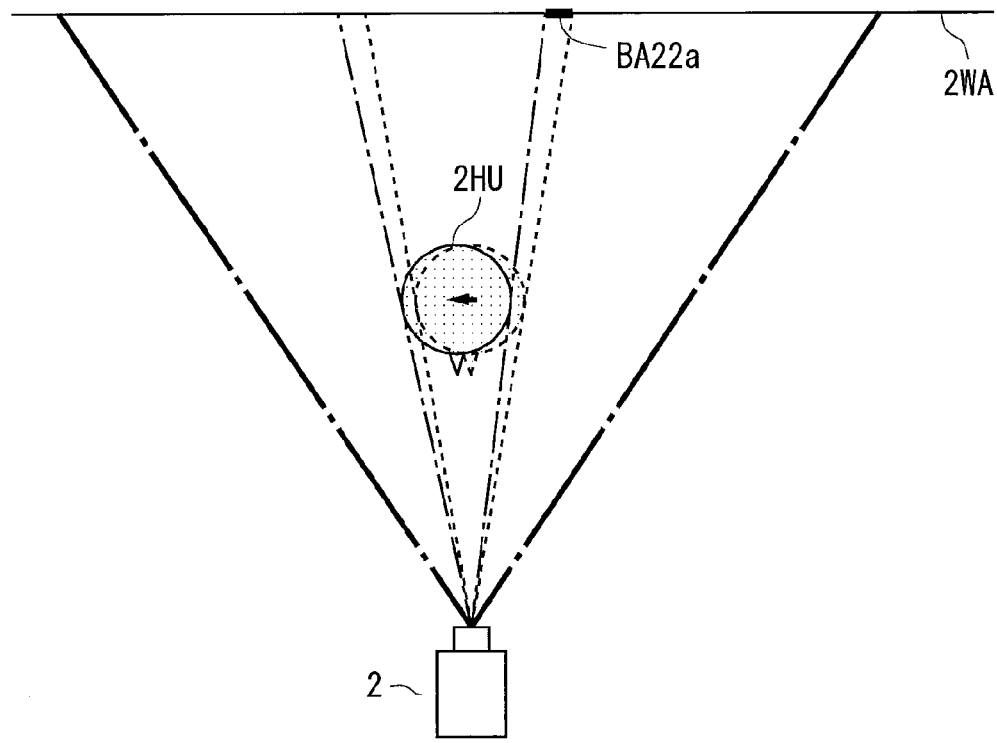
FIG. 15 is a schematic view illustrating image-capturing conditions of the T2 image.

FIG. 14 is an image view illustrating a T2 image G2a obtained by the image-capturing process in a state after the head portion 2HU has been slightly shifted leftward from time T1 to time T2, when viewed from the camera 2. FIG. 15 is a schematic view illustrating image-capturing conditions of the T2 image G2a.

In FIG. 15, in the same manner as in FIGS. 4 and 6, a schematic view in which the layout relationship among the camera 2, the head portion 2HU, and the background 2WA is viewed from above, and the outer edge of an image-capturing available area of the camera 2 is indicated by a thick one-dot chain line, and an outer edge of the near view optical path relating to the head portion 2HU is indicated by a thin one-dot chain line. Moreover, the position of the head portion 2HU and the outer edge of the near view optical path relating to the head portion 2HU at time T1 are indicated by thin broken lines.

As shown in FIGS. 14 and 15, the T2 image G2a is composed of a T2 object area A21a capturing the head portion 2HU and a T2 background area A22a capturing the background 2WA. In the T2 image G2a, a T2 background appearing area N22a is generated. In FIG. 15, a portion BA22a corresponding to the T2 background appearing area N22a is indicated by a thick line. In this case, based upon pixel values of the T2 background appearing area N22a, pixel values are added to the respective pixels of the occlusion area Ao112. However, no pixel value corresponding to the occlusion area Ao111 is obtained from the T2 image G2a.

Figure 16:
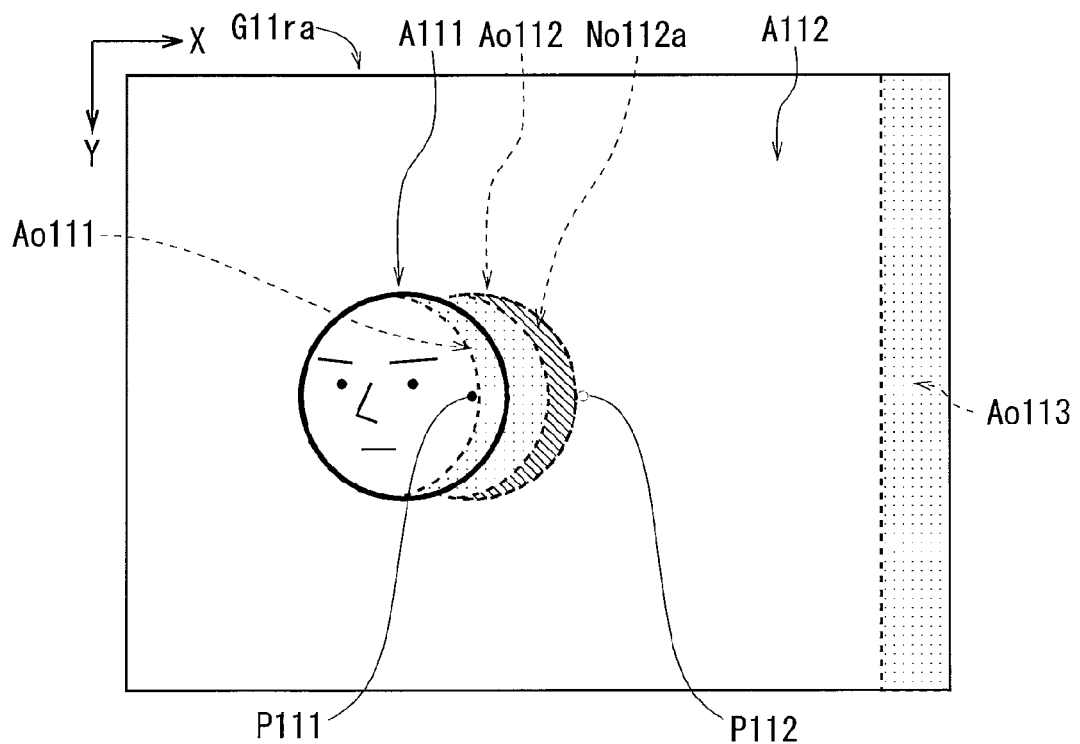
FIG. 16 is an image view showing a T1 virtual viewpoint image having compensated pixel values.

FIG. 16 is a view illustrating a T1 virtual viewpoint image G11ra after having been subjected to an image value compensation process. Based upon the T1 virtual viewpoint image G11 shown in FIG. 9, the T1 virtual viewpoint image G11ra is formed by adding an area No112a to which pixel values relating to the T2 background appearing area N22a have been added to the occlusion area Ao112. In FIG. 16, the area No112a is indicated by a hatched portion with slanting lines.

Moreover, in the case where, for example, depending on the movements of the head portion 2HU, no T2 background appearing area N22 is generated, it is only necessary to add pixel values to the respective pixels of the occlusion area Ao111 relating to the head portion 2HU.

Figure 17:
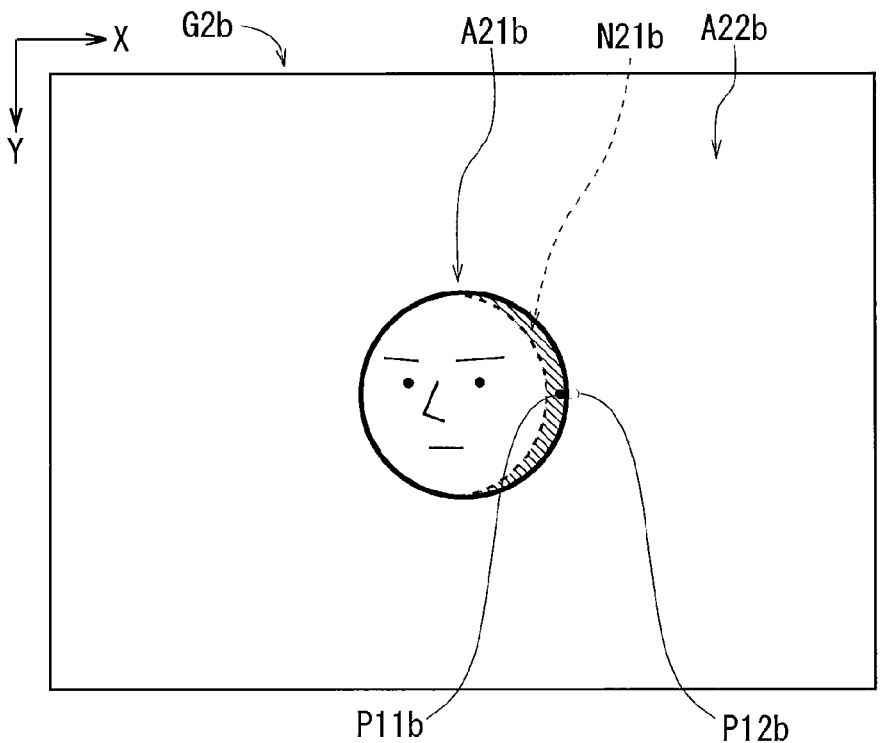
FIG. 17 is an image view illustrating a T2 image.
Figure 18:
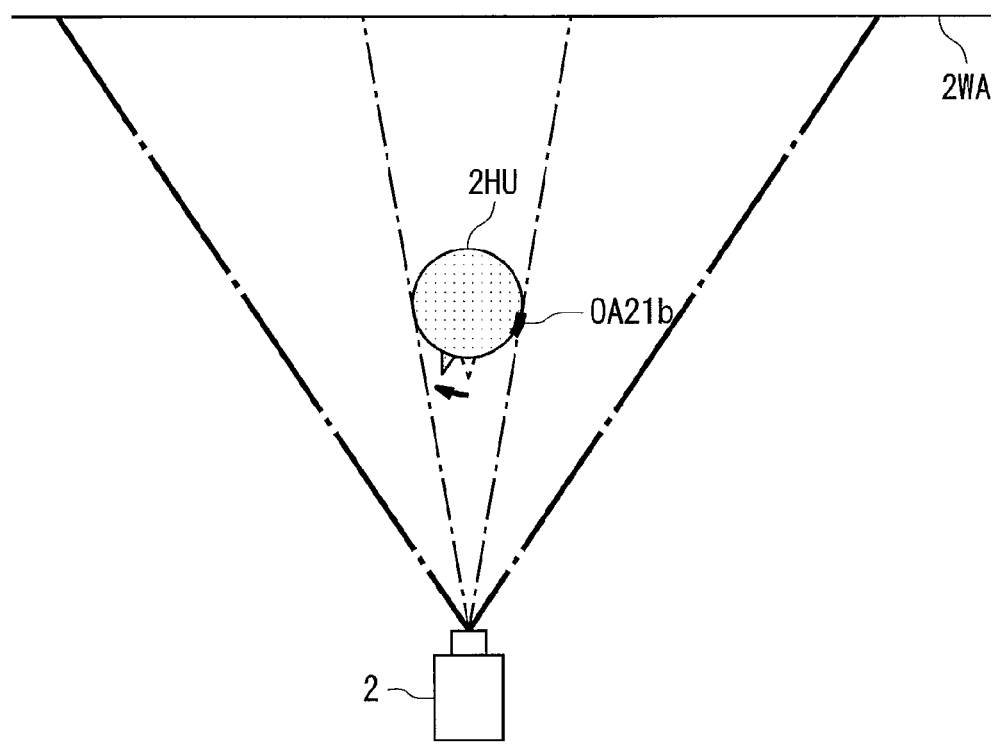
FIG. 18 is a schematic view illustrating image-capturing conditions of the T2 image.

FIG. 17 is an image view illustrating a T2 image G2b obtained by image-capturing process in a state after the head portion 2HU has been rotated clockwise by a slight angle (for example, about 20 degrees) from time T1 to time T2, when viewed from above. FIG. 18 is a schematic view illustrating image-capturing conditions of the T2 image G2b.

In the same manner as in FIGS. 4, 6 and 15, FIG. 18 shows a schematic view in which the layout relationship among the camera 2, the head portion 2HU, and the background 2WA is viewed from above, and the outer edge of an image-capturing available area of the camera 2 is indicated by a thick one-dot chain line, and an outer edge of the near view optical path relating to the head portion 2HU is indicated by a thin one-dot chain line. Moreover, the position of the head portion 2HU at time T1 is indicated by a thin broken line, and the outer edge of the near view optical path relating to the head portion 2HU at time T1 becomes substantially the same as the outer edge of the near view optical path relating to the head portion 2HU at time T2.

As shown in FIGS. 17 and 18, the T2 image G2b is composed of a T2 object area A21b capturing the head portion 2HU and a T2 background area A22b capturing the background 2WA. In the T2 image G2b, a T2 object appearing area N21b is generated. In FIG. 18, a portion OA21b corresponding to the T2 background appearing area N21a is indicated by a thick line. In this case, based upon pixel values of the T2 object appearing area N21b, pixel values are added to the respective pixels of the occlusion area Ao111. However, no pixel value corresponding to the occlusion area Ao112 is obtained from the T2 image G2b.

Figure 19:
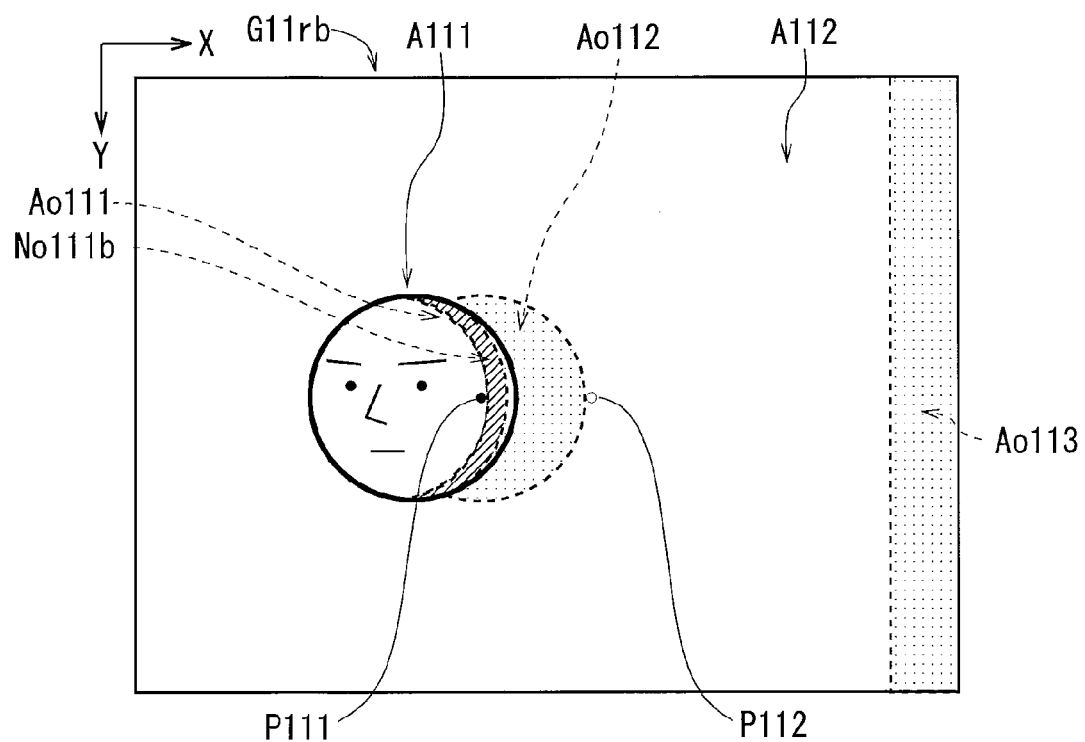
FIG. 19 is an image view showing a T1 virtual viewpoint image having compensated pixel values.

FIG. 19 is a view illustrating a T1 virtual viewpoint image G11rb after having been subjected to an image value compensation process. Based upon the T1 virtual viewpoint image G11 shown in FIG. 9, the T1 virtual viewpoint image G11rb is formed by adding an area No111b to which pixel values relating to the T2 object appearing area N21b have been added to the occlusion area Ao111. In FIG. 19, the area No111b is indicated by a hatched portion with slanting lines.

As described above, in the pixel value compensation process relating to the first compensating method, the pixel value relating to each of the pixels in the T1 non-image capture area in the T1 virtual viewpoint image G11 is compensated based upon the T2 image G2 having different image capture time. For this reason, a T1 virtual viewpoint image (hereinafter, referred to also as a "compensated T1 virtual viewpoint image") after having been subjected to a pixel value compensation process, which does not cause any visually uncomfortable feeling, can be generated.

<(2-4-2) Second Compensating Method>

In a second compensating method, in comparison with the first compensating method, the object correlation process and the background correlation process can be carried out more precisely. Additionally, except for the object correlation process and the background correlation process, the second compensating method has the same processes as those of the first compensating method. The following description will discuss the second compensating method, and explain the object correlation process and background correlation process that are different from the first compensating method, and with respect to the portions that are the same as those of the first compensating method, overlapped explanations will be omitted.

In the second compensating method, since an object correlation process and a background correlation process are carried out in similar methods, the object correlation process and the background correlation process are generally referred to as a "correlation process" collectively in the following description.

In this case, coordinates of an arbitrary pixel within the T2 object appearing area N21 and the T2 background appearing area N22 are defined as $(x_{N2}, y_{N2}, T2)$. Moreover, an area corresponding to the T1 image G1 within the T2 image G2, that is, an area obtained by capturing the same portion as the portion of a subject captured in the T1 image G1 is referred to as a "corresponding area". Moreover, of the T2 object area A21, an area obtained by capturing the same portion as the portion of a subject captured in the T1 object area A11 is referred to as an "object corresponding area", and of the T2 background area A22, an area obtained by capturing the same portion as the portion of a subject captured in the T1 background area A12 is referred to as a "background corresponding area". Here, the "object corresponding area" and the "background corresponding area" are generally referred to as a "corresponding area".

In the correlation process relating to the second compensating method, first, as a first step, a pixel capturing a portion of a subject that satisfies the following three conditions (more specifically, conditions 1 to 3) is set as a point forming the reference in the correlation process.

(Condition 1) To be a portion of the subject captured in the T1 image G1.

(Condition 2) Of the T2 image G2, to be a portion of a subject captured in a pixel (neighboring pixel) positioned near a pixel (hereinafter, referred to as a "T2 process target pixel") having coordinates $(x_{N2}, y_{N2}, T2)$ that is a target for the correlation process.

(Condition 3) To be a portion of a subject having substantially the same separated distance from the camera 2 as that of the portion of the subject captured in the T2 process target pixel (hereinafter, referred to also as a "T2 process target point").

More specifically, by the portion functioning as a setting part of the occlusion compensation part 464, a pixel that satisfies the above-mentioned three conditions (more specifically, conditions 1 to 3) within the corresponding area is set as a T2 reference pixel (hereinafter, referred to also as a "T2 reference point"). In this case, the coordinates of the T2 reference point are represented as $(x_2, y_2, T2)$. For example, when the T2 process target point is included in the T2 object appearing area N21, the point P21 (FIG. 11) or the like is set as the T2 reference point, and when the T2 process target point is included in the T2 background appearing area N22, the point P22 (FIG. 11) or the like is set as the T2 reference point.

Additionally, as the "neighboring pixel" of the above-mentioned condition 2, any pixel may be used as long as it is assumed as a pixel capturing the same object (or the same background) as the pixel of the T2 process target point.

For example, in the case where the T2 process target point is included in the T2 object appearing area N21, the neighboring pixel may be any pixel within the object corresponding area. From the viewpoint of improving the precision of the object correlation process, the neighboring pixel is preferably selected as a pixel that has a short separated distance from the T2 process target point and is located near the T2 object appearing area N21. Therefore, the neighboring pixel may be an adjacent pixel to the T2 object appearing area N21, or may be a pixel within a range having a predetermined number of pixels from the T2 object appearing area N21. As the predetermined number, for example, several pieces or the like are proposed, or this may be set based upon the relation between the distance From the T2 view point to the subject and the resolution.

Moreover, in the case where the T2 process target point is included in the T2 background appearing area N22, the neighboring pixel may be any pixel within the background corresponding area. From the viewpoint of improving the precision of the background correlation process, the neighboring pixel is preferably selected as a pixel that has a short separated distance from the T2 process target point and is located near the T2 background appearing area N22. Therefore, the neighboring pixel may be an adjacent pixel to the T2 background appearing area N22, or may be a pixel within a range having a predetermined number of pixels from the T2 background appearing area N22. As the predetermined number, for example, several pieces or the like are proposed, or this may be set based upon the relation between the distance from the T2 view point to the subject and the resolution.

With respect to "substantially the same separated distance from the camera 2" of the condition 3, the range to be permitted as substantially the same range is different depending on the precision of the distance measuring; however, for example, a separated distance within a certain degree of range relative to the separated distance from the camera 2 to the portion of the subject captured in the pixel of the T2 process target point is included. This "certain degree of range" may be set to a range having a predetermined ratio (for example, several % to about 10%) relative to the separated distance from the camera 2 to the portion of the subject captured in the pixel of the T2 process target point, and from the viewpoint of improving the precision of the correlation process, the narrower the range, the better.

It is supposed that the pixel including the same portion of the subject as that of the T2 reference point of the first image G1 is a T1 reference pixel (hereinafter, referred to also as a "T1 reference point") and that the coordinates of the T1 reference point are represented by $(x_1, y_1, T1)$. For example, in the case where the T2 reference point is included in the T2 object area A21, the point P11 (FIG. 10) included in the T1 object area A11 is set as the T1 reference point, and in the case where the T2 reference point is included in the T2 background area A22, the point 12 (FIG. 10) included in the T1 background area A12 is set as the T1 reference point.

Moreover, it is supposed that the distance from the T1 viewpoint to the portion of the subject captured in the pixel on the T1 reference point is $D_1(T1)$, that the distance from the T2 viewpoint to the portion of the subject captured in the pixel on the T2 reference point is $D_2(T2)$ and that the distance from the T2 viewpoint to the portion of the subject captured in the pixel on the T2 process target point is $D_{N2}(T2)$. Moreover, within the occlusion areas Ao111 and Ao112, the pixel to be set as a target to which the pixel value on the T2 process target point is added is T1 compensation target pixel (hereinafter, referred to also as a "T1 compensation target point"), and that the coordinates of the T1 compensation target point are represented by $(x_{o11}, y_{o11}, T1)$.

The distance $D_1(T1)$ is obtained from T1 distance information, and the distance $D_2(T2)$ and distance $D_{N2}(T2)$ are obtained from T2 distance information. Moreover, supposing that the pixel capturing the same portion of the subject as that of the T1 reference point on the T1 virtual viewpoint image G11 is a T1 virtual reference pixel (hereinafter, referred to also as a "T1 virtual reference point") and that a difference (hereinafter, referred to also as a "T1 parallax") between the coordinates of the T1 reference point in the T1 image G1 and the coordinates of the T1 virtual reference point in the T1 virtual viewpoint image G11 is $\Delta d_{T1}$, the T1 parallax $\Delta d_{T1}$ is found by substituting the distance $D_1(T1)$ into the equation (1). Moreover, the coordinates of the T1 virtual reference point in the T1 virtual viewpoint image G11 are represented by $(x_1-\Delta d_{T1}, y_1, T1)$.

For example, when the T1 reference point is the point P11 (FIG. 10), the T1 virtual reference point becomes a point P111 (FIG. 9), and when the T1 reference point is the point P12 (FIG. 10), the T1 virtual reference point becomes a point P112 (FIG. 9).

Moreover, with respect to the coordinates of the T2 reference point, a parallax (hereinafter, referred to also as a "T2 parallax") found by substituting the distance $D_2(T2)$ into the equation (1) is defined as $\Delta d_{T2}$. In this case, it is assumed that an image (hereinafter, referred to as a "T2 virtual viewpoint image") which can be acquired by an image capturing process from the T2 virtual viewpoint is generated based upon the T2 image G2 and T2 distance information indicating the distance from the T2 viewpoint to each of the portions of a subject. Additionally, the positional relationship between the T1 viewpoint and the T1 virtual viewpoint and the positional relationship between the T2 viewpoint and the T2 virtual viewpoint are identical to each other. In this case, the T2 parallax $\Delta d_{T2}$ corresponds to a deviation amount of coordinates between the point (hereinafter, referred to also as a "T2 virtual reference point") capturing the same portion as that of the T2 reference point in the T2 virtual viewpoint image and the T2 reference point in the T2 image G2.

Moreover, in the T1 virtual viewpoint image G11, the pixel capturing the same portion of the subject as that of the T2 process target point is referred to as a T1 virtual process target pixel (hereinafter, referred to also as a "T1 virtual process target point"). This T1 virtual process target point corresponds to the T1 compensation target point.

Next, as the second step for the correlation process, the coordinates of the T1 compensation target point are found based upon processes according to the following calculation expressions.

More specifically, since the T1 viewpoint and the T1 virtual viewpoint have a positional relationship in which within a horizontal plane relative to the ground, they are deviated from each other by a certain distance in a direction perpendicular to the image capturing direction, the value $x_{o11}$ on the x coordinate of the T1 compensation target point has a relationship indicated by the following equation (2).

$$x_{o11} = \{x_1 - \Delta d_{T1}\} + (x_{N2} - x_2) + \{\Delta d_{T1} - \Delta d_{T2}\} \qquad (2).$$

In this case, the first term on the right side of the equation (2) represents the x coordinate of a pixel that does not belong to the occlusion area of the T1 virtual viewpoint image G11, and more specifically, indicates positional information of the T1 virtual reference point in the T1 virtual viewpoint image G11. More specifically, it corresponds to the x coordinate of the T1 virtual reference point corresponding to the T1 reference point in the T1 virtual viewpoint image G11.

The second term on the right side of the equation (2) indicates a difference (hereinafter, referred to as a "T2 deviation amount") in coordinates between the T2 reference point and the T2 process target point on the T2 image G2. That is, it indicates a relative positional relationship between the T2 reference point and the T2 process target point on the T2 image G2. Additionally, in the case where the distance from the T2 viewpoint to the portion of the subject captured in the T2 reference point and the distance from the T2 viewpoint to the portion of the subject captured in the T2 process target point are identical to each other, a difference in coordinates (hereinafter, referred to also as a "T1 virtual deviation amount") between the T1 virtual reference point and the T1 virtual process target point on the T1 virtual viewpoint image G11 becomes identical to the T2 deviation amount.

The third term on the right side of the equation (2) indicates a difference $(\Delta d_{T1} - \Delta d_{T2})$ between the T1 parallax $\Delta d_{T1}$ and the T2 parallax $\Delta d_{T2}$. If the T1 parallax $\Delta d_{T1}$ and the T2 parallax $\Delta d_{T2}$ are different from each other, there is a difference between the deviation amount (T2 deviation amount) between the T2 reference point and the T2 process target point on the T2 image G2 and the deviation amount (T1 virtual deviation amount) between the T1 virtual reference point and T1 virtual process target point on the T1 virtual viewpoint image G11. Therefore, the third term on the right side has a function of correcting the difference between the T2 deviation amount and the T1 virtual deviation amount.

By calculations according to the equation (2), correlation processes including an object correlation process and a background correlation process are realized. That is, the correlation processes are carried out so that each of the pixels of the occlusion areas Ao111 and Ao112, that is, the T1 compensation target point having coordinates $(x_{o11}, y_{o11}, T1)$, is made correlated with T2 process target point having coordinates $(x_{N2}, y_{N2}, T2)$.

According to the results of these correlation processes, the pixel value $I(x_{N2}, y_{N2}, T2)$ of the T2 process target point having coordinates $(x_{N2}, y_{N2}, T2)$ are added as pixel values of the T1 compensation target point having coordinates $(x_{o11}, y_{o11}, T1)$. That is, a relationship of $I(x_{o11}, y_{o11}, T1) = I(x_{N2}, y_{N2}, T2)$ is satisfied.

As described above, in the pixel value compensation process in the second compensating method, based upon the positional information of the T1 virtual reference point on the T1 virtual viewpoint image G11 and the relative positional relationship between the T2 reference point and the T2 process target point on the T2 image, the T1 compensation target point corresponding to the T2 process target point is specified on the T1 virtual viewpoint image G11. Moreover, the pixel value relating to the T2 process target point is added to the T1 compensation target point. For this reason, the pixel value relating to each of the pixels on the T1 non-image capture area can be found with high precision. As a result, it is possible to positively produce a compensated T1 virtual viewpoint image without causing any visually uncomfortable feeling.

Additionally, in the case where the T1 viewpoint and the T1 virtual viewpoint have a positional relationship in which within a plane perpendicular to the ground, they are deviated from each other by a certain distance in a direction perpendicular to the image capturing direction, with respect to the Y-coordinate, the similar equation as the equation (2) is set, the value of the Y-coordinate on the T1 compensation target point may be found. Moreover, in the case where the T1 viewpoint and the T1 virtual viewpoint have deviated positional relationships in a horizontal direction to the ground as well as in a perpendicular direction thereto, the similar equation as the equation (2) is set in each of the X-coordinate and the Y-coordinate so that values of the X-coordinate and the Y-coordinate of the T1 compensation target point may be found.

In the first step of the correlation process relating to the second compensating method, the T2 reference point is set so as to satisfy three conditions (more specifically, conditions 1 to 3); however, the T2 reference point may be set so as to satisfy two conditions, for example, except for the condition 3 (more specifically, conditions 1 and 2). However, from the viewpoint of improving the effect of correction by the use of the third term on the right side of the equation (2) so as to enhance the precision of the correlation process, the T2 reference point is preferably set so as to also satisfy the conditions 3.

<(2.5) Stereoscopic View Image Generation Part>

The stereoscopic view image generation part 465 generates a 3D image capable of providing a so-called stereoscopic view from the T1 image and the T1 virtual viewpoint image. Additionally, in the case where virtual viewpoint images whose viewpoints are virtually made different from one another are generated with respect to a number of images obtained by the camera 2 at three or more timings, based upon each of pairs between an image and its virtual viewpoint image relating to the same image capture time, 3D images in a mode of motion pictures can be generated. The 3D images generated in the stereoscopic view image generation part 465 are stored, for example, in either of the storage part 44 and storage medium 9. Moreover, the 3D images may be visually outputted on demand on the display part 42.

(3) Summary of the Present Embodiment

As described above, in the image processing system realized by the information processing system 1 according to one embodiment, the pixel value relating to each of pixels in an occlusion area on a T1 virtual viewpoint image G11 is compensated based upon a T2 image G2 obtained at a different image capture time. Therefore, it is possible to generate a compensated T1 virtual viewpoint image without causing any visually uncomfortable feeling. Consequently, it becomes possible to generate a 3D image that can be viewed three-dimensionally without causing any visually uncomfortable feeling.

Moreover, by correlating pixels between the T1 image G1 and the T2 image G2 with each other, the T2 object appearing area N21 and the T2 background appearing area N22 can be recognized. As a result, since the pixel value relating to each of the pixels in the occlusion area is easily found, a compensated T1 virtual viewpoint image without causing any visually uncomfortable feeling can be generated in a very short period of time.

Moreover, based upon positional information of the T1 virtual reference point in the T1 virtual viewpoint image G11 and a relative positional relationship between the T2 reference point and the T2 process target point in the T2 image G2, a T1 compensation target point corresponding to the T2 process target point is specified in the T1 virtual viewpoint image G11. For this reason, the pixel value relating to each of the pixels in the occlusion area can be found with high precision. As a result, a compensated T1 virtual viewpoint image without causing any visually uncomfortable feeling can be more positively generated.

(4) Modified Embodiment

The present invention is not intended to be limited by the above embodiments, and various changes and modifications may be made within the scope not departing from the gist of the present invention.

(4-1) Modified Embodiment Based Upon One Embodiment

⊙ For example, in the above one embodiment, information indicating a two-dimensional position on an image is mainly used so that the T1 compensation target point corresponding to the T2 process target point is specified; however, the present invention is not limited to this. For example, information indicating three-dimensional positions may be used so that the T1 compensation target point corresponding to the T2 process target point may be specified. Referring to specific examples, the following description will explain this configuration.

FIG. 20 is a view showing a functional configuration relating to a virtual viewpoint image generating operation of an information processing apparatus 4 according to one modified embodiment. In this case, an explanation will be given by exemplifying a configuration in which a program PGA stored in the storage part 44 is executed by the control part 46 so that the functional configuration of the control part 46 is realized; however, the functional configuration may be realized by an exclusively-used hardware configuration.

As shown in FIG. 20, the control part 46 is provided with an image acquiring part 461, a distance information acquiring part 462, a virtual viewpoint image generation part 463, an occlusion compensation part 464A, a stereoscopic view image generation part 465, an object estimation part 466 and an information updating part 467 as functional configurations. In this case, since the image acquiring part 461, the distance information acquiring part 462, the virtual viewpoint image generation part 463 and the stereoscopic view image generation part 465 have the same functions as those of the one embodiment, the description thereof will be omitted by applying the same reference numerals to the same components.

The object estimation part 466 detects a T1 object area A11 that captures a specific kind of object (in this case, a head portion) from the T1 image G1, and also detects a T2 object area A21 that captures a specific kind of object (in this case, a head portion) from the T2 image G2. For example, by using a pattern matching process in which a general shape, a pattern of pixel values, or the like of a head portion or a face is used, the T1 object area A11 can be detected from the T1 image G1, and the T2 object area A21 can be detected from the T2 image G2.

Moreover, based upon T1 distance information obtained from the distance information acquiring part 462, the object estimation part 466 serving as a calculating part calculates information (three-dimensional information) indicating a position in the three-dimensional space with respect to the portion of a subject captured in the respective pixels forming the T1 object area A11. Furthermore, based upon T2 distance information obtained from the distance information acquiring part 462, the object estimation part 466 calculates information (three-dimensional information) indicating a position in the three-dimensional space with respect to the portion of the subject captured in the respective pixels forming the T2 object area A21.

For example, by utilizing the relationship of the equation (1), coordinates (Xo, Yo, Zo) in the three dimensional space of each of the portions are calculated by the following equations (3) to (5). In this case, Xo, Yo and Zo represent coordinates relating to the three axes of X, Y, and Z that are mutually orthogonal one another. The direction in which the camera 2 is directed toward a portion of a subject corresponds to a direction in which the Z axis is extended, the direction from the T1 viewpoint toward the T2 viewpoint corresponds to a direction in which the X axis is extended, and the direction that is orthogonal to the X axis and Z axis, and perpendicular to the ground corresponds to the direction in which the Y axis is extended.

$$Xo = xD/f \quad (3)$$

$$Yo = yD/f \quad (4)$$

$$Zo = D \quad (5).$$

With respect to the respective pixels forming the T1 object area A11, the information updating part 467 makes its three dimensional information correlated with the pixel values, and stores in the storage part 44 as object information 441. That is, the object information 441 includes information relating to the three-dimensional shape of the specific kind of object (in this case, the head portion).

Moreover, with respect to the respective pixels of the T2 object area A21 that do not capture the same portion as that of the pixels forming the T1 object area A11, the information updating part 467 makes the three-dimensional information correlated with the pixel values thereof, and adds the resulting information to the object information 441. In other words, based upon the calculation results relating to the T2 object area A21 given by the object estimation part 466, with respect to the respective pixels (that is, the respective pixels in the non-corresponding area) that do not correspond to the T1 object area A11 of the T2 object area A21, the three-dimensional information and the pixel values thereof are made correlated with each other, and the resulting information are added to the object information 441. That is, each time new three-dimensional information of a specific kind of object is obtained, the object information 441 is updated so that information relating to the specific kind of object (in this case, a head portion) is enhanced.

In this case, between the T1 object area A11 and the T2 object area A21, a correlation process for recognizing pixels capturing the same portion of the subject is carried out so that pixels (that is, pixels relating to the T2 object appearing area N21) that capture a portion of the subject that is not captured in the T1 object area A11 are recognized from the T2 object area A21. Moreover, supposing that the T1 image G1 corresponds to such an image as shown in FIG. 3 and that the T2 image G2 corresponds to such an image as shown in FIG. 5, information corresponding to a portion on the left side of the head portion is added to the object information 441.

Additionally, in the case where information relating to the three-dimensional shape is updated, so as to be matched with the three-dimensional shape relating to the portion captured in the T1 image G1 and the T2 image G2 in an overlapped manner, information relating to a new three-dimensional shape is added to the information relating to the three dimensional shape that has already been contained in the object information 441.

By reference to the object information 441, the occlusion compensation part 464A adds a pixel value to each of the pixels of the non-image capture area (more specifically, occlusion area Ao111) of the T1 virtual viewpoint image G11 in accordance with the object information 441. In this case, a point (for example, a point capturing an apex of the nose) that is not contained in the occlusion area Ao111 of the T1 virtual object area A111 is selected as a feature point forming a reference, and based upon the object information 441, coordinates in the three-dimensional space and the pixel values thereof corresponding to the occlusion area Ao111 are found.

By using this arrangement as well, in the same manner as in the above one embodiment, it becomes possible to generate a compensated T1 virtual viewpoint image without causing any visually uncomfortable feeling. Moreover, the pixel value relating to each of the pixels within the non-image capture area can be positively found.

⊙ Moreover, in the above one embodiment, a correlation process for making the pixel of the T2 image G2 correlated with the pixel of the occlusion areas Ao111 and Ao112 is carried out; however, by simplifying this correlation process, the processing speed relating to the pixel value compensation process can be remarkably improved. For example, the following compensating methods are proposed as specific examples.

FIG. 21 is a view for describing a compensating method of the occlusion area relating to one modified embodiment. In this modified embodiment, in comparison with the above one embodiment, the compensating method in the process of the occlusion compensation part 464 is simplified.

In this case, first, with respect to the T2 viewpoint as well, a T2 virtual viewpoint having the same positional relationship as that of the T1 virtual viewpoint relative to the T1 viewpoint is supposed. Then, by using the same method as that of the virtual viewpoint image generating operation relating to the above one embodiment, based upon the T2 image G2 and the T2 distance information, a T2 virtual viewpoint image G21 is generated in a pseudo manner. Next, as shown in FIG. 21, by the occlusion compensation part 464, of the T2 virtual viewpoint image G21, a pixel value relating to the pixel having the same coordinates as those of the pixel in the non-image capture area in the T1 virtual viewpoint image G11 is added to the pixel in the non-image capture area. Moreover, the addition of the pixel value in this manner is carried out on each of the pixels in the non-image capture area as long as possible.

The compensating method of the pixel value in this simple mode may be applicable to a case where, for example, an object is shifted to cause a T2 background appearing area N22 in the T2 image G2. In such a case, for example, the pixel value of each of the pixels in the T2 background appearing area N22 is added to each of the pixels of the occlusion area Ao112.

Additionally, in this compensating method, with respect to a plurality of virtual viewpoint images respectively generated by a plurality of images obtained by being captured at a plurality of different points of time relating to at least one of the past and the future with the time T1 serving as a reference, a pixel value of each of the pixels may be added to each of the pixels having the same coordinates in the non-image capture area. Accordingly, a compensation process of a pixel value within a wider area of the occlusion area is available.

Furthermore, according to this modified embodiment, it becomes possible to accelerate the processing speed by a reduction of the amount of calculations.

⊙ Moreover, in the above one embodiment, the T1 distance information and the T2 distance information are obtained by the distance measuring device 3; however, the present invention is not intended to be limited to this arrangement. For example, the T1 distance information and T2 distance information may be obtained without using the distance measuring device 3. For example, the following configurations are proposed as specific examples.

Figure 22:
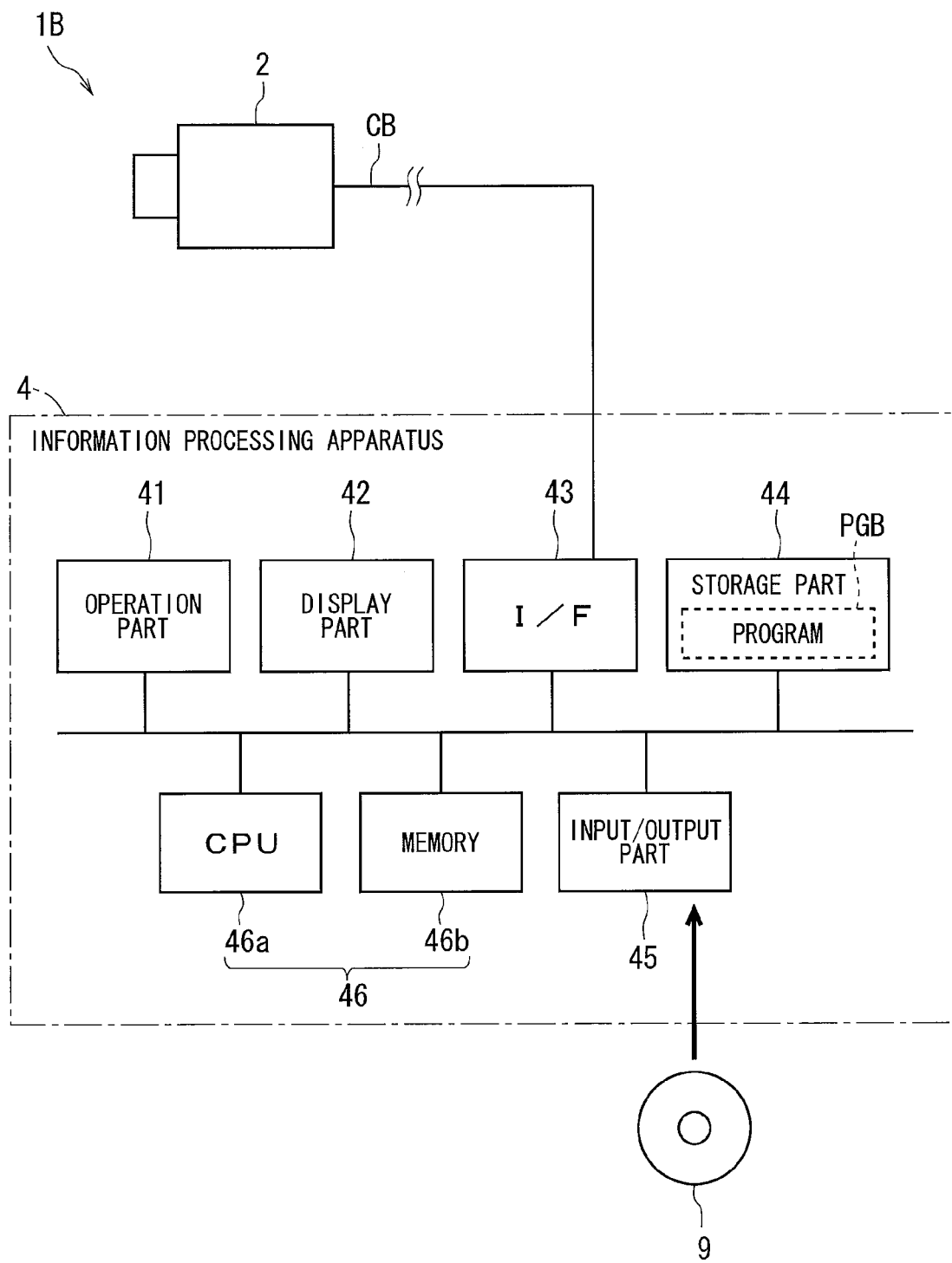
FIG. 22 is a view showing a schematic configuration of an information processing system according to one modified embodiment.

FIG. 22 is a view showing a schematic configuration of an information processing system 1B relating to one modified embodiment. In comparison with the information processing system 1 relating to the above one embodiment, the information processing system 1B relating to this modified embodiment has a configuration in which the distance measuring device 3 is removed therefrom, and the program PG to be read by the control part 46 so as to realize various functions is altered to a program PGB for use in realizing various different functions, etc.; however, the other configurations except for this are the same configurations.

FIG. 23 is a view showing a functional configuration of the information processing apparatus 4 relating to the modified embodiment. In this case, an explanation is given by exemplifying a configuration in which the program PGB stored in the storage part 44 is executed by the control part 46 so that the functional configuration of the control part 46 is realized; however, the functional configuration may be realized by using an exclusively-used hardware configuration.

As shown in FIG. 23, as the functional configuration, the control part 46 is provided with an image acquiring part 461, a virtual viewpoint image generation part 463, an occlusion compensation part 464B, a stereoscopic view image generation part 465 and a distance information estimation part 468. In this case, since the image acquiring part 461, the virtual viewpoint image generation part 463 and the stereoscopic view image generation part 465 have the same functions as those of the above one embodiment, the description thereof will be omitted by applying the same reference numerals to the same components.

The distance information estimation part 468 estimates the distance (that is, T1 distance information) between an object that is captured in the T1 image G1 and the camera 2 (that is, T1 viewpoint).

In this case, for example, first, by using a pattern matching process using a general shape and a pattern of pixel values of a specific kind of object (in this case, a head portion or a face), a T1 object area A11 can be detected from a T1 image G1. In the case where general shape information or depth information or the like of the specific kind of object is stored in the storage part 44, based upon the general shape information or the depth information or the like, next, T1 distance information is estimated. In the virtual viewpoint image generation part 463, based upon the estimated T1 distance information and the T1 image G1, a T1 virtual viewpoint image G11 is generated.

In the occlusion compensation part 464B, first, by carrying out a correlation process between the T1 image G1 and the T2 image G2, a non-corresponding area of the T2 image G2 that does not correspond to the T1 image G1 is recognized. Next, by pasting a pixel pattern of the non-corresponding area onto the occlusion area of the T1 virtual viewpoint image G11, a compensation process of the pixel values is carried out.

Additionally, in the case where the sizes of the non-corresponding area and the occlusion area are slightly different from each other, after enlarging or reducing the pixel pattern of the non-corresponding area, the resulting pattern may be pasted onto the occlusion area. In the case where the shapes of the non-corresponding area and the occlusion area are slightly different from each other, the pixel pattern of the non-corresponding area is expanded to such a degree as to cover the entire occlusion area so that the pixel pattern of the non-corresponding area may be pasted onto the occlusion area. At this time, with respect to an image pattern that sticks out from the occlusion area, it is preferable not to paste such an image pattern.

By adopting these configurations, it becomes possible to accelerate the processing speed of the pixel value compensation process.

Additionally, the present modified embodiment has exemplified a configuration in which based upon the estimated T1 distance information and T1 image G1, the T1 virtual viewpoint image G11 is generated; however, the present invention is not limited to this. For example, a configuration may be proposed in which the T1 image G1, the T2 image G2, and a T1 virtual viewpoint image G11 that has been preliminarily generated in an external device, or the like, are acquired so that a compensation process is carried out on the occlusion area.

⊙ Moreover, in the above one embodiment, based upon the T2 image G2 that is obtained by being captured at time T2 later than time T1, the pixel value of each of the pixels of the occlusion areas Ao111 and Ao112 of the T1 virtual viewpoint image G11 is compensated; however, the present invention is not limited to this. The time T2 may be a point of time earlier in time than the time T1. That is, based upon the T2 image G2 relating to the image capture time T2 earlier than the image capture time T1 of the T1 image G1, the pixel value of each of the pixels of the occlusion areas Ao111 and Ao112 of the T1 virtual viewpoint image G11 may be compensated. That is, based upon the past T2 image G2, a compensation process of a pixel value may be carried out on the T1 virtual viewpoint image G11 generated from the T1 image G1 relating to the image capture time T1 that comes later. This configuration is preferably applicable to a case where it is desirable to prevent a time lag relating to display from occurring due to image processing and a case where, for example, dynamic images relating to live broadcasting need to be dealt with.

On the other hand, in the case where dynamic images or the like that have already been acquired are dealt with, the compensation process of the pixel value may be carried out on the T1 virtual viewpoint image G11 based upon either the past or future T2 image G2 with the T1 image G1 serving as a reference. Moreover, the compensation process of the pixel value may be carried out based upon both of the past and future images with the time T1 serving as a reference. By using a plurality of images obtained by a plurality of image capturing processes at least either in the past or in the future, with the time T1 serving as a reference, the compensation process of the pixel value may be carried out by utilizing the average value of the pixel values of the plurality of images or the most frequently appeared value of the pixel values.

⊙ Moreover, in the above one embodiment, explanations have been given by exemplifying a case where the position and posture of the camera 2 are fixed; however, the present invention is not limited to this. With respect to the pixel value compensation process relating to the second compensating method of the above one embodiment, the process may be applicable to a case where the position and the posture of the camera 2 are changed.

⊙ Moreover, in the above one embodiment, by carrying out the correlation process of pixels between the T1 image G1 and the T2 image G2, the non-corresponding area including the T2 object appearing area N21 and the T2 background appearing area N22 is recognized; however, the present invention is not limited to this. For example, in the case where the T1 image G1 and the T2 image G2 are two frame images forming dynamic image files of MPEG format, based upon motion vector information contained in the dynamic image files of the MPEG format, the non-corresponding area including the T2 object appearing area N21 and the T2 background appearing area N22 may be recognized. Accordingly, the amount of calculations required for specifying the pixel value relating to each pixel of the non-corresponding areas corresponding to the occlusion areas Ao111 and Ao112 can be reduced. For this reason, the generation of a compensated T1 virtual viewpoint image without causing any visually uncomfortable feeling can be carried out in a shorter period of time.

⊙ Moreover, in the above one embodiment, the distance measuring method by the distance measuring device 3 utilizes a laser; however, the present invention is not limited to this. With respect to the distance measuring method by the distance measuring device 3, other methods, such as a distance measuring method by the use of a radar, a method for carrying out the focus detection by projecting light (optical cutting method) and the like, may be adopted.

Furthermore, in place of obtaining the T1 distance information and T2 distance information by using the distance measuring device 3, after acquiring a plurality of images respectively from different viewpoints by image capturing processes by using a plurality of cameras at time T1 and time T2, the T1 distance information and T2 distance information may be obtained from the plurality of images.

Figure 24:
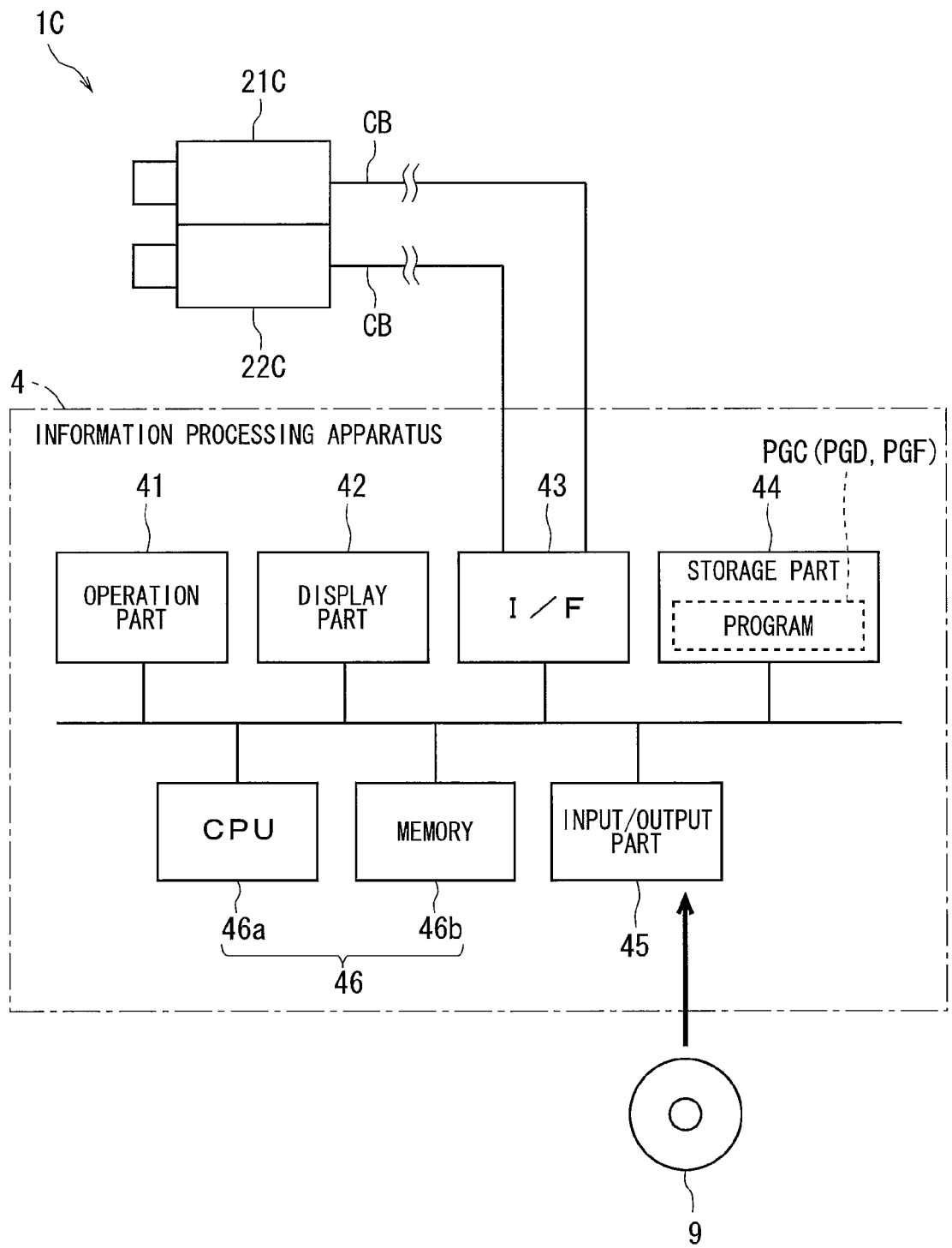
FIG. 24 is a view showing a schematic configuration of an information processing system according to one modified embodiment.

FIG. 24 is a view showing a schematic configuration of an information processing system 1C in which the T1 distance information and T2 distance information are obtained by using two cameras 21C and 22C. In the information processing system 1C relating to the present modified embodiment, in comparison with the information processing system 1 relating to the above one embodiment, the distance measuring device 3 is removed therefrom, the single camera 2 is altered to a stereo camera composed of two cameras 21C and 22C, and the program PG that is read by the control part 46 to realize various functions and the like is changed to a program PGC for use in realizing different functions; however, the other configurations are the same.

In this case, with respect to the two cameras 21C and 22C, their optical axes are made substantially in parallel with each other, and they have such a positional relationship that they are shifted from each other in the vertical direction to the optical axes. The directions of the deviations of the two cameras 21C and 22C may be any of horizontal, vertical and diagonal directions relative to the ground.

Figure 25:
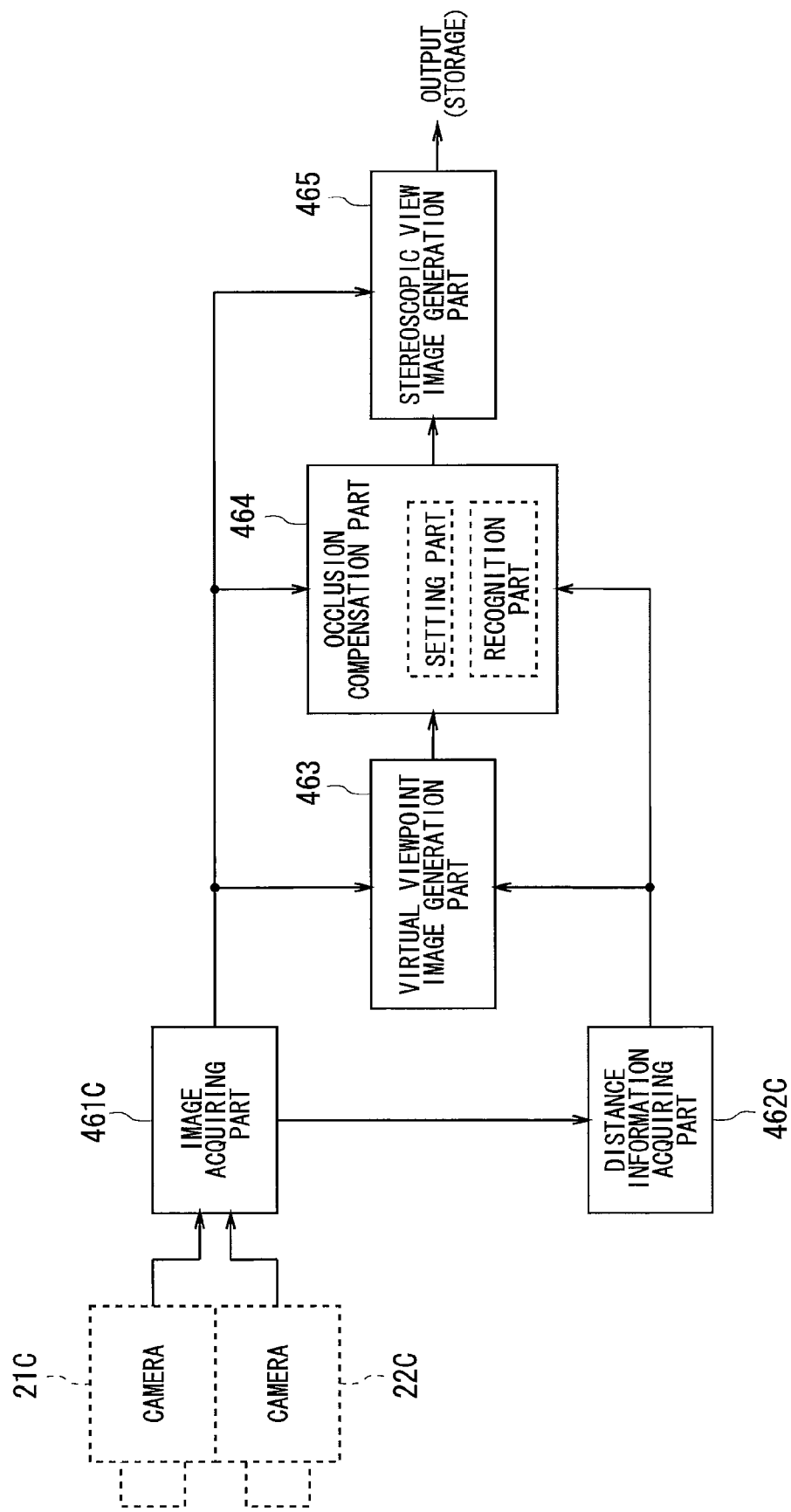
FIG. 25 is a view showing a functional configuration of an information processing apparatus according to one modified embodiment.

FIG. 25 is a view showing a functional configuration of an information processing system 4 according to the present modified embodiment. In this case, an explanation will be given by exemplifying a configuration in which the program PGC stored in the storage part 44 is executed by the control part 46 so that the functional configuration of the control part 46 is achieved; however, the functional configuration may be realized by an exclusively-used hardware configuration.

As shown in FIG. 25, the control part 46 is provided with an image acquiring part 461C, a distance information acquiring part 462C, a virtual viewpoint image generation part 463, an occlusion compensation part 464 and a stereoscopic view image generation part 465, as functional configurations. In this case, since the virtual viewpoint image generation part 463, the occlusion compensation part 464 and the stereoscopic view image generation part 465 have the same functions as those of the above one embodiment, the description thereof will be omitted by applying the same reference numerals to the same components.

The image acquiring part 461C acquires respective images that are obtained by being captured by the two cameras 21C and 22C at time T1 and time T2. For example, the image relating to the image capture time T1 obtained by the camera 21C is defined as a T1 image G1, and the image relating to the image capture time T2 obtained by the camera 21C is defined as a T2 image G2. In this case, the image relating to the image capture time T1 obtained by the camera 22C is defined as a T1 image for distance measuring, and the image relating to the image capture time T2 obtained by the camera 22C is defined as a T2 image for distance measuring.

The distance information acquiring part 462C acquires T1 distance information based upon the T1 image G1 and the T1 image for distance measuring, and acquires T2 distance information based upon the T2 image G2 and the T2 image for distance measuring. By utilizing the relationship of the equation (1), the T1 distance information and the T2 distance information are obtained.

More specifically, first, the a correspondence relationships (that is, a deviation amount of pixels capturing the same portion) between pixels capturing the same portion is recognized between the T1 image G1 and the T1 image for distance measuring, and the a correspondence relationships (that is, a deviation amount of pixels capturing the same portion) between pixels capturing the same portion is recognized between the T2 image G2 and the T2 image for distance measuring. Next, with respect to the equation (1), by substituting the focal lengths of the two cameras 21C and 22C for values of focal lengths f, by substituting the deviation amounts (separated distance between viewpoints) B of the optical axes of the two cameras 21C and 22C for values of separated distances B between viewpoints, and by substituting the deviation amounts of the pixels capturing the same portion for the values of parallaxes Δd, the distance D can be found.

In this manner, the T1 distance information and the T2 distance information relating to each of the pixels of the T1 image G1 and the T2 image G2 are obtained. Then, the T1 distance information and the T2 distance information are used in the virtual viewpoint image generation part 463 and the occlusion compensation part 464.

⊙ Moreover, in the above one embodiment, one sheet of the T1 virtual viewpoint image G11 is generated from one sheet of the T1 image G1 so that the compensation of the pixel value is carried out; however; the present invention is not limited to this. For example, images (virtual viewpoint image) relating to two different virtual viewpoints (virtual viewpoint) may be generated from one sheet of the T1 image G1. That is, a plurality of T1 virtual viewpoint images may be generated from one T1 image G1.

⊙ Furthermore, in the above one embodiment, the correlation process of pixels is carried out on a pixel basis; however, the present invention is not limited to this. On a sub-pixel basis finer than the pixel basis, the correlation process may be carried out between points. In this configuration, such a mode is proposed in which the pixel value of the T2 image G2 is not simply added to each of the pixels of the non-image capture area of the T1 virtual viewpoint image G11, and for example, a pixel that is found by various interpolating calculations, such as interpolation, is added to each of the pixels in the T1 non-image capture area of the T1 virtual viewpoint image G11.

(4-2) Other Modified Embodiments

⊙ In the above one embodiment, the pixel value of the T2 image G2 is added to each of the pixels in the T1 non-image capture area (occlusion area) of the T1 virtual viewpoint image G11 relating to the time T1; however, the present invention is not limited to this. For example, various modified embodiments may be proposed in which a pixel value of each of various other images obtained by being captured at a time different from the time T1 is added to the each of the pixels in the T1 non-image capture area. As these various modified embodiments, for example, the following first to fourth modified embodiments are adopted.

[1] In a first modified embodiment, to each of the pixels in a non-image capture area of a virtual viewpoint image generated based upon an image (referred to also as "reference image") obtained by being captured by one of the cameras composing a stereo camera, a pixel value of an image (referred to also as "inquiry image") obtained by being captured by the other camera at the same point of time is added.

[2] In a second modified embodiment, to each of pixels in a non-image capture area of a virtual viewpoint image relating to a certain point of time, a pixel value of a virtual viewpoint image obtained by being captured at another point of time different from the certain point of time is added.

[3] In a third modified embodiment, to each of the pixels in the non-image capture area of a virtual viewpoint image generated based upon the reference image obtained by being captured by one of the cameras composing a stereo camera, a pixel value of a inquiry image obtained by being captured by the other camera at a different point of time is added.

[4] In a fourth modified embodiment, to each of the pixels in a non-image capture area of an object area contained in a virtual viewpoint image relating to a certain point of time, a pixel value relating to an object having the same posture contained in an image obtained by being captured at a point of time different from the certain point of time is added.

The following description will discuss these first to fourth modified embodiments successively.

(4-2-1) First Modified Embodiment (4-2-1-1) Outline of First Modified Embodiment The first modified embodiment may be realized by an information processing system 1C shown in FIG. 24.

Figure 26:
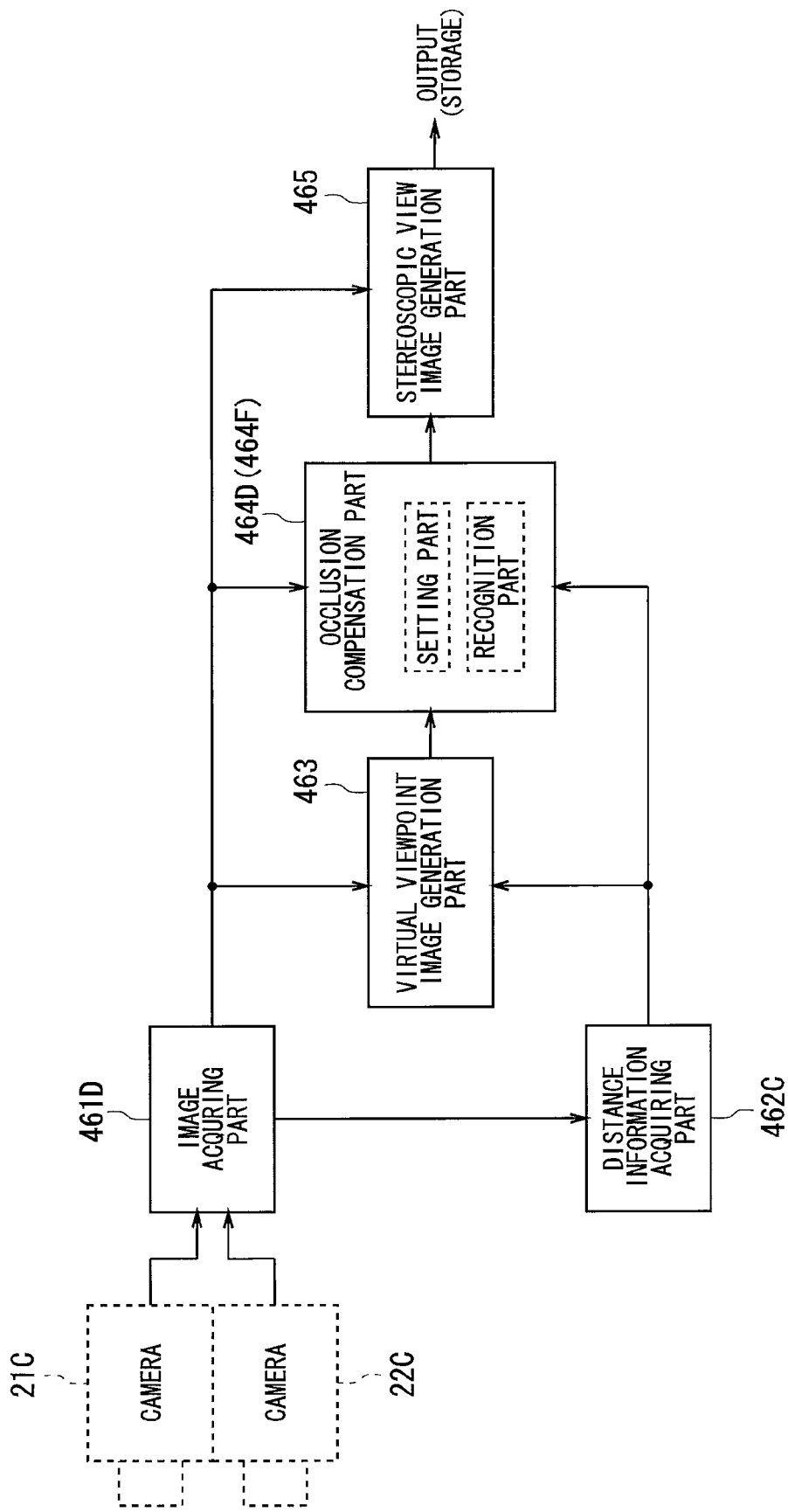
FIG. 26 is a view showing a functional configuration of an information processing apparatus according to a first modified embodiment.

FIG. 26 is a view showing a functional configuration of an information processing apparatus 4 relating to the first modified embodiment. In this case, an explanation will be given by exemplifying a configuration in which a program PGD stored in the storage part 44 is executed by the control part 46 so that the functional configuration of the control part 46 is realized; however, the functional configuration may be realized by using an exclusively-used hardware configuration.

As shown in FIG. 26, the control part 46 relating to the first modified embodiment, which has functional configurations possessed by the control part 46 relating to the modified embodiment shown in FIG. 25 as a basic configuration, is allowed to have such functional configurations that the image acquiring part 461C is replaced by an image acquiring part 461D and the occlusion compensation part 464 is replaced by an occlusion compensation part 464D. Moreover, in the first modified embodiment, the camera 21C and the camera 22C carry out image capturing processes a plurality of times at the same timings in a time-sequential manner. Thus, a plurality of so-called stereo images are obtained. The respective stereo images form pairs of images, each pair containing an image (reference image) obtained by being captured by the camera 21C and an image (inquiry image) obtained by being captured by the camera 22C, so that the pair of images is obtained by image-capturing the same subject at the same point of time from mutually different viewpoints.

The image acquiring part 461D acquires a plurality of stereo images obtained by the camera 21C and the camera 22C. Thus, n+1 pairs of stereo images, obtained by being captured by the camera 21C and the camera 22C, for example, at time T0, time T1, time T2, ..., time Tn (n: natural number), are acquired by the image acquiring part 461D. Additionally, the image acquiring part 461D may acquire a plurality of stereo images directly from the camera 21C and camera 22C, or may acquire a plurality of stereo images once stored in the storage part 44, or the like.

Figure 27:
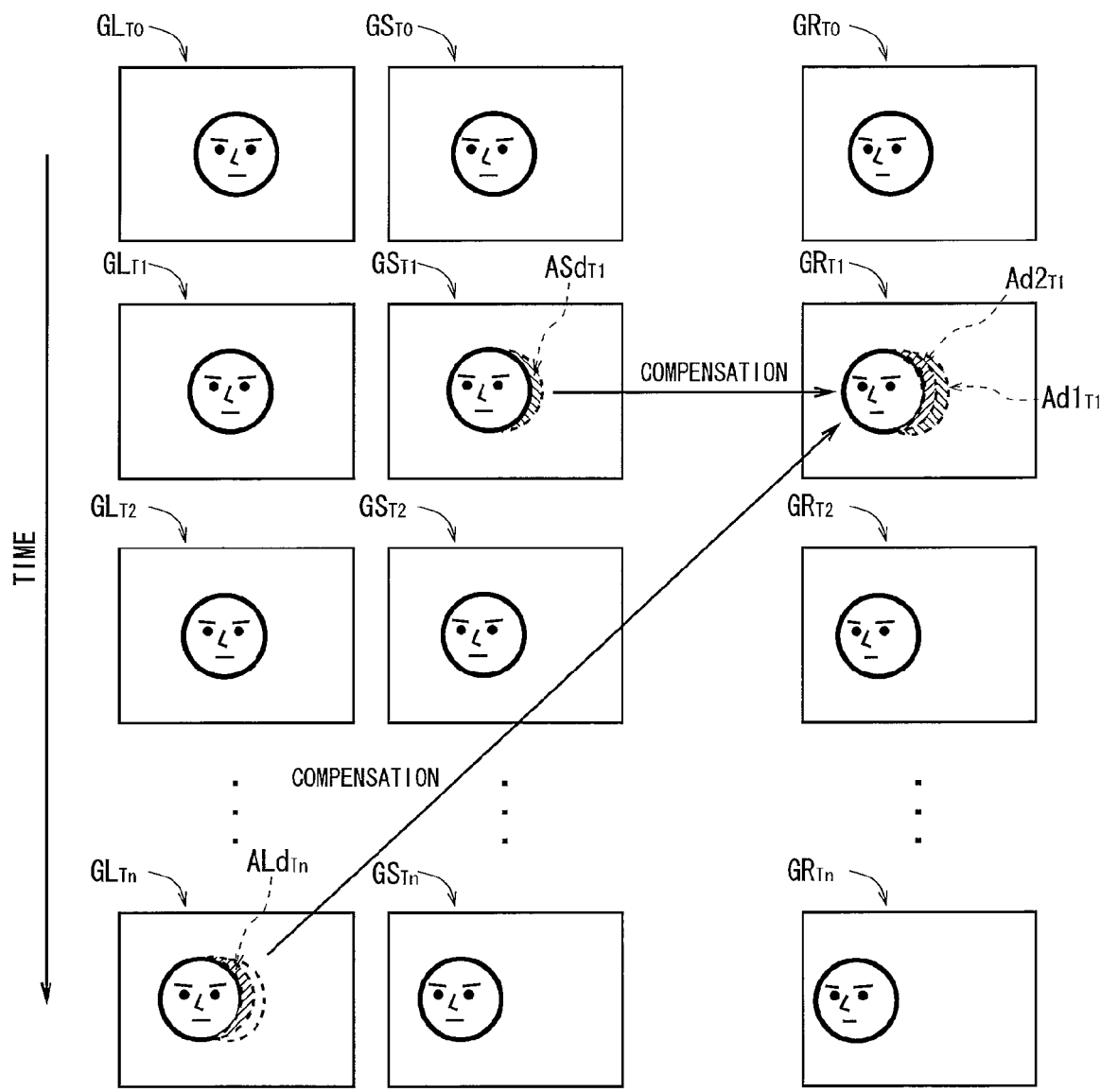
FIG. 27 is a view for describing a compensation process according to the first modified embodiment.

FIG. 27 is a view for describing a process for carrying out compensation of a pixel value (referred to also as a compensation process) according to the first modified embodiment. FIG. 27 illustrates n+1 pairs of stereo images obtained by being captured by the camera 21C and the camera 22C at time T0, time T1, time T2, ..., time Tn, and T0 to Tn virtual viewpoint images $GR_{T0}$ to $GR_{Tn}$ respectively corresponding to n+1 sheets of T0 to Tn reference images $GL_{T0}$ to $GL_{Tn}$.

In FIG. 27, the T0 to Tn reference images $GL_{T0}$ to $GL_{Tn}$ are shown in one longitudinal column on the left side, T0 to Tn inquiry images $GS_{T0}$ to $GS_{Tn}$ are shown in one longitudinal column in the center, and the T0 to Tn virtual viewpoint images $GR_{T0}$ to $GR_{Tn}$ are shown in one longitudinal column on the right side. Each of the T0 to Tn virtual viewpoint images $GR_{T0}$ to $GR_{Tn}$ is generated based upon the reference image and distance information at the corresponding time among T0 to Tn reference images $GL_{T0}$ to $GL_{Tn}$ and T0 to Tn distance information in the virtual viewpoint image generation part 463. Moreover, in FIG. 27, the respective images are shown in a manner so as to make the image capture time become later as the stages thereof become lower. In FIG. 27, for example, a plurality of images that indicate states in which the face of a person is moving leftward when viewed from the cameras 21C and 22C side as time elapses are shown.

FIG. 28 is a schematic view illustrating image-capturing conditions of stereo images and virtual image-capturing conditions relating to virtual viewpoint images at time T1.

In FIG. 28, the two cameras 21C and 22C at time T1 are indicated by solid lines, and a camera (referred to also as "virtual camera") 21vD that is virtually set at a virtual viewpoint (referred to also as "T1 virtual viewpoint) relating to time T1 is indicated by a thin broken line. Additionally, the position of the camera 21C at time T1 is defined as a T1 reference viewpoint, and the positional relationship between the T1 reference viewpoint and T1 virtual viewpoint correspond to the positional relationship between the left eye and the right eye of a standard person, with the separated distance between the T1 reference viewpoint and the T1 virtual viewpoint being set to B.

Moreover, in FIG. 28, an outer edge of a space area (image capture area) capable of being image-captured by the camera 21C is indicated by a thick one-dot chain line. Furthermore, an outer edge of a space area (image capture area) capable of being image-captured by the camera 22C is indicated by a thick two-dot chain line. Here, an outer edge of a space area (image capture area) capable of being image-captured by the virtual camera 21vD is indicated by a thick broken line.

As shown in FIG. 28, between the camera 21C and the virtual camera 21vD, areas hidden behind a head portion 2HU of a background 2WA are different from each other. More specifically, a T1 virtual viewpoint image $GR_{T1}$ relating to the Time T1 captures a background portion OP112 that is not captured in the T1 reference image $GL_{T1}$ relating to the Time T1. In other words, in the T1 virtual viewpoint image $GR_{T1}$, there is an area (referred to also as "T1 non-image capture area") corresponding to a portion of a subject that is not captured in the T1 reference image $GL_{T1}$.

In this case, however, a portion Bd1 of the background portion OP112 is captured in the T1 inquiry image $GS_{T1}$ obtained by being captured by the camera 22C at time T1, while the remaining portion Bd2 except for the portion Bd1 of the background portion OP112 is not captured even in the T1 inquiry image $GS_{T1}$.

Therefore, in the occlusion compensation part 464D, to each of the pixels of a portion of the area $Ad1_{T1}$ of the T1 non-image capture area corresponding to the background portion OP112 of the T1 virtual viewpoint image $GR_{T1}$, a pixel value of the area $ASd_{T1}$ capturing the portion Bd1 within the T1 inquiry image $GS_{T1}$ is added. Moreover, to each of the pixels of the remaining area $Ad2_{T1}$ except for the portion of the area $Ad1_{T1}$ of the T1 non-image capture area within the T1 virtual viewpoint image $GR_{T1}$, a pixel value of the area $ALd_{Tn}$ capturing the remaining portion Bd2 in the Tn reference image $GL_{Tn}$ obtained by being image-captured by camera 21C at time Tn is added. As the method for adding the pixel value of the area $ALd_{Tn}$ to each of the pixels of the remaining area $Ad2_{T1}$, the same method as that of the above one embodiment may be adopted.

In this case, as a compensating method by which the pixel value of the area $ASd_{T1}$ of the T1 inquiry image $GS_{T1}$ is added to each of the pixels of the portion of the area $Ad1_{T1}$ of the T1 non-image capture area, the same method as the first or second compensating method of the above one embodiment may be adopted. For example, the compensating method may be realized by carrying out the following steps (A1) to (A4) successively.

(A1) The correlation process of pixels is carried out between the T1 reference image $GL_{T1}$ and the T1 inquiry image $GS_{T1}$. The correlation process of the pixels may be realized by an existing method, such as a so-called SAD method, POC method, or the like in the same manner as in the above one embodiment. Accordingly, an area within the T1 inquiry image $GS_{T1}$ (referred to also as "T1 non-corresponding area"), which does not correspond to the T1 reference image $GL_{T1}$, can be recognized. At this time, with respect to the equation (1), by substituting each parallax Δd derived from the result of the correlation process of the pixels between the T1 reference image $GL_{T1}$ and the T1 inquiry image $GS_{T1}$, the separated distance between the camera 21C and the camera 22C, the focal length f of the camera 21C and the camera 22C thereinto, the T1 distance information at time T1 can be obtained. This T1 distance information includes information (referred to also as "T1 reference distance information") indicating the distance from the position of the camera 21C (referred to also as "T1 reference viewpoint") to each of the portions of a subject, information (referred to also as "T1 inquiry distance information") indicating the distance from the position of the camera 22C (referred to also as "T1 inquiry viewpoint") to each of the portions of the subject. Additionally, the T1 distance information may be obtained by measurements by the use of a distance measuring device installed in a separated manner.

(A2) From the T1 non-corresponding area of the T1 inquiry image $GS_{T1}$, an area (T1 object appearing area) capturing a portion of an object (for example, a head portion 2HU) that is not captured in the T1 reference image $GL_{T1}$ and an area (T1 background appearing area) capturing a portion of a background 2WA that is not captured in the T1 reference image $GL_{T1}$ are recognized in a manner so as to be distinguished based upon T1 inquiry distance information.

(A3) Based upon the T1 distance information, the correlation process (background correlation process) of the pixels is carried out between the T1 background appearing area of the T1 inquiry image $GS_{T1}$ and the occlusion area relating to the background of the T1 virtual viewpoint image $GR_{T1}$. In this background correlation process, it is only necessary to adopt the same process as the background correlation process of the first or second compensating method of the above one embodiment. In the background correlation process, for example, in the background correlation process of the first or second compensating method of the above one embodiment, by respectively exchanging the T2 background appearing area N22 and the occlusion area Ao112 with the T1 background appearing area of the T1 inquiry image $GS_{T1}$ and the occlusion area relating to the background of the T1 virtual viewpoint image $GR_{T1}$, the correlation process can be achieved. The contents of the process in step (A3) will be described later.

(A4) Based upon the results of the background correlation process in step (A3), to each of the pixels in the occlusion area relating to the background of the T1 virtual viewpoint image $GR_{T1}$, a pixel value relating to each of the corresponding pixels inside the T1 background appearing area of the T1 inquiry image $GS_{T1}$ is added.

In this case, an explanation has been given by exemplifying an example of carrying out the background correlation process; however, based upon the T1 distance information, a process (object correlation process) for allowing pixels to be correlated with each other between the object appearing area of the T1 inquiry image $GS_{T1}$ and the occlusion area relating to the object of the T1 virtual viewpoint image $GR_{T1}$ may be carried out. At this time, based upon the results of the object correlation process, a pixel value relating to each of the corresponding pixels in the T1 object appearing area is added to each of the pixels in the occlusion area relating to the object of the T1 virtual viewpoint image $GR_{T1}$.

(4-2-1-2) Background Correlation Process Based Upon First Compensating Method

In the background correlation process based upon the first compensating method in the above one embodiment to be carried out in step (A3), for example, a pixel having coordinates $(x_{N22}, y_{N22}, T1)$ within the T1 background appearing area of the T1 inquiry image $GS_{T1}$ is made correlated with a pixel having coordinates $(x_{N22}-\Delta d_h-\Delta d_{hT}, y_{N22}, T1)$ within the occlusion area relating to the background of the T1 virtual viewpoint image $GR_{T1}$. In this case, $\Delta d_h$ represents a parallax according to the separated distance between the position (T1 reference viewpoint) of the camera 21C and the position (T1 virtual viewpoint) of the virtual camera 21vD at time T1, and is found by the relationship of the equation (1), the separated distance, the focal length f of the camera 21C and the T1 reference distance information. Moreover, $\Delta d_{hT}$ represents a shift amount of coordinates between a pixel (referred to also as "inquiry background neighboring point") in the vicinity of the T1 background appearing area within an area capturing the background of the T1 inquiry image $GS_{T1}$ and a pixel (referred to also as reference background corresponding point) corresponding to the inquiry background neighboring point within an area capturing the background of the T1 reference image $GL_{T1}$.

(4-2-1-3) Background Correlation Process Based Upon Second Compensating Method

On the other hand, the background correlation process based upon the second compensating method in the above one embodiment to be carried out in step (A3) can be realized by the following process by, for example, supposing that an arbitrary coordinates within an area capturing the background of the T1 inquiry image $GS_{T1}$ are represented as ($x_{N1S}$, $y_{N1S}$, T1).

For example, as a first step, within the T1 inquiry image $GS_{T1}$ a pixel capturing a portion of a subject that satisfies the following three conditions (more specifically, conditions 1d to 3d) is set as a point forming the reference in the correlation process.

(Condition 1d) To be a portion of the subject captured in the T1 reference image $GL_{T1}$.

(Condition 2d) Of the T1 inquiry image $GS_{T1}$, to be a portion of a subject captured in a pixel (neighboring pixel) positioned near a pixel (hereinafter, referred to also as a "T1 process target pixel" and "T1 process target point") having coordinates ($x_{N1S}$, $y_{N1S}$, T1) that is a target for the correlation process.

(Condition 3d) To be a portion of a subject having substantially the same separated distance from the camera 22C as that of the portion of the subject captured in the T1 process target point.

More specifically, a pixel satisfying these conditions 1d to 3d is set as a T1 inquiry reference pixel (referred to also as T1 inquiry reference point) that forms a reference upon carrying out the background correlation process. In this case, the coordinates of the T1 inquiry reference point are represented as ($x_{1S}$, $y_{1S}$, T1).

In this case, coordinates of a pixel (referred to also as "T1 reference reference point) capturing a portion of a subject that is the same as that captured by the T1 inquiry reference point of the T1 reference image $GL_{T1}$ are set as ($x_{1L}$, $y_{1L}$, T1), and the distance from the T1 reference viewpoint to the portion of the subject captured in the pixel of the T1 reference reference point is set to $D_{1L}(T1)$, and the distance from the T1 inquiry viewpoint to the portion of the subject captured in the pixel of the T1 inquiry reference point is set to $D_{1S}(T1)$. Moreover, coordinates of a pixel (T1 compensation target point) that is a target to which a pixel value is added in the occlusion area relating to the background of the T1 virtual viewpoint image $GR_{T1}$ are defined as ($x_{o11}$, $y_{o11}$, T1).

The distance $D_{1L}(T1)$ is obtained from the T1 reference distance information, and the distance $D_{1S}(T1)$ is obtained from the T1 inquiry distance information. Moreover, a difference (referred to also as "T1 reference parallax") between the coordinates of the T1 reference reference point and the coordinates of a pixel (referred to also as T1 reference virtual reference point) capturing a portion of a subject that is the same as that captured in the T1 reference reference point of the T1 virtual viewpoint image $GR_{T1}$ is set as $\Delta d_{T1L}$. The T1 reference parallax $\Delta d_{T1L}$ is obtained by substituting the distance $D_{1L}(T1)$, etc. into the equation (1). Moreover, a difference (referred to also as "T1 inquiry parallax") between the coordinates of the T1 inquiry reference point and the coordinates of a pixel (referred to also as T1 reference virtual reference point) capturing a portion of a subject that is the same as that captured in the T1 inquiry reference point of the T1 virtual viewpoint image $GR_{T1}$ is set as $\Delta d_{T1S}$. The T1 reference parallax $\Delta d_{T1S}$ obtained by substituting the distance $D_{1S}(T1)$, etc. into the equation (1).

Next, as a second step, by carrying out calculations according to the following equation (6), coordinates of a T1 compensation target point to which the pixel value of the T1 process target point is added are found. More specifically, since the T1 reference viewpoint, the T1 inquiry viewpoint and the T1 virtual viewpoint have a positional relationship in which on a plane horizontal to the ground, they have certain distances deviated from one other in directions perpendicular to the image-capturing direction, the value $x_{o11}$ of the X-coordinate of the T1 compensation target point has a relationship represented by the following equation (6), and the value $y_{o11}$ of the Y-coordinate of the T1 compensation target point is represented by $y_{N1S}$.

$$x_{o11} = \{x_{1L} - \Delta d_{T1L}\} + (x_{N1S} - x_{1S}) + \{\Delta d_{T1L} - \Delta d_{T1S}\} \quad (6).$$

In this manner, the T1 compensation target point having coordinates ($x_{o11}$, $y_{o11}$, T1) is correlated with the T1 process target point having coordinates ($x_{N1S}$, $y_{N1S}$, T1).

(4-2-1-4) Summary of First Modified Embodiment

As described above, according to the first modified embodiment, not only an image captured at a point of time different from a certain point of time, but also an image captured at the same point of time as the certain point of time can be used so that a pixel value is added to each of pixels in an occlusion area relating to the certain point of time. Accordingly, for example, even in the case where brightness, a shape, etc. of a subject change as time elapses, it is possible to reduce influences given to a virtual viewpoint image by these changes. In other words, it is possible to generate a virtual viewpoint image without causing any visually uncomfortable feeling regardless of degree of changes in the image capturing environment.

(4-2-2) Second Modified Embodiment (4-2-2-1) Outline of Second Modified Embodiment In the second modified embodiment, to each of pixels of a T1 non-image capture area of a T1 virtual viewpoint image $GR_{T1}$ relating to a certain image capture time T1, a pixel value of a virtual viewpoint image relating to another image capture time different from the certain image capture time T1 is added. Accordingly, it becomes possible to reduce time required for compensation process for adding a pixel value to each of the pixels in an occlusion area of the T1 virtual viewpoint image $GR_{T1}$.

The second modified embodiment may be realized by an information processing system 1 shown in FIG. 1. In this case, an explanation will be given by exemplifying a configuration in which a program PGE stored in the storage part 44 is executed by the control part 46 so that the functional configuration shown in FIG. 2 is realized; however, the functional configuration may be realized by using an exclusively-used hardware configuration.

As shown in FIG. 2, the control part 46 relating to the second modified embodiment, which has functional configurations possessed by the control part 46 relating to the above one embodiment shown in FIG. 2 as a basic configuration, is allowed to have such functional configurations that the occlusion compensation part 464 is replaced by an occlusion compensation part 464E.

Figure 29:
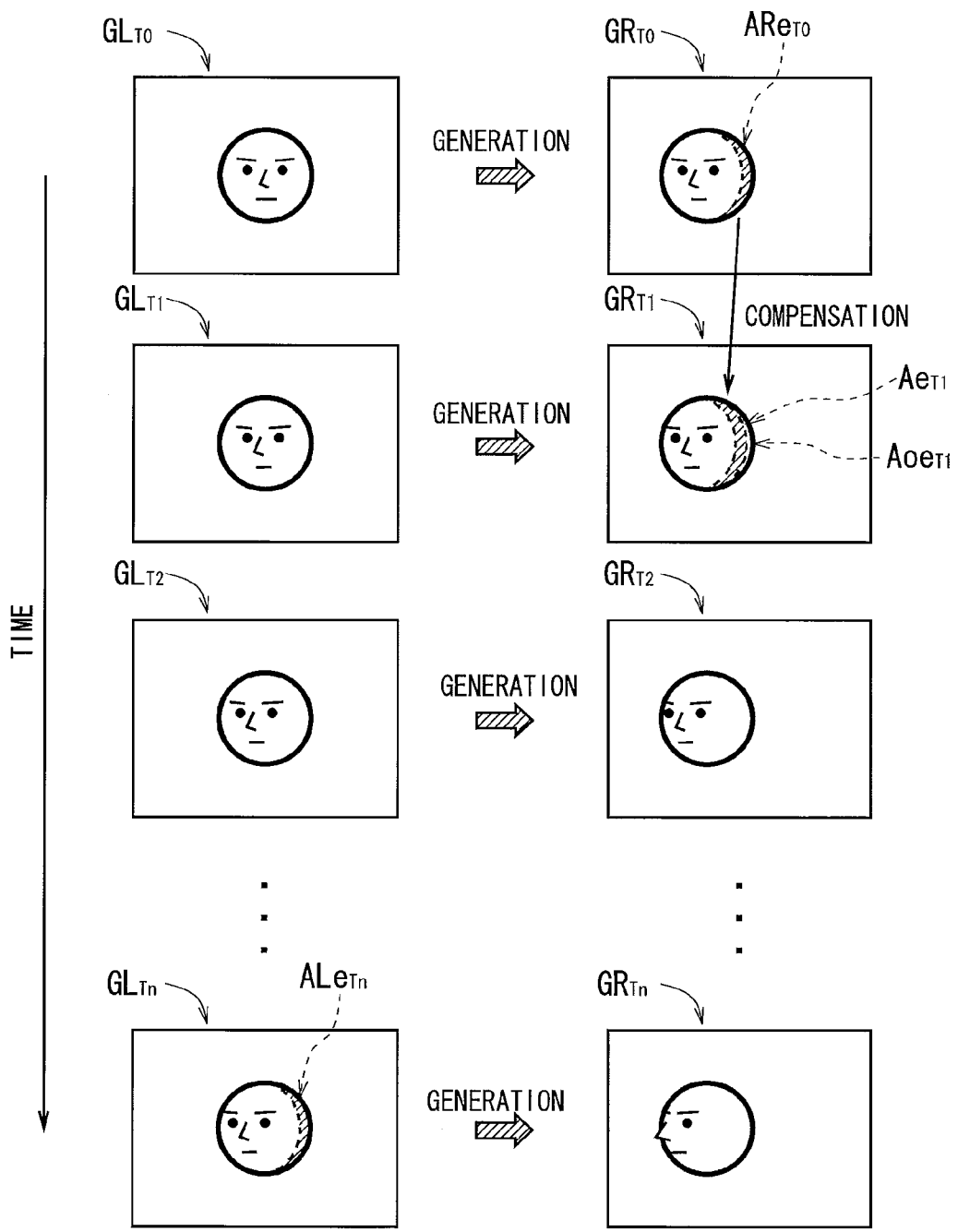
FIG. 29 is a view for describing a compensation process according to a second modified embodiment.

FIG. 29 is a view for describing a compensation process relating to the second modified embodiment. FIG. 29 illustrates n+1 sheets of T0 to Tn images $GL_{T0}$ to $GL_{Tn}$ obtained by being captured by a camera 2 at time T0, time T1, time T2, . . . , time Tn, as well as T0 to Tn virtual viewpoint images $GR_{T0}$ to $GR_{Tn}$ that respectively correspond to the n+1 sheets of T0 to Tn images $GL_{T0}$ to $GL_{Tn}$.

In FIG. 29, the T0 to Tn images $GL_{T0}$ to $GL_{Tn}$ are shown in one longitudinal column on the left side, T0 to Tn virtual viewpoint images $GR_{T0}$ to $GR_{Tn}$ are shown in one longitudinal column on the right side. Each of the T0 to Tn virtual viewpoint images $GR_{T0}$ to $GR_{Tn}$ is generated based upon the image and the distance information having the corresponding time among T0 to Tn images $GL_{T0}$ to $GL_{Tn}$ and T0 to Tn distance information in the virtual viewpoint image generation part 463. In FIG. 29, the respective images are shown in a manner so as to make the image capture time become later as the stages thereof become lower. In FIG. 29, for example, a plurality of images that indicate states in which the face of a person is rotating leftward when viewed from the camera 2 side as time elapses are shown.

In this case, it is supposed that the relative positional relationship between the position of the camera 2 (T1 viewpoint) and the position of the virtual camera 2v (T1 virtual viewpoint) capable of capturing the T1 virtual viewpoint image $GR_{T1}$ at time T1 is equal to the relative positional relationship between the position of the camera 2 (referred to also as T0 viewpoint) and the position of the virtual camera 2v (referred to also as T0 virtual viewpoint) capable of capturing the T0 virtual viewpoint image $GR_{T0}$ at time T0.

Moreover, it is supposed that the relative positional relationship between the position of the camera 2 (T2 viewpoint) and the position of the virtual camera 2v (T2 virtual viewpoint) capable of capturing the T2 virtual viewpoint image $GR_{T2}$ at time T2 is equal to the relative positional relationship between the T1 viewpoint and the T1 virtual viewpoint. Furthermore, it is supposed that the relative positional relationship between the position of the camera 2 (referred to also as Tn viewpoint) and the position of the virtual camera 2v (referred to also as Tn virtual viewpoint) capable of capturing the Tn virtual viewpoint image $GR_{Tn}$ at time Tn is equal to the relative positional relationship between the T1 viewpoint and the T1 virtual viewpoint.

In the occlusion compensation part 464E, to each of the pixels of the non-image capture area (for example, T1 non-image capture area) of the virtual viewpoint image (for example, T1 virtual viewpoint image $GR_{T1}$) relating to a certain point of time (for example, time T1), a pixel value of the virtual viewpoint image (for example, T0 virtual viewpoint image $GR_{T0}$) relating to another point of time (for example, time T0) different from the certain point of time is added.

For example, as shown in FIG. 29, to each of the pixels of a portion of the area $Ae_{T1}$ of the T1 non-image capture area (occlusion area) $Aoe_{T1}$ relating to an object of the T1 virtual viewpoint image $GR_{T1}$, a pixel value of a portion of the area $ARe_{T0}$ of the T0 virtual viewpoint image $GR_{T0}$ is added. In this case, the fact that between the T0 virtual viewpoint image $GR_{T0}$ and the T1 virtual viewpoint image $GR_{T1}$ having very close image capture times, a change in the image area capturing the subject is very small is utilized. By using this compensation process, in comparison with the compensation process in the aforementioned one embodiment in which a pixel value of a portion of the area $ALe_{Tn}$ of the Tn image $GL_{Tn}$ obtained by being captured at time Tn is added to each of the pixels of the portion of the area $Ae_{T1}$, the period of time required for the process can be shortened. Therefore, the amount of calculations required for adding a pixel value to each of the pixels of the non-image capture area (occlusion area) can be reduced. In this case, an explanation will be given by exemplifying a configuration in which to each of the pixels of the portion of the area $Ae_{T1}$, a pixel value of the portion of the area $ARe_{T0}$ is added; however, the present invention is not limited to this, and for example, a pixel value of the virtual viewpoint image relating to a point of time different from both of the times T0 and T1 may be added.

In this case, as a compensating method by which the pixel value of the T0 virtual viewpoint image $GR_{T0}$ is added to each of the pixels the occlusion area of the T1 virtual viewpoint image $GR_{T1}$, the compensating method based upon the first or second compensating method of the above one embodiment may be adopted. For example, the compensating method may be realized by carrying out the following steps (B1) to (B4) successively.

(B1) The correlation process of pixels is carried out between the T1 image $GL_{T1}$ and the T0 virtual viewpoint image $GR_{T0}$. The correlation process of the pixels may be realized by an existing method, such as a so-called SAD method, POC method, or the like in the same manner as in the above one embodiment. Accordingly, an area within the T0 virtual viewpoint image $GR_{T0}$ (referred to also as "T0 virtual non-corresponding area"), which does not correspond to the T1 image $GL_{T1}$, can be recognized.

(B2) From the T0 virtual non-corresponding area of the T0 virtual viewpoint image $GR_{T0}$, an area (T0 object non-corresponding area) capturing a portion of an object (for example, a head portion 2HU) that is not captured in the T1 image $GL_{T1}$ and an area (T0 background non-corresponding area) capturing a portion of a background 2WA that is not captured in the T1 image $GL_{T1}$ are recognized in a manner so as to be distinguished based upon T0 distance information. Additionally, the T0 distance information can be acquired by the distance measuring device 3 at time T0.

(B3) Between the T0 object non-corresponding area of the T0 virtual viewpoint image $GR_{T0}$ and the occlusion area relating to the object of the T1 virtual viewpoint image $GR_{T1}$, the correlation process (object correlation process) of the pixels is carried out. As this object correlation process, the same process as the object correlation process in the first or second compensating method in the above one embodiment may be adopted. This object correlation process may be prepared, for example, by replacing the T2 background appearing area N22 and the occlusion area Ao112 in the background correlation process in the first or second compensating method of the aforementioned one embodiment respectively with the T0 object non-corresponding area of the T0 virtual viewpoint image $GR_{T0}$ and the occlusion area relating to the object of the T1 virtual viewpoint image $GR_{T1}$. However, since T0 virtual viewpoint image $GR_{T0}$ is generated, with the T0 image $GL_{T0}$ being already shifted according to the parallax $\Delta d_f$, overlapping calculations relating this shift are omitted on demand in the object correlation process. The parallax $\Delta d_1$ is a parallax depending on the separated distance between the position of the camera 2 (T0 viewpoint) and the position of the virtual camera 2v (T0 virtual viewpoint) at time T0, and the value thereof can be found by using the relationship of the equation (1), the separated distance, the focal length f of the camera 2 and the T0 distance information. The contents of the process in step (B3) will be further described later.

(B4) Based upon the results of the object correlation process in step (B3), to each of the pixels in the occlusion area relating to the background of the T1 virtual viewpoint image $GR_{T1}$, a pixel value relating to each of the corresponding pixels inside the T0 object non-corresponding area of the T0 virtual viewpoint image $GR_{T0}$ is added.

In this case, an explanation has been given by exemplifying an example of carrying out the object correlation process; however, a process (background correlation process) for allowing pixels to be correlated with each other between the T0 background non-corresponding area of the T0 virtual viewpoint image $GR_{T0}$ and the occlusion area relating to the background of the T1 virtual viewpoint image $GR_{T1}$ may be carried out. At this time, based upon the results of the background correlation process, a pixel value relating to each of the corresponding pixels in the T0 background non-corresponding area is added to each of the pixels in the occlusion area relating to the background of the T1 virtual viewpoint image $GR_{T1}$.

Moreover, to a pixel (referred to also as a "blank pixel") to which no pixel value is added by the compensating method of the second modified embodiment within the occlusion area, for example, a pixel value may be added by the compensating method of the aforementioned one embodiment. Moreover, in the case where the number of the blank pixels is a predetermined number or less, the pixel value of the blank pixel may be added through an interpolation process in which pixel values of pixels located on the periphery of the blank pixel are used.

Furthermore, with respect to predetermined virtual viewpoint images of n+1 sheets of T0 to Tn virtual viewpoint images $GR_{T0}$ to $GR_{Tn}$, without carrying out the compensating method relating to the second modified embodiment, the compensating method relating to the aforementioned one embodiment may be carried out thereon. In this case, as the predetermined virtual viewpoint images, virtual viewpoint images, etc. for every predetermined number of frames are proposed. Accordingly, among the pixels included in the occlusion area, the number of pixels with no pixel value added thereto is reduced so that it becomes possible to generate a virtual viewpoint image in which visually uncomfortable feeling is reduced as little as possible, while reducing the amount of calculations.

(4-2-2-2) Object Correlation Process Based Upon First Compensating Method

In the object correlation process based upon the first compensating method in the aforementioned one embodiment to be carried out in step (B3), for example, a pixel having coordinates $(x_{N21}, y_{N21}, T0)$ within the T0 object non-corresponding area of the T0 virtual viewpoint image $GR_{T0}$, is made correlated with a pixel having coordinates $(x_{N21}-\Delta d_{fT}, y_{N21}, T1)$ within the occlusion area relating to the T1 virtual viewpoint image $GR_{T1}$. In this case, $\Delta d_{fT}$ represents a shift amount of coordinates that occurs between a pixel in the vicinity of the T0 object non-corresponding area (referred to also as "T0 virtual object neighboring point") within an area capturing an object of the T0 virtual viewpoint image $GR_{T0}$ and a pixel corresponding to the T0 object neighboring point (referred to also as "T1 virtual object corresponding point") within the area capturing the object of T1 virtual viewpoint image $GR_{T1}$. The shift amount $\Delta d_{fT}$ can be found by the results of correlation of pixels between the T1 image $GL_{T1}$ and the T0 virtual viewpoint image $GR_{T0}$ in step (B1), and the shift amount of the pixel at the time of generating the T1 virtual viewpoint image $GR_{T1}$ from the T1 image $GL_{T1}$.

(4-2-2-3) Object Correlation Process Based Upon Second Compensating Method

For example, supposing that arbitrary coordinates within an area capturing an object of the T0 virtual viewpoint image $GR_{T0}$ are defined as $(x_{NOR}, y_{NOR}, T0)$, the object correlation process based upon the second compensating method in the aforementioned one embodiment to be carried out in step (B3) may be realized by the following processes.

For example, as a first step, within the T0 virtual viewpoint image $GR_{T0}$, a pixel capturing a portion of a subject that satisfies the following three conditions (more specifically, conditions 1e to 3e) is set as a point forming the reference in the correlation process.

(Condition 1e) To be a portion of the subject captured in the T1 image $GS_{L1}$.

(Condition 2e) Of the T0 virtual viewpoint image $GR_{T0}$, to be a portion of a subject captured in a pixel (neighboring pixel) positioned near a pixel (hereinafter, referred to also as a "T0 process target pixel" and also "T0 process target point") having coordinates $(x_{NOR}, y_{NOR}, T0)$ that is a target for the correlation process.

(Condition 3e) To be a portion of a subject having substantially the same separated distance from the camera 2 as that of the portion of the subject captured in the T0 process target point.

More specifically, a pixel satisfying these conditions 1e to 3e is set as a T0 virtual reference pixel (referred to also as T0 virtual reference point) that forms a reference upon carrying out the correlation process. In this case, the coordinates of the T0 virtual reference point are represented as $(x_{OR}, y_{OR}, T0)$.

In this case, coordinates of a pixel (referred to also as "T1 reference point") capturing a portion of a subject that is the same as that captured in the T0 virtual reference point of the T1 image $GL_{T1}$ are set as $(x_{1L}, y_{1L}, T1)$. Moreover, the distance from the T1 viewpoint to the portion of the subject captured in the pixel of the T1 reference point is set to $D_{1L}(T1)$, and the distance from the T0 viewpoint to the portion of the subject captured in the pixel of the T0 virtual reference point is set to $D_{OR}(T0)$. Furthermore, coordinates of a pixel (T1 compensation target point) that is a target to which a pixel value is added in the occlusion area relating to the object of the T1 virtual viewpoint image $GR_{T1}$ are defined as $(x_{o11}, y_{o11}, T1)$.

The distance $D_{1L}(T1)$ is obtained from the T1 distance information, and the distance $D_{OR}(T0)$ is obtained from the T0 distance information. Moreover, a difference (referred to also as "T1 parallax") between the coordinates of the T1 reference point and the coordinates of a pixel (referred to also as "T1 virtual reference point") capturing a portion of a subject that is the same as that captured in the T1 reference point of the T1 virtual viewpoint image $GR_{T1}$ is set as $\Delta d_{T1}$. The T1 parallax $\Delta d_{T1}$ is obtained by substituting the distance $D_{1L}(T1)$, etc. into the equation (1). Moreover, a difference (referred to also as "T0 parallax") between the coordinates of a pixel (referred to also as T0 reference point) capturing a portion of a subject that is the same as that captured in the T0 virtual reference point of the T0 image $GL_{T0}$ and the coordinates of T0 the virtual reference point is set as $\Delta d_{T0}$. The T0 parallax $\Delta d_{T0}$ is obtained by substituting the distance $D_{OR}(T0)$, etc. into the equation (1).

Next, as a second step, by carrying out calculations according to the following equation (7), coordinates of a T1 compensation target point to which the pixel value of the T0 process target point is added are found. More specifically, since the pair of the T0 viewpoint and the T0 virtual viewpoint and the pair of the T1 viewpoint and the T1 virtual viewpoint have a positional relationship in which on a plane horizontal to the ground, they have certain distances deviated from each other in directions perpendicular to the image-capturing direction, the value $x_{o11}$ of the X-coordinate of the T1 compensation target point has a relationship represented by the following equation (7), and the value $y_{o11}$ of the Y-coordinate of the T1 compensation target point is represented by $y_{NOR}$.

$$x_{o11} = \{x_{1L} - \Delta d_{T1}\} + (x_{NOR} - x_{OR}) + \{\Delta d_{T1} - \Delta d_{T0}\} \quad (7).$$

In this manner, the T1 compensation target point having coordinates $(x_{o11}, y_{o11}, T1)$ is correlated with the T0 process target point having coordinates $(x_{NOR}, y_{NOR}, T0)$.

(4-2-3) Third Modified Embodiment

(4-2-3-1) Outline of Third Modified Embodiment

In the third modified embodiment, to each of pixels of a T1 non-image capture area of a T1 virtual viewpoint image $GR_{T1}$ generated based upon the T1 reference image $GL_{T1}$ of a stereo image obtained by being captured at a certain point of time T1, a pixel value of a inquiry image included in a stereo image obtained by being captured at another point of time different from the certain point of time T1 is added. Accordingly, it becomes possible to reduce time required for the compensation process.

The third modified embodiment is realized by an information processing system 1C shown in FIG. 24. In this case, an explanation will be given by exemplifying a configuration in which a program PGF stored in the storage part 44 is executed by the control part 46 so that the functional configuration shown in FIG. 26 is realized; however, the functional configuration may be realized by using an exclusively-used hardware configuration.

As shown in FIG. 26, the control part 46 relating to the third modified embodiment, which has functional configurations possessed by the control part 46 relating to the first modified embodiment as a basic configuration, is allowed to have such functional configurations that the occlusion compensation part 464D is replaced by an occlusion compensation part 464F.

FIG. 30 is a view for describing a compensation process relating to the third modified embodiment. In the same manner as in FIG. 27, FIG. 30 illustrates n+1 pairs of stereo images obtained by being captured by camera 21C and camera 22C at time T0, time T1, time T2, ..., time Tn, as well as T0 to Tn virtual viewpoint images $GR_{T0}$ to $GR_{Tn}$ that respectively correspond to n+1 sheets of T0 to Tn reference images $GL_{T0}$ to $GL_{Tn}$.

In FIG. 30, in the same manner as in FIG. 27, the T0 to Tn reference images $GL_{T0}$ to $GL_{Tn}$ are shown in one longitudinal column on the left side, the T0 to Tn inquiry images $GS_{T0}$ to $GS_{Tn}$ are shown in one longitudinal column in the center, and the T0 to Tn virtual viewpoint images $GR_{T0}$ to $GR_{Tn}$ are shown in one longitudinal column on the right side. Each of the T0 to Tn virtual viewpoint images $GR_{T0}$ to $GR_{Tn}$ is generated based upon the reference image and the distance information having the corresponding time among T0 to Tn reference images $GL_{T0}$ to $GL_{Tn}$ and T0 to Tn distance information in the virtual viewpoint image generation part 463. In FIG. 30, the respective images are shown in a manner so as to make the image capture time become later as the stages thereof become lower. FIG. 30 shows, for example, states in which the face of a person is rotating leftward when viewed from the cameras 21C and 22C side as time elapses.

In the occlusion compensation part 464F, to each of the pixels of the T1 non-image capture area $Aof_{T1}$ of the T1 virtual viewpoint image $GR_{T1}$ generated based upon the T1 reference image $GL_{T1}$ obtained by being captured at time T1, a pixel value of a portion of an area (for example, a portion of area $ASf_{T2}$) of the inquiry image (for example, T2 inquiry image $GS_{T2}$) obtained by being captured at another time different from time T1 is added. Accordingly, in comparison with the configuration of the aforementioned one embodiment in which the pixel value of a portion of the area $ALf_{Tn}$ of the Tn image $GL_{Tn}$ obtained by being captured at time Tn is added to each of the pixels in the T1 non-image capture area $Aof_{T1}$, the period of time required for the compensation process can be reduced. Therefore, the amount of calculations required for compensation of a pixel value of each of the pixels of the non-image capture area (occlusion area) can be lowered.

In this case, as a compensating method by which the pixel value of an inquiry image obtained by being captured at another time different from time T1 is added to each of the pixels in the occlusion area $Aof_{T1}$ of the T1 virtual viewpoint image $GR_{T1}$ relating to time T1, the compensating method that is the same as the first or second compensating method of the aforementioned one embodiment may be adopted. For example, a compensation process can be adopted in which, based upon the compensation process in which a pixel value of the T2 image G2 is added to each of the pixels in the occlusion area of the T1 virtual viewpoint image G11 in the aforementioned one embodiment, the T1 virtual viewpoint image G11 is replaced by the T1 virtual viewpoint image $GR_{T1}$, with the T2 image G2 being replaced by T2 inquiry image $GS_{T2}$. The following description will discuss specific examples of the compensation process. In this case, an explanation will be given by exemplifying a configuration in which to each of the pixels of the occlusion area $Aof_{T1}$, a pixel value of the T2 inquiry image $GS_{T2}$ is added; however, the present invention is not limited to this, and for example, a pixel value of the inquiry image relating to a point of time different from both of the times T1 and T2 may be added.

(4-2-3-2) Compensating Method Using Distance Information

First, the following description will discuss a compensating method in which T2 distance information indicating the distance from the camera 22C to each of the portions of a subject captured in each of the pixels of the T2 inquiry image $GS_{T2}$ in image capturing process at time T2 is used. This compensation method may be realized, for example, by carrying out the following steps (C1) to (C4) successively.

Additionally, the T0 to Tn distance information at each of times T0 to Tn can be obtained by substituting each parallax Δd obtained as the results of correlation process carried out on stereo images acquired by being captured at each of times T0 to Tn, the separated distance between the camera 21C and the camera 22C and the focal length f of each of the camera 21C and the camera 22C into the equation (1). Each piece of the T0 to Tn distance information includes information (T0 to Tn reference distance information) indicating a distance from the position of the camera 21C (T0 to Tn reference viewpoint) to each of the portions of a subject and information (T0 to Tn inquiry distance information) indicating a distance from the position of the camera 22C (T0 to Tn inquiry viewpoint) to each of the portions of the subject. Additionally, the T0 to Tn distance information may be obtained by measurements by the use of a distance measuring device separately installed.

(C1) The correlation process of pixels is carried out between the T1 reference image $GL_{T1}$ relating to time T1 and the T2 inquiry image $GS_{T2}$ relating to time T2. The correlation process of the pixels may be realized by an existing method, such as a so-called SAD method, POC method, or the like in the same manner as in the above one embodiment. Accordingly, an area within the T2 inquiry image $GS_{T2}$ (referred to also as "T2 non-corresponding area"), which does not correspond to the T1 reference image $GL_{T1}$, can be recognized.

(C2) From the T2 non-corresponding area of the T2 inquiry image $GS_{T2}$, an area (T2 object appearing area) capturing a portion of an object (for example, a head portion 2HU) that is not captured in the T1 reference image $GL_{T1}$ and an area (T2 background appearing area) capturing a portion of a background 2WA that is not captured in the T1 reference image $GL_{T1}$ are recognized in a manner so as to be distinguished based upon T2 distance information relating to time T2.

(C3) Based upon the T2 distance information, the correlation process (object correlation process) of the pixels is carried out between the T2 object appearing area of the T2 inquiry image $GS_{T2}$ and the occlusion area relating to the object of the T1 virtual viewpoint image $GR_{T1}$. In this object correlation process, the same process as the object correlation process of the first or second compensating method of the above one embodiment may be adopted. In the object correlation process, for example, in the background correlation process of the first or second compensating method of the above one embodiment by respectively exchanging the T2 background appearing area N22 and the occlusion area Ao112 with the T2 object appearing area of the T2 inquiry image $GS_{T2}$ and the occlusion area relating to the object of the T1 virtual viewpoint image $GR_{T1}$, the corresponding process can be achieved. The contents of the process in step (C3) will be described later.

(C4) Based upon the results of the object correlation process in step (C3), to each of the pixels in the occlusion area relating to the object of the T1 virtual viewpoint image $GR_{T1}$, a pixel value relating to each of the corresponding pixels inside the object appearing area of the T2 inquiry image $GS_{T2}$ is added.

In this case, an explanation has been given by exemplifying an example of carrying out the object correlation process; however, based upon the T2 distance information, a process (background correlation process) for allowing pixels to be correlated with each other between the T2 background appearing area of the T2 inquiry image $GS_{T2}$ and the occlusion area relating to the background of the T1 virtual viewpoint image $GR_{T1}$ may be carried out. At this time, based upon the results of the background correlation process, a pixel value relating to each of the corresponding pixels in the background appearing area of the T2 inquiry image $GS_{T2}$ is added to each of the pixels in the occlusion area relating to the background of the T1 virtual viewpoint image $GR_{T1}$.

<(4-2-3-2-1) Object Correlation Process Based Upon First Compensating Method>

In the object correlation process based upon the first compensating method in the above one embodiment to be carried out in step (C3), for example, a pixel having coordinates $(x_{N21}, y_{N21}, T2)$ within the T2 object appearing area of the T2 inquiry image $GS_{T2}$ is made correlated with a pixel having coordinates $(x_{N21}-\Delta d_f - \Delta d_{fT}, y_{N21}, T1)$ within the occlusion area relating to the object of the T1 virtual viewpoint image $GR_{T1}$. In this case, $\Delta d_f$ represents a parallax according to the separated distance between the position (T1 reference viewpoint) of the camera 21C and the position (T1 virtual viewpoint) of the virtual camera 21vD at time T1, and is found by the relationship of the equation (1), the separated distance, the focal length f of the camera 21C and the T1 reference distance information. Moreover, $\Delta d_{fT}$ represents a shift amount of coordinates between a pixel (referred to also as "inquiry object neighboring point") in the vicinity of the T2 object appearing area within an area capturing the object of the T2 inquiry image $GS_{T2}$ and a pixel (referred to also as reference object corresponding point) corresponding to the inquiry object neighboring point within an area capturing the object of the T1 reference image $GL_{T1}$.

<(4-2-3-2-2) Object Correlation Process Based Upon Second Compensating Method>

On the other hand, the object correlation process based upon the second compensating method in the above one embodiment to be carried out in step (C3) can be realized by the following process by, for example, supposing that an arbitrary coordinates within an area capturing the object of the T2 inquiry image $GS_{T2}$ are set as $(x_{N2S}, y_{N2S}, T2)$.

For example, as a first step, within the T2 inquiry image $GS_{T2}$ a pixel capturing a portion of a subject that satisfies the following three conditions (more specifically, conditions 1f to 3f) is set as a point forming the reference in the correlation process.

(Condition 1f) To be a portion of the subject captured in the T1 reference image $GL_{T1}$.

(Condition 2f) Of the T2 inquiry image $GS_{T2}$, to be a portion of a subject captured in a pixel (neighboring pixel) positioned near a pixel (hereinafter, referred to also as a "T2 process target pixel" and also "T2 process target point") having coordinates $(x_{N2S}, Y_{N2S}, T2)$ that is a target for the correlation process.

(Condition 3f) To be a portion of a subject having substantially the same separated distance from the camera 22C as that of the portion of the subject captured in the T2 process target point.

More specifically, a pixel satisfying these conditions 1f to 3f is set as a T2 inquiry reference pixel (referred to also as T2 inquiry reference point) that forms a reference upon carrying out the correlation process. In this case, the coordinates of the T2 inquiry reference point are represented as $(x_{2S}, y_{2S}, T2)$.

In this case, coordinates of a pixel (referred to also as "T1 reference reference point) capturing a portion of a subject that is the same as that captured in the T2 inquiry reference point of the T1 reference image $GL_{T1}$ are set as $(x_{1L}, y_{1L}, T1)$, and the distance from the T1 reference viewpoint to the portion of the subject captured in the pixel of the T1 reference reference point is set to $D_{1L}(T1)$, and the distance from the T2 inquiry viewpoint to the portion of the subject captured in the pixel of the T2 inquiry reference point is set to $D_{2S}(T2)$. Moreover, coordinates of a pixel (T1 compensation target point) that is a target to which a pixel value is added in the occlusion area relating to the background of the T1 virtual viewpoint image $GR_{T1}$ are defined as $(x_{o11}, y_{o11}, T1)$.

The distance $D_{1L}(T1)$ is obtained from the T1 reference distance information, and the distance $D_{2S}(T2)$ is obtained from the T2 inquiry distance information. Moreover, a difference (referred to also as "T1 reference parallax") between the coordinates of the T1 reference reference point and the coordinates of a pixel (referred to also as T1 reference virtual reference point) capturing a portion of a subject that is the same as that captured in the T1 reference reference point of the T1 virtual viewpoint image $GR_{T1}$ is set as $\Delta d_{T1L}$. The T1 reference parallax $\Delta d_{T1L}$ is obtained by substituting the distance $D_{1L}(T1)$, etc. into the equation (1). Moreover, a difference (referred to also as "T2 inquiry parallax") between the coordinates of the T2 inquiry reference point and the coordinates of a pixel (referred to also as T2 reference virtual reference point) capturing a portion of a subject that is the same as that captured in the T2 inquiry reference point of the T2 virtual viewpoint image $GR_{T2}$ is set as $\Delta d_{T2S}$. The T2 reference parallax $\Delta d_{T2S}$ is obtained by substituting the distance $D_{2S}(T2)$, etc. into the equation (1).

Next, as a second step, by carrying out calculations according to the following equation (8), coordinates of a T1 compensation target point to which the pixel value of the T2 process target point is added are found. More specifically, since the pair of the T1 reference viewpoint and the T1 virtual viewpoint and the pair of the T2 inquiry viewpoint and the T2 virtual viewpoint have a positional relationship in which on a plane horizontal to the ground, they have certain distances deviated from each other in directions perpendicular to the image-capturing direction, the value $x_{o11}$ of the X-coordinate of the T1 compensation target point has a relationship represented by the following equation (8), and the value $y_{o11}$ of the Y-coordinate of the T1 compensation target point is represented by $y_{N2S}$.

$$x_{o11} = \{x_{1L} - \Delta d_{T1L}\} + (x_{N2S} - x_{2S}) + \{\Delta d_{T1L} - \Delta d_{T2S}\} \quad (8)$$

In this manner, the T1 compensation target point having coordinates $(x_{o11}, y_{o11}, T1)$ is correlated with the T2 process target point having coordinates $(x_{N2S}, y_{N2S}, T2)$.

(4-2-3-3) Compensating Method without Using Distance Information

Next, the following description will discuss a compensating method in which no distance information indicating the distance between each of the cameras 21C and 22C and each of the portions of a subject is used. This compensation method may be realized, for example, by carrying out the following steps (D1) to (D4) successively.

(D1) The correlation process of pixels is carried out between the T1 reference image $GL_{T1}$ relating to time T1 and the T2 inquiry image $GS_{T2}$ relating to time T2. The correlation process of the pixels may be realized by an existing method, such as a so-called SAD method, POC method, or the like in the same manner as in the above one embodiment. Accordingly, an area within the T2 inquiry image $GS_{T2}$ (referred to also as "T2 non-corresponding area"), which does not correspond to the T1 reference image $GL_{T1}$, can be recognized.

(D2) On a remaining area on the peripheral portion of the T2 non-corresponding area of the T2 inquiry image $GS_{T2}$, a plurality of points located in the vicinity of the border with the T2 non-corresponding area (hereinafter, referred to also as "border neighboring points") are set. The plurality of border neighboring points may be preferably prepared as, for example, right and left two points sandwiching the T2 non-corresponding area.

(D3) Based upon the results of the pixel correlation process in the step (D1), points respectively corresponding to the respective border neighboring points (referred to also as "border neighboring corresponding points) are recognized, within the T1 virtual viewpoint image $GR_{T1}$.

(D4) After the T2 non-corresponding area has been expanded or reduced, if necessary, so as to allow the relative positional relationship of the plurality of border neighboring points to be matched with the relative positional relationship of the plurality of border neighboring corresponding points, the area is pasted onto the occlusion area of the T1 virtual viewpoint image $GR_{T1}$. Accordingly, to the respective pixels of the occlusion area, pixel values relating to the corresponding pixels within the T2 non-corresponding area are added. Additionally, in the case where the shapes of the T2 non-corresponding area and the occlusion area are slightly different from each other, after the pixel pattern of the T2 non-corresponding area has been expanded to such a degree as to cover the occlusion area, the pixel pattern of the T2 non-corresponding area may be pasted onto the occlusion area. However, with respect to a portion sticking out of the occlusion area within the pixel pattern, it is preferable to avoid pasting it.

In this case, the pixel values relating to pixels within the T2 non-corresponding area are added to the respective pixels within the occlusion area of the T1 virtual viewpoint image $GR_{T1}$; however, the present invention is not limited to this. For example, to each of the pixels of the occlusion area of the T1 virtual viewpoint image $GR_{T1}$, a pixel value relating to a pixel within the non-corresponding area that is included in at least one inquiry image of the T0, T3 to Tn inquiry images $GS_{T0}$, $GS_{T3}$ to $GS_{Tn}$ may be added. At this time, as to which pixel value in the non-corresponding area included in which inquiry image among the T0, T3 to Tn inquiry images $GS_{T0}$, $GS_{T3}$ to $GS_{Tn}$, for example, the user may determine through an operation on the operation part 41, or it may be determined based upon the results of the correlation process of pixels in the above-mentioned step (D1). As the determination method for this, for example, a method for determining based upon the degree of similarity on the sizes and shapes between the T1 non-image capture area $Aof_{T1}$ and the non-corresponding area may be proposed. As the degree of similarity, the ratio of the sizes of the areas, etc., may be proposed, and provision may be made so that as a value obtained by dividing the area of the T1 non-image capture area $Aof_{T1}$ by the area of the non-corresponding area becomes as close to 1 as possible, the degree of similarity is defined as higher.

As described above, according to the third modified embodiment, for example, as shown in FIG. 28, in the case where the position of the camera 22C at time T2 (T2 reference viewpoint) is closer to the position (T1 virtual viewpoint) of the virtual camera 21vD at time T1, than the position (T1 reference viewpoint) of the camera 21C at time T1, it is possible to reduce the amount of calculations required for compensation of the pixel value for the respective pixels in the non-image capture area of the T1 virtual viewpoint image $GR_{T1}$. Therefore, the time required for the correlation process can be reduced. Therefore, as an arrangement that can obtain this effect remarkably, for example, such an arrangement may be proposed in which pixels corresponding to the total pixels relating to the T1 non-image capture area $Aof_{T1}$ of the T1 virtual viewpoint image $GR_{T1}$, or to the number close to the total pixels, are included in the T2 inquiry image $GS_{T2}$.

(4-2-4) Fourth Modified Embodiment

In a fourth modified embodiment, to each of pixels in the non-image capture area of an object area included in a virtual viewpoint image relating to a certain point of time, a pixel value relating to an object having the same posture captured in an image obtained by being captured at a point of time different from the certain point of time is added. Accordingly, unnatural changes in the pixel value within an image area capturing a certain object can be reduced.

The fourth modified embodiment can be realized by an information processing system 1 shown in FIG. 1. In this case, an explanation will be given by exemplifying a configuration in which a program PGG stored in the storage part 44 is executed by the control part 46 so that the functional configuration of the control part 46 shown in FIG. 31 is realized; however, the functional configuration may be realized by an exclusively-used hardware configuration.

Figure 31:
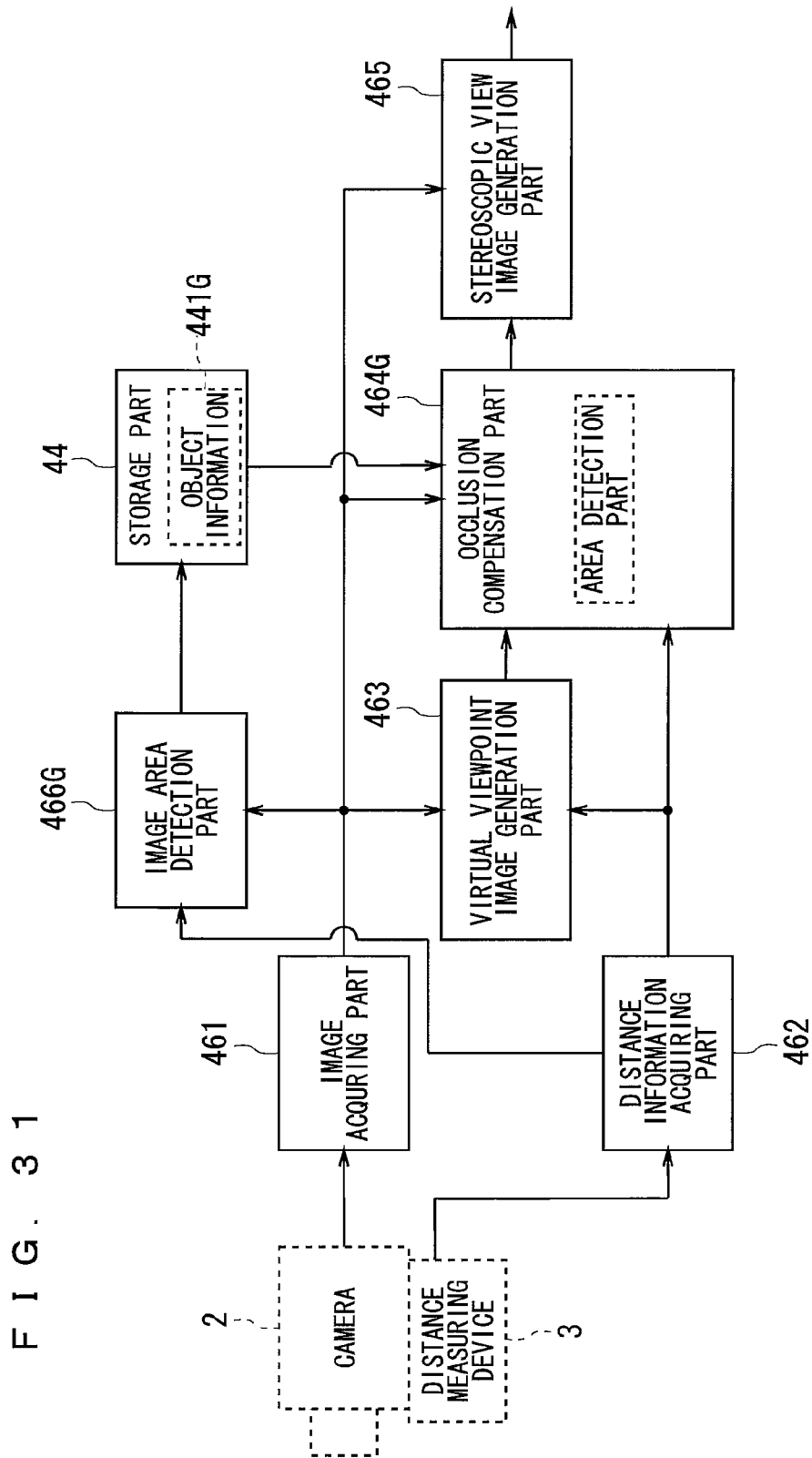
FIG. 31 is a view showing a functional configuration of an information processing apparatus according to a fourth modified embodiment.

As shown in FIG. 31, the control part 46 relating to the fourth modified embodiment, which has functional configurations possessed by the control part 46 relating to the one embodiment shown in FIG. 2 as a basic configuration, is allowed to have such functional configurations that an image area detection part 466G is added thereto, with the occlusion compensation part 464 being replaced by an occlusion compensation part 464G.

The image area detection part 466G detects an area (object area) capturing a specific kind of object (for example, the face, body, etc. of a person) from each of images obtained by the image acquiring part 461. In this case, if patterns of the pixel value indicating the distribution of a standard pixel value (luminance, color, etc.) relating to the specific kind of object are prepared, by carrying out a pattern matching using the patterns of the pixel value, an object area can be detected.

Here, in the case where patterns of the pixel value relating to the posture of an object (orientation, etc.) are prepared, the image area detection part 466G can detect an object area relating to the posture of the object (orientation, etc). That is, in the image area detection part 466G, positional information of the object area capturing the specific kind of object and information relating to its posture (referred to also as "posture information) are obtained. As one example of this posture information, information relating to the direction of the face is proposed. The orientation of the face can be detected by pattern matching by the use of patterns of the pixel value for every predetermined angles (for example, 5°). Moreover, the image area (referred to also as "face area") capturing the face is detected based upon a predetermined color (for example, skin color, etc.), and based upon the position of the area capturing the nose within the face area, the orientation of the face may be detected.

In the case where the number of images to be obtained in the image acquiring part 461 is three or more, the image area detection part 466G can detect a plurality of object areas of three or more capturing the specific kind of object from the three or more images. In this case, information relating to the detected object areas is stored in the storage part 44 as object information 441G. The information relating to the object areas includes, for example, a piece of information indicating the position of the object area (for example, an address), a piece of information indicating an image capture time of an image that forms the origin of detection of the object area and a piece of posture information of the object captured in the object area.

FIG. 32 illustrates n+1 sheets of T0 to Tn images $GL_{T0}$ to $GL_{Tn}$ obtained by being captured by the camera 2 at time T0, time T1, time T2, . . . , time Tn, and T0 to Tn virtual viewpoint images $GR_{T0}$ to $GR_{Tn}$ respectively corresponding to the n+1 sheets of T0 to Tn images $GL_{T0}$ to $GL_{Tn}$.

In FIG. 32, the T0 to Tn images $GL_{T0}$ to $GL_{Tn}$ are shown in one longitudinal column on the left side, and the T0 to Tn virtual viewpoint images $GR_{T0}$ to $GR_{Tn}$ are shown in one longitudinal column on the right side. Each of the T0 to Tn virtual viewpoint images $GR_{T0}$ to $GR_{Tn}$ is generated based upon the image and distance information at the corresponding time among the T0 to Tn images $GL_{T0}$ to $GL_{Tn}$ and T0 to Tn distance information in the virtual viewpoint image generation part 463. Moreover, in FIG. 32, the respective images are shown in a manner so as to make the image capture time become later as the stages thereof become lower. In FIG. 32, for example, a plurality of images that indicate states in which the face of a person is rotating leftward when viewed from the camera 2 side as time elapses are shown.

Therefore, in the occlusion compensation part 464G, by carrying out the following steps (E1) to (E3) successively, to each of the pixels of the non-image capture area (for example, T1 non-image capture area $Aof_{T1}$) of the virtual viewpoint image (for example, the T1 virtual viewpoint image $GR_{T1}$) obtained by being captured at certain time (for example, time T1), a pixel value of a portion of an area (for example, a portion of an area $ALf_{Tn}$) within an image (for example, Tn image $GL_{Tn}$) obtained by being captured at a point of time different from the certain point of time (for example, time Tn) is added.

(E1) Object information 441G in the storage part 44 is referred to, and based upon the posture information relating to an object area of an image (for example, T1 image $GL_{T1}$) obtained by being captured at a certain point of time (for example, time T1), information (referred to also as virtual posture information) indicating a posture (referred to also as a virtual posture) relating to the object area of a virtual viewpoint image (for example, T1 virtual viewpoint images $GR_{T1}$) relating to the certain point of time can be obtained. In this case, upon generating a virtual viewpoint image from the images, virtual posture information relating to the object area of the virtual viewpoint image can be obtained from a shift amount of the pixel, and the like.

(E2) From the plurality of object areas detected by the image area detection part 466G, an object area (referred to also as "compensation-use object area") capturing the object having a posture contained within a permissible error range defined based upon the virtual posture obtained in step (E1) is detected by an area detection part. In the case where the posture is indicated by a rotation angle of the object based upon a certain direction, the permissible error range, mentioned here, refers to a value range determined based upon the rotation angle relating to the virtual posture (for example, a range of ±1°). That is, the permissible error range means a value range including the reference value with respect to the value indicating the posture. Additionally, it is preferable to detect a compensation-use object area capturing an object having a posture that is coincident with the virtual posture obtained in step (E1), from the plurality of object areas detected by the image area detection part 466G.

(E3) Based upon the compensation-use object area detected in step (E2), a pixel value is added to each of the pixels of the occlusion area (for example, T1 non-image capture area $Aof_{T1}$) of the object area (referred to also as a virtual object area) of the virtual viewpoint image (for example, T1 virtual viewpoint image $GR_{T1}$). More specifically, with respect to the size of the compensation-use object area detected in step (E2), for example, if necessary, first, the compensation-use object area is expanded or reduced so as to be fitted to the size of the virtual object area. Next, with respect to the respective pixels in the occlusion area, a correlation process of pixels is carried out so as to make the relative position occupied by the pixels of the occlusion area in the virtual object area coincident with the relative position occupied by the pixels of the compensation-use object area. Thus, to each of the pixels of the occlusion area, a pixel value of the corresponding pixel in the compensation-use object area is added.

The following description will discuss a flow of operations of a pixel value compensation process according to a fourth modified embodiment. FIG. 33 is a flow chart that shows the flow of operations implemented in an image processing system 1 according to the fourth modified embodiment.

As shown in FIG. 33, first, T0 to Tn images $GL_{T0}$ to $GL_{Tn}$ obtained by being captured at times T0 to Tn are acquired by the image acquiring part 461 (step SP1), and T0 to Tn distance information at times T0 to Tn obtained by the distance measuring device 3 is acquired by the image acquiring part 461 (step SP2). Next, based upon the T0 to Tn images $GL_{T0}$ to $GL_{Tn}$ and T0 to Tn distance information, T0 to Tn virtual viewpoint images $GR_{T0}$ to $GR_T$, are generated by the virtual viewpoint image generation part 463 (step SP3).

Next, positional information and posture information of object areas relating to a predetermined kinds of objects in the respective T0 to Tn images $GL_{T0}$ to $GL_{Tn}$ and T0 to Tn virtual viewpoint images $GR_{T0}$ to $GR_{Tn}$ are detected by the image area detection part 466G (step SP4). Moreover, based upon the results of detection in step SP4, a pixel value is added to each of the pixels of an occlusion area $Aof_{T1}$ by the occlusion compensation part 464G (step SP5).

Additionally, although FIG. 31 has exemplified an example in which the distance information is obtained by the distance measuring device 3, the distance information may be obtained based upon stereo images obtained by a stereo camera in place of the distance measuring device 3. Moreover, in the case where the plurality of images obtained in the image acquiring part 461 include a plurality of objects of the same kind, the object areas capturing the respective objects are identified by the positions, etc. capturing the respective objects in the images, and the information relating to the respective object areas may be stored in the object information 441G in a manner so as to be distinguished.

Furthermore, the information relating to the respective object areas may include information relating to three-dimensional positions including distance information. For example, to each of the pixels of the occlusion area of a virtual viewpoint image relating to a certain point of time, a pixel value of a virtual viewpoint image relating to a point of time different from the certain point of time may be added, or in the case where stereo images are obtained, a pixel value of an inquiry image relating to a point of time different from the certain point of time may be added thereto.

Moreover, in the above step (E2), in the case where two or more object areas, each capturing an object having a posture contained within a permissible error based upon the virtual posture obtained in step (E1), are detected from the plurality of object areas detected by the image area detection part 466G, the two or more object areas may be focused into one object area according to a predetermined rule. As the predetermined rule, in the case where a pixel value is added to each of the pixels in the occlusion area of the T1 virtual viewpoint image $GR_{T1}$ relating to time T1, a rule in which of the two or more object areas, the object area contained in the image having the image capture time closest to time T1 is automatically selected may be used. Moreover, for example, another rule may be proposed in which among two or more object areas, in at least one of luminance and color distribution patterns, one of the object areas having a pattern of the pixel value closest to the pattern of the pixel value in the object area of the T1 image $GL_{T1}$ obtained by being captured at time T1 is automatically selected. Additionally, the state in which the pattern of the pixel value is closest includes, for example, such a state where the total sum of differences among the patterns of pixel values is the smallest.

Accordingly, in the virtual viewpoint image, the occurrence of mismatching between an image area capturing a certain object and image areas on the periphery thereof can be reduced. Therefore, it is possible to reduce unnatural changes in the pixel value within an image area capturing a certain object.

⊙ Additionally, it is needless to say that a portion or the entire portion respectively forming the above one embodiment and various modified embodiments may be combined with one another on demand within the scope not departing from the gist of the present invention.

DESCRIPTION OF REFERENCE SYMBOLS

1, 1B, 1C Information processing system
2, 21C, 22C Camera
2v, 21vD Virtual camera
3 Distance measuring device
4 Information processing apparatus
44 Storage part
46 Control part
441, 441G Object information
461, 461C, 461D Image acquiring part
462, 462C Distance information acquiring part
463 Virtual viewpoint image generation part
464, 464A, 464B, 464D to 464G Occlusion compensation part
466 Object estimation part
466G Image area detection part
467 Information updating part
468 Distance information estimation part

The invention claimed is:

1. An image processing system comprising:
an image acquiring part that acquires a first image obtained by being captured from a first viewpoint at a first image capture time and a second image obtained by being captured at a second image capture time different from the first image capture time;
a virtual viewpoint image acquiring part that acquires a first virtual viewpoint image that is generated in a pseudo manner based upon the first image, and represents an image captured from a first virtual viewpoint that is separated by a predetermined distance from the first viewpoint; and
a compensation part that includes a recognition part that recognizes a non-corresponding area of the second image that does not correspond to the first image, and adds a pixel value in accordance with a pixel value relating to the non-corresponding area of the second image recognized by the recognition part, to each pixel of a non-image capture area of the first virtual viewpoint image corresponding to a portion of a subject not captured in the first image,
wherein the compensation part includes a setting part that sets a reference point included in a corresponding area of the second image that corresponds to the first image, and
in accordance with positional information of a virtual reference point corresponding to a reference point in the first virtual viewpoint image and a relative positional relationship between the reference point in the second image and a process target point included in the non-corresponding area of the second image, specifies a compensation target point in the first virtual viewpoint image corresponding to the process target point in the second image, and
then adds a pixel value to the compensation target point in accordance with a pixel value relating to the process target point.

2. The image processing system according to claim 1, further comprising:
a generation part that generates the first virtual viewpoint image based upon the first image and distance information relating to a distance from the first viewpoint to each portion of the subject.

3. The image processing system according to claim 2, further comprising:
a distance measuring part that measures the distance from the first viewpoint to each portion of the subject.

4. The image processing system according to claim 1, wherein in the case where the first and second images are two frame images comprising motion picture files of an MPEG format, the recognition part recognizes the non-corresponding area in accordance with motion vector information included in the motion picture files of the MPEG format.

5. The image processing system according to claim 1, wherein the setting part sets a point located near the process target point within the corresponding area as the reference point.

6. The image processing system according to claim 1, wherein the setting part sets a point that is located near the process target point within the corresponding area and has a separated distance from a second viewpoint used upon capturing the second image to the subject that is substantially the same as that of the process target point as the reference point.

7. An image processing system comprising:
an image acquiring part that acquires a first image obtained by being captured from a first viewpoint at a first image capture time and a second image obtained by being captured at a second image capture time different from the first image capture time;
a virtual viewpoint firing part that acquires a first virtual viewpoint image that is generated in a pseudo manner based upon the first image, and represents an image captured from a first virtual viewpoint that is separated by a predetermined distance from the first viewpoint; and
a compensation part that adds a pixel value, in accordance with a pixel value of the second image, to each pixel of a non-image capture area of the first virtual viewpoint image corresponding to a portion of a subject not captured in the first image,
wherein the compensation part adds, to each of the pixels within the non-image capture area, a pixel value of a pixel of a second virtual viewpoint image having the same coordinates as each of the pixels of the non-image capture area in the first virtual viewpoint image, where the second virtual viewpoint image is generated in a pseudo manner based upon the second image and can be acquired by being captured from a second virtual viewpoint, where a positional relationship between the second virtual viewpoint and a second viewpoint used upon capturing the second image is the same positional relationship as that of the first virtual viewpoint relative to the first viewpoint.

8. An image processing system comprising:
an image acquiring part that acquires a first image obtained by being captured from a first viewpoint at a first image capture time and a second image obtained by being captured at a second image capture time different from the first image capture time;
a virtual viewpoint image acquiring part that acquires a first virtual viewpoint image that is generated in a pseudo manner based upon the first image, and represents an image captured from a first virtual viewpoint that is separated by a predetermined distance from the first viewpoint; and
a compensation part that adds a pixel value, in accordance with a pixel value of the second image, to each pixel of a non-image capture area of the first virtual viewpoint image corresponding to a portion of a subject not captured in the first image,
wherein the compensation part adds a pixel value to each of the pixels in the non-image capture area in accordance with a second virtual viewpoint image generated from the second image in a pseudo manner, with the second image being an image acquired by being captured from a second viewpoint and the second virtual viewpoint image being an image acquired by being captured from a second virtual viewpoint, and the relative positional relationship between the second viewpoint and the second virtual viewpoint is the same as the relative positional relationship between the first viewpoint and the first virtual viewpoint.

9. An image processing system comprising:
an image acquiring part that acquires a first image obtained by being captured from a first viewpoint at a first image capture time and a second image obtained by being captured at a second image capture time different from the first image capture time;
a virtual viewpoint image acquiring part that acquires a first virtual viewpoint image that is generated in a pseudo manner based upon the first image, and represents an image captured from a first virtual viewpoint that is separated by a predetermined distance from the first viewpoint; and
a compensation part that adds a pixel value, in accordance with a pixel value of the second image, to each pixel of a non-image capture area of the first virtual viewpoint image corresponding to a portion of a subject not captured in the first image,
wherein the first image is obtained by being captured by a first camera, and the second image is obtained by being captured by a second camera different from the first camera.

10. An image processing system comprising:
an image acquiring part that acquires a first image obtained by being captured from a first viewpoint at a first image capture time and a second image obtained by being captured at a second image capture time different from the first image capture time; and
a virtual viewpoint image acquiring part that acquires a first virtual viewpoint image that is generated in a pseudo manner based upon the first image, and represents an image captured from a first virtual viewpoint that is separated by predetermined distance from the first viewpoint; and
a compensation part that adds a pixel value, in accordance with a pixel value of the second image, to each pixel of a non-image capture area of the first virtual viewpoint image corresponding to a portion of a subject not captured in the first image,
wherein the first image is obtained by being captured by a first camera,
the image acquiring part acquires a third image obtained by being captured by a second camera different from the first camera at the first image capture time, and
the compensation part adds a pixel value to each of the pixels of the non-image capture area in accordance with the second image and the third image.

11. An image processing system comprising:
an image acquiring part that acquires a first image obtained by being captured from a first viewpoint at a first image capture time and a second image obtained by being captured at a second image capture time different from the first image capture time;
a virtual viewpoint image acquiring part that acquires a first virtual viewpoint image that is generated in a pseudo manner based upon the first image, and represents an image captured from a first virtual viewpoint that is separated by a predetermined distance from the first viewpoint; and
a compensation part that adds a pixel value, in accordance with a pixel value of the second image, to each pixel of a non-image capture area of the first virtual viewpoint image corresponding to a portion of a subject not captured in the first image, a first detection part that detects a first object area capturing a specific kind of object from the first image and a first posture of the specific kind of object captured in the first object area, and also detects a plurality of object areas capturing the specific kind of object and a plurality of postures of the specific kind of object captured in the respective plurality of object areas from a plurality of images acquired by the image acquiring part and obtained by being captured at a plurality of image capture times different from the first image capture time, wherein the compensation part includes a second detection part that acquires information indicating a first virtual posture of the specific kind of object captured in the first virtual viewpoint image, and detects an object area capturing the specific kind of object having a posture included within a permissible error range based upon the first virtual posture from the plurality of object areas, and the compensation part adds a pixel value to each of the pixels within the non-image capture area in accordance with the object area detected by the second detection part.

12. The image processing system according to claim 11, wherein in the case where two or more object areas are detected by the second detection part, the compensation part adds a pixel value to each of the pixels of the non-image capture area in accordance with the object area captured in an image having an image capture time closest to the first image capture time among the two or more object areas.

13. The image processing system according to claim 11, wherein in the case where two or more object areas are detected by the second detection part, the compensation part adds a pixel value to each of the pixels of the non-image capture area in accordance with the object area having a pixel value pattern that is closest to the pixel value pattern of the first object area among the two or more object areas.

14. An image processing method comprising:
a first acquiring step of acquiring a first image obtained by being captured from a first viewpoint at a first image capture time and a second image obtained by being captured at a second image capture time different from the first image capture time; and
a second acquiring step of acquiring a first virtual viewpoint image that is generated in a pseudo manner based upon the first image, and represents an image captured from a first virtual viewpoint separated by a predetermined distance from the first viewpoint; and
a compensation step that includes a recognition step of recognizing a non-corresponding area of the second image that does not correspond to the first image, and adding a pixel value in accordance with a pixel value relating to the non-corresponding area of the second image recognized by the recognition step, to each pixel of a non-image capture area of the first virtual viewpoint image corresponding to a portion of a subject not captured in the first image, wherein in the compensation step, a reference point included in a corresponding area of the second image that corresponds to the first image is set, and in accordance with positional information of a virtual reference point corresponding to a reference point in the first virtual viewpoint image and a relative positional relationship between the reference point in the second image and a process target point included in the non-corresponding area of the second image, a compensation target point, corresponding to the process target point in the second image, is specified in the first virtual viewpoint image, and then a pixel value is added to the compensation target point in accordance with a pixel value relating to the process target point.

15. A non-transitory computer readable recording medium storing a computer-readable program, the program controlling an information processing system to operate as an image processing system, and the image processing system comprising:
an image acquiring part that acquires a first image obtained by being captured from a first viewpoint at a first image capture time and a second image obtained by being captured at a second image capture time different from the first image capture time;
a virtual viewpoint image acquiring part that acquires a first virtual viewpoint image that is generated in a pseudo manner based upon the first image, and represents an image captured from a first virtual viewpoint that is separated by a predetermined distance from the first viewpoint; and
a compensation part that includes a recognition part that recognizes a non-corresponding area of the second image that does not correspond to the first image, and adds a pixel value, in accordance with a pixel value relating to the non-corresponding area of the second image recognized by the recognition part, to each pixel of a non-image capture area of the first virtual viewpoint image corresponding to a portion of a subject not captured in the first image,
wherein the compensation part includes a setting part that sets a reference point included in a corresponding area of the second image that corresponds to the first image, and in accordance with positional information of a virtual reference point corresponding to a reference point in the first virtual viewpoint image and a relative positional relationship between the reference point in the second image and a process target point included in the non-corresponding area of the second image, specifies a compensation target point in the first virtual viewpoint image corresponding to the process target point in the second image, and then adds a pixel value to the compensation target point in accordance with a pixel value relating to the process target point.

* * * * *